(12) United States Patent
Knudsen et al.

(10) Patent No.: US 9,587,210 B2
(45) Date of Patent: Mar. 7, 2017

(54) ENERGY SAVING BREWING METHOD

(75) Inventors: Søren Knudsen, Måløv (DK); Preben Riis, Værløse (DK); Birgitte Skadhauge, Birkerød (DK); Lene Mølskov Bech, Smørum (DK); Ole Olsen, Copenhagen S (DK)

(73) Assignees: CARLSBERG BREWERIES A/S, Copenhagen (DK); HEINEKEN SUPPLY CHAIN B.V., Amsterdam (NL)

( * ) Notice: Subject to any disclaimer, the term of this patent is extended or adjusted under 35 U.S.C. 154(b) by 578 days.

(21) Appl. No.: 13/701,604

(22) PCT Filed: May 31, 2011

(86) PCT No.: PCT/DK2011/050186
§ 371 (c)(1),
(2), (4) Date: Dec. 3, 2012

(87) PCT Pub. No.: WO2011/150933
PCT Pub. Date: Dec. 8, 2011

(65) Prior Publication Data
US 2013/0095207 A1 Apr. 18, 2013

Related U.S. Application Data

(63) Continuation-in-part of application No. 13/132,765, filed as application No. PCT/DK2009/050315 on (Continued)

(30) Foreign Application Priority Data

Dec. 3, 2008 (DK) .................................. 2008 01708
Dec. 30, 2008 (DK) .................................. 2008 01851
Jun. 3, 2010 (DK) .................................. 2010 70243

(51) Int. Cl.
C12C 1/00 (2006.01)
C12C 7/00 (2006.01)
(Continued)

(52) U.S. Cl.
CPC ................ *C12C 1/073* (2013.01); *C12C 1/18* (2013.01); *C12C 7/20* (2013.01); *C12C 7/22* (2013.01)

(58) Field of Classification Search
None
See application file for complete search history.

(56) References Cited

U.S. PATENT DOCUMENTS 4,683,195 A 7/1987 Mullis et al.
4,800,159 A 1/1989 Mullis et al.
(Continued)

FOREIGN PATENT DOCUMENTS

EP 1609866 12/2005
WO 9920795 4/1999
(Continued)

OTHER PUBLICATIONS

McElroy et al, 1995, Bio/Technology, 13:245-249.*
(Continued)

*Primary Examiner* — Jason Deveau Rosen
(74) *Attorney, Agent, or Firm* — McNeill Baur PLLC

(57) ABSTRACT

Barley based beverages are produced in large quantities, employing highly energy consuming methods, for example in the malting and brewhouse facilities for kiln drying and wort boiling operations, respectively. The present invention relates to energy saving methods for preparing barley based beverages, as well as to barley plants useful in such methods. In particular, the invention describes barley plants with combined traits of null-lipoxygenase-1 (null-LOX-1), null-lipoxygenase-2 (null-LOX-2) and null-S-adenosylmethio-
(Continued)

nine:methionine S-methyltransferase in one plant, which is particularly useful for energy saving methods to prepare barley based beverages, such as beer.

13 Claims, 13 Drawing Sheets

Related U.S. Application Data

Dec. 1, 2009, and a continuation-in-part of application No. 13/141,579, filed as application No. PCT/DK2009/050355 on Dec. 28, 2009.

(51) Int. Cl.
  *A01H 5/00*  (2006.01)
  *C12C 1/073*  (2006.01)
  *C12C 7/20*  (2006.01)
  *C12C 1/18*  (2006.01)
  *C12C 7/22*  (2006.01)

(56) References Cited

U.S. PATENT DOCUMENTS

| | | | |
|---|---|---|---|
| 2005/0204437 A1* | 9/2005 | Breddam et al. | 800/320 |
| 2008/0193593 A1 | 8/2008 | Hirota et al. | |
| 2009/0041890 A1 | 2/2009 | Festersen | |

FOREIGN PATENT DOCUMENTS

| | | |
|---|---|---|
| WO | WO 02/053721 | 7/2002 |
| WO | WO 2004/011591 | 2/2004 |
| WO | WO 2005/087934 | 9/2005 |
| WO | WO 2010/063288 | 6/2010 |
| WO | WO 2010/075880 | 7/2010 |

OTHER PUBLICATIONS

Yang et al, 1995, J. Am. Soc. Brew. Chem., 53:45-49.*
Kocsis et al, 2003, Plant Physiol., 131:1808-1815.*
Pimenta et al, 1998, Plant Phys., 118:431-438.*
Willaert, 2007, The Beer Brewing Process: Wort Production and Beer Fermentation.*
De Rouck et al. "Sufficient Formation and Removal of Dimethyl Sulfide (DMS) without Classic Wort Boiling." *Brewing Science*. vol. 63. Jan./Feb. 2010. pp. 31-40.
Tzfira et al. "Towards targeted mutagenesis and gene replacement in plants." *Trends in Biotech*. vol. 23. No. 12. 2005. pp. 568-569.
American Association of Cereal Chemists, "Approved methods of the American Association of Cereal Chemists." ISBN 0-913250-86-4 (1995).
American Society of Brewing Chemists, "Methods of analysis of the American Society of Brewing Chemists." ISBN 1-886196-01-4 (1992).
B. Bonacchelli at al, "Wort boiling—the Meura's concept with wortstripping", Proceedings of the 31st International Congress of the European Brewery Convention Venice, Italy, May 6-10, 2007, Contribution No. 58, ISBN 978-90-70143-24-4.
Baur, C. and Grosch. W., "Investigation about the taste of di-, tri- and tetrahydroxy fatty acids" Z. Lebensm. Unters. Forsch. 165: 82-84 (1977).
Baur, C. et al., "Enzymatic oxidation of linoleic acid: Formation of bittertasting fatty acids" Z. Lebensm. Unters. Forsch. 164: 171-176 (1977).
Bothmer von, R. et al., "Diversity in barley (Hordeum vulgare)" In: Diversity in Barley (Hordeurn vulgare) Eds., pp. 129-136. ISBN 0-444-50587-7 (2003). Also available at http://www.genres.de.
Briggs, D.E. et al., "Malting and brewing science. vol. I Malt and sweet wort." Chapman and Hall, New York, USA, ISBN 0412165805, 1981.
Dural, S. et al., "Zinc finger nucleases: custom-designed molecular scissors for genome engineering of plant and mammalian cells," Nucleic Acids Res.33:5978-5990, 2005.
European Brewery Convention, "Analytica—EBC." ISBN 3-418-00759-7 (1998).
Groenqvist, A. et al., "Carbonyl compounds during beer production in beer" Proceedings of the 24th EBC Congress, Oslo, pp. 421-428 (1993).
Hamberg, "Trihydroxyoctadecenoic Acids in Beer: Qualitative and Quantitative Analysis", J. Agric. Food Chem., 1991, 39, p. 1568-1572.
Hansen, M. et al., "Antisense-mediated suppression of C-hordein biosynthesis in the barley grain results in correlated changes in the transcriptome, protein profile, and amino acid composition" J. Exp. Bot. 58:3987-3995 (2007).
Hirota N. et al. "Brewing performance of malted lipoxygenase-1 null barley and effect on the flavor stability of beer", Cereal Chemistry, vol. 83, No. 3, May 2008, p. 250-254.
Hotzel et al; "Recovery and characterization of residual DNA from beer as a prerequisite for the detection of genetically modified ingredients". European Food Research and Technology, Springer Verlag, Heidelberg, DE, vol. 209, No. 3-4, Jan. 1, 1999, pp. 192-196.
Hough, J. S. et al "Malting and brewing science. vol. II Hopped wort and beer" Chapman and Hall, New York, USA. ISBN 0412165902 (1982).
Iida, S. and Therada, R., "Modification of endogenous natural genes by gene targeting in rice and other higher plants." Plant Mol. Biol. 59:205-219, 2005.
Institute of Brewing, "Institute of Brewing. Methods of analysis." ISBN 0-900489-10-3, 1997.
Jamieson, A.M. and van Gheluwe, J.E.A., "Identification of a compound responsible for cardboard flavor in beer" Proc. Am. Soc. Brew. Chem. 29:192-197 (1970).
Kleinhofs, A. et al., "Induction and selection of specific gene mutations in Hordeum and Pisum." Mutat. Res. 51:29-35, 1978.
Kumar, S. et al., "Gene targeting in plants: fingers on the move." Trends Plant Sci. 11:159-161, 2006.
Kuroda et al. "Characterization of factors involved in the production of 2(E)-nonenal during mashing" Biosci. Biotechnol. Biochem., 67(4), 691-697, 2003.
Lermusieau et al. "Nonoxidative Mechanism for Development of trans-2-Nonenal in Beer", American Society of Brewing Chemists, publ. No. J-1999-0204-05R, 1999.
Liégeois, C. et al., "Release of deuterated (E)-2-nonenal during beer aging from labeled precursors synthesized before boiling" J. Agric. Food Chem. 50:7634-7638 (2002).
Maquat, L.E. and Carmichael, G.G., "Quality control of mRNA function." Cell 104:173-176, 2001.
Mellgaard, M.C., "Flavor chemistry of beer: Part II: Flavor and threshold of 239 aroma volatiles" Tech. Q. MBAA 12:151-167 (1975).
Mendell, J.T. and Dietz, H.C., "When the message goes awry: Disease-producing mutations that influence mRNA content and performance." Cell 107:411-414, 2002.
Nevo, E., "Resources for Breeding of Wild Barley." In: "Barley: Genetics, Biochemistry, Molecular Biology and Biotechnology." Shewry, P.R., ed., pp. 19-32. C.A.B. International. ISBN 0-85198-725-7 (1992).
Nyborg, M. et al., "Investigations of the protective mechanism of sulfite against beer staling and formation of adducts with trans-2-nonenal" J. Am. Soc. Brew. Chem. 57:24-28 (1999).
Rasmussen, S.K. and Hatzack, F., "Identification of two low-phytate barley (Hordeum vulgate L.) grain mutants by TLC and genetic analysis." Hereditas 129: 107-112, 1998.
Robbins, M.P. et al., "Genetic manipulation of condensed tannins in higher plants" Plant Physiol. 116: 1133-1144 (1998).
Rouck G. De et al. "Sufficient formation and removal of dimethyl sulfide (DMS) without classic wort boiling" Brewing Science, vol. 63, Feb. 2010, p. 31-40.
Sambrook, J. and Russell, D.W., "Molecular cloning. A laboratory manual, 3rd Ed.", Cold Spring Harbor Laboratory Press, Cold Spring Harbor, N.Y., 2001. ISBN 0-87969-577-3.

(56) References Cited

OTHER PUBLICATIONS

Schmitt, N.F. and van Mechelen, J.R., "Expression of lipoxygenase isoenzyme in developing barley grains" Plant Sci. 128: 141-150 (1997).
Stahl Y. et al., "Antisense downregulation of the barley limit dextrinase inhibitor modulates starch granule seizes distribution, starch composition and amylopectin structure". Plant J. 39:599-611, 2004.
Tzfira, T. and White, C., "Towards targeted mutagenesis and gene replacement in plants." Trends Biotechnol. 23:567-569, 2005.
Wu, J. et al., "Nonsense-mediated mRNA decay (NMD) silences the accumulation of aberrant trypsin proteinase inhibitor mRNA in Nicotiana attenuata." Plant J. 51:693-706, 2007.
B. Khursheed & J.C. Rogers, J. Biol. Chem. 263(35): 18953-60 (1988).
B. Yang et al., J. Am. Soc. Brew. Chem. 36(3): 85-92 (1998).
M.J. Hawkesford, Physiologia Plantarum 117: 155-163 2003.
H. Kuroda et al., Biosci. Biotechnol. Biochem. 69: 1661-68 (2005).
K. Wackerbaur & S. Meyna, Monatsschrift fur Brauwissenshaft 3/4: 52-57 (2002).
English translation of Abstract of K. Wackerbaur & S. Meyna, Monatsschrift fur Brauwissenshaft 3/4: 52-57 (2002).
F. Bourgis et al., Plant Cell 11: 1485-97 (1999).

\* cited by examiner

FIG. 10

SEQUENCE LISTING

```
<160> NUMBER OF SEQ ID NOS: 17

<210> SEQ ID NO 1
<211> LENGTH: 4165
<212> TYPE: DNA
<213> ORGANISM: Hordeum vulgare cv. Barke

<400> SEQUENCE: 1
atgctgctgg gagggctgat cgacaccctc acggggggcga acaagagcgc ccggctcaag      60
ggcacggtgg tgctcatgcg caagaacgtg ctggacctca acgacttcgg cgccaccatc     120
atcgacggca tcggcgagtt cctcggcaag ggcgtcacct gccagcttat cagctccacc     180
gccgtcgacc aaggtaatca ctaccctcct ccggccttct cctctgttta caagatatag     240
tatttctttc gtgtgggccg gcggccatgg atggatggat gtgtctggat cggctaaaga     300
agataggata gctagccctg gccggtcgtc tttacctgag catgggcata tgccatcgaa     360
aaaagagaca acagcatgca tgcatggtgc gcgcaccaga ccacgcagag caccggatgc     420
tcgagacaaa gcaacacaac aagcaaggac gacacgtcaa aagcaacaca acaagcaagg     480
acggcacgtc aaaagcaaca caaacctaaa ctaaagcaca aagacgtaag agcaagcaca     540
caatcagcag gctataaaca gttgtcatca aaaacaacgc tggaagagag agagaaggaa     600
ggaagtagta gccatgaaaa attaaatcac cgggcgttgc tcttttgccca acaattaatc     660 aagcaggata cgtggcatgt atagttcttg taagtaaact aagcatgtga tatgagaagg     720
tacgtggtgg tgcagacaac ggcggtcgcg ggaaggtggg cgcggaggcg gagctggagc     780
agtgggtgac gagcctgccg tcgctgacga cggggggagtc caagttcggc ctcaccttcg     840
actgggaggt ggagaagctc ggggtgccgg gcgccatcgt cgtcaacaac taccacagct     900
ccgagttcct gcttaaaacc atcaccctcc acgacgtccc cggccgcagc ggcaacctca     960
ccttcgtcgc caactcatgg atctaccccg ccgcaacta ccgatacagc cgcgtcttct    1020
tcgccaacga cgtgcgtgga ttttcctcta ctttcctctc ctttcatttt caccgccttc    1080
```

```
gtcattcatg gtcgatcatt aagtcttgcc aggacaatag atgatgagct aggagtggtt    1140
accacttagc agtacgtaca ttatttattc cgtgttggta gaaaaggata tggtttggtg    1200
cagatcgaca caagattgaa tgaaagttgc accgtggcac cgtggcagcg tggtaggtga    1260
aaataactgt tgcacggatc cacccacatg attgttttca tgaataaact ttttaaggat    1320
gtgtctagcc acatctagat gcatgtcaca taattattgc ataccaaaac gattaaatta    1380
agcataaaaa gaaaggaaa aaaatactca catatctcga cgtaagatca atgatatagt    1440
atttagatat gcaatattta tcttacatct aaacctttct tcattcctaa atataagaca    1500
tttgtaagat ttcactatgg acaacatacg aaacaaaatc agtggatctc tctatgcatt    1560
cattatgtag tctataataa aatctttaaa agatcgtata ttttgcaacg gagggagtaa    1620
aacataactt tttaatagta atgttgcacg gctccacact cgcagacgta cctgccgagc    1680
cagatgccgg cggcgctgaa gccgtaccgc gacgacgagc tccggaacct gcgtggcgac    1740
gaccagcagg gcccgtacca ggagcacgac cgcatctacc gctacgacgt ctacaacgac    1800
ctcggcgagg gccgcccat cctcggcggc aactccgacc cccttaccc gcgccgcggc    1860 cgcacggagc gcaagcccaa cgccagcgac ccgagcctgg agagccggct gtcgctgctg    1920
gagcagatct acgtgccgcg ggacgagaag ttcggccacc tcaagacgtc cgacttcctg    1980
ggctactcca tcaaggccat cacgcagggc atcctgccgg ccgtgcgcac ctacgtggac    2040 accaccccg gcgagttcga ctccttccag gacatcatca acctctatga gggcggcatc    2100
aagctgccca aggtggccgc cctggaggag ctccgtaagc agttcccgct ccagctcatc    2160
aaggacctcc tccccgtcgg cggcgactcc ctgcttaagc tccccgtgcc ccacatcatc    2220
caggagaaca gcaggcgtg gaggaccgac gaggagttcg cacgggaggt gctcgccggc    2280
gtcaacccgg tcatgatcac gcgtctcacg gtgagtcagc gattatttgt tcattgtgtg    2340
tgtatggtgt ccatggtgag aaagtgcaga tcttgatttg cgttgggtcg catgcacgca    2400
tgctgcatgc atgcaggagt tcccgccaaa aagtagtctg gaccctagca agtttggtga    2460
ccacaccagc accatcacgg cggagcacat agagaagaac ctcgagggcc tcacggtgca    2520
gcaggtaatt ggtccaagcc atcgacatca actatgattt acctaggagt aattggtagc    2580
tgtagataat ttggcttcgt tgcaattaat ttgatgctgg ccgatcaagt gatcgtattg    2640
ggtttgaaat ttgcaggcgc tggaaagcaa caggctgtac atccttgatc accatgaccg    2700
gttcatgccg ttcctgatcg acgtcaacaa cctgcccggc aacttcatct acgccacgag    2760
gaccctcttc ttcctgcgcg cgacggcag gctcacgccg ctcgccatcg agctgagcga    2820
gcccatcatc cagggcggcc ttaccacggc caagagcaag gtttacacgc cggtgcccag    2880
cggctccgtc gaaggctggg tgtgggagct cgccaaggcc tacgtcgccg tcaatgactc    2940
cgggtggcac cagctcgtca gccactggta cgttctccac ggtcgatgtg attcagtcag    3000
tcgatgcaca acaactgatc gaaatatgat tgattgaaac gcgcaggctg aacactcacg    3060
cggtgatgga gccgttcgtg atctcgacga accggcacct tagcgtgacg cacccggtgc    3120
acaagctgct gagcccgcac taccgcgaca ccatgaccat caacgcgctg gcgcggcaga    3180
cgctcatcaa cgccggcggc atcttcgaga tgacggtgtt cccgggcaag ttcgcgttgg    3240
ggatgtcggc cgtggtgtac aaggactgga agttcaccga gcagggactg ccggacgatc    3300
tcatcaagag gtacgtacct ggtaaatgtt atgaatgtgt aaaacaaatt gggcgtctcg    3360
ctcactgaca ggaacgtggt aaaaaaaatg caggggcatg gcggtggagg acccgtcgag    3420
cccgtacaag gtgcggttgc tggtgtcgga ctacccgtac gcggcggacg ggctggcgat    3480
```

-continued

```
ctggcacgcc attgagcagt acgtgagcga gtacctggcc atctactacc cgaacgacgg      3540
cgtgctgcag ggcgatacgg aggtgcaggc gtggtggaag gagacgcgcg aggtcgggca      3600
cggcgacctc aaggacgccc catggtggcc caagatgcaa agtgtgccgg agctggccaa      3660
ggcgtgcacc accatcatct ggatcgggtc ggcgctgcat gcggcagtca acttcgggca      3720 gtaccctac gcggggttcc tcccgaaccg ccgacggtg agccggcgcc gcatgccgga       3780
gcccggcacg gaggagtacg cggagctgga gcgcgacccg gagcgggcct tcatccacac      3840
catcacgagc cagatccaga ccatcatcgg cgtgtcgctg ctggaggtgc tgtcgaagca      3900
ctcctccgac gagctgtacc tcgggcagcg ggacacgccg gagtggacct cggacccaaa      3960
ggccctggag gtgttcaagc ggttcagcga ccggctggtg gagatcgaga gcaaggtggt      4020
gggcatgaac catgacccgg agctcaagaa ccgcaacggc ccggctaagt ttccctacat      4080
gctgctctac cccaacacct ccgaccacaa gggcgccgct gccgggctta ccgccaaggg      4140
catccccaac agcatctcca tctaa                                            4165
```

<210> SEQ ID NO 2
<211> LENGTH: 4165
<212> TYPE: DNA
<213> ORGANISM: Hordeum vulgare mutant D112

<400> SEQUENCE: 2

```
atgctgctgg gagggctgat cgacaccctc acggggggcga acaagagcgc ccggctcaag       60
ggcacggtgg tgctcatgcg caagaacgtg ctggacctca cgacttcgg cgccaccatc       120 atcgacggca tcggcgagtt cctcggcaag ggcgtcacct gccagcttat cagctccacc       180
gccgtcgacc aagtaatca ctaccctcct ccggccttct cctctgttta caagatatag       240
tatttctttc gtgtgggccg gcggccatgg atggatggat gtgtctggat cggctaaaga       300
agataggata gctagccctg gccggtcgtc tttacctgag catgggcata tgccatcgaa       360
aaaagagaca acagcatgca tgcatggtgc gcgcaccaga ccacgcagag caccggatgc       420
tcgagacaaa gcaacacaac aagcaaggac gacacgtcaa aagcaacaca acaagcaagg      480
acggcacgtc aaaagcaaca caaacctaaa ctaaagcaca aagacgtaag agcaagcaca      540
caatcagcag gctataaaca gttgtcatca aaaacaacgc tggaagagag agagaaggaa      600
ggaagtagta gccatgaaaa attaaatcac cgggcgttgc tctttgccca acaattaatc      660
aagcaggata cgtggcatgt atagttcttg taagtaaact aagcatgtga tatgagaagg      720
tacgtggtgg tgcagacaac ggcggtcgcg ggaaggtggg cgcggaggcg gagctggagc      780
agtgggtgac gagcctgccg tcgctgacga cggggggagtc caagttcggc ctcaccttcg      840
actgggaggt ggagaagctc ggggtgccgg gcgccatcgt cgtcaacaac taccacagct      900
ccgagttcct gcttaaaacc atcaccctcc acgacgtccc cggccgcagc ggcaacctca      960
ccttcgtcgc caactcatgg atctaccccg ccgccaacta ccgatacagc cgcgtcttct      1020
tcgccaacga cgtgcgtgga ttttcctcta ctttcctctc ctttcatttt caccgccttc      1080
gtcattcatg gtcgatcatt aagtcttgcc aggacaatag atgatgagct aggagtggtt      1140
accacttagc agtacgtaca ttatttattc cgtgttggta gaaaaggata tggtttggtg      1200
cagatcgaca caagattgaa tgaaagttgc accgtggcac cgtggcagcg tggtaggtga      1260
aaataactgt tgcacggatc cacccacatg attgttttca tgaataaact ttttaaggat      1320
gtgtctagcc acatctagat gcatgtcaca taattattgc ataccaaaac gattaaatta      1380
```

```
agcataaaaa gaaaaggaaa aaaatactca catatctcga cgtaagatca atgatatagt   1440
atttagatat gcaatattta tcttacatct aaacctttct tcattcctaa atataagaca   1500
tttgtaagat ttcactatgg acaacatacg aaacaaaatc agtggatctc tctatgcatt   1560
cattatgtag tctataataa aatctttaaa agatcgtata ttttgcaacg gagggagtaa   1620
aacataactt tttaatagta atgttgcacg gctccacact cgcagacgta cctgccgagc   1680
cagatgccgg cggcgctgaa gccgtaccgc gacgacgagc tccggaacct gcgtggcgac   1740
gaccagcagg gcccgtacca ggagcacgac cgcatctacc gctacgacgt ctacaacgac   1800
ctcggcgagg gccgcccat cctcggcggc aactccgacc accccttaccc cgcgccgcggc   1860 cgcacggagc gcaagcccaa cgccagcgac ccgagcctgg agagccggct gtcgctgctg   1920
gagcagatct acgtgccgcg ggacgagaag ttcggccacc tcaagacgtc cgacttcctg   1980
ggctactcca tcaaggccat cacgcagggc atcctgccgg ccgtgcgcac ctacgtggac   2040
accacccccg cgcagttcga ctccttccag gacatcatca acctctatga gggcggcatc   2100
aagctgccca aggtggccgc cctggaggag ctccgtaagc agttcccgct ccagctcatc   2160
aaggacctcc tccccgtcgg cggcgactcc ctgcttaagc tccccgtgcc ccacatcatc   2220
caggagaaca agcaggcgtg gaggaccgac gaggagttcg cacgggaggt gctcgccggc   2280
gtcaacccgg tcatgatcac gcgtctcacg gtgagtcagc gattatttgt tcattgtgtg   2340
tgtatggtgt ccatggtgag aaagtgcaga tcttgatttg cgttgggtcg catgcacgca   2400
tgctgcatgc atgcaggagt tcccgccaaa aagtagtctg gaccctagca agtttggtga   2460
ccacaccagc accatcacgg cggagcacat agagaagaac ctcgagggcc tcacggtgca   2520
gcaggtaatt ggtccaagcc atcgacatca actatgattt acctaggagt aattggtagc   2580
tgtagataat ttggcttcgt tgcaattaat ttgatgctgg ccgatcaagt gatcgtattg   2640
ggtttgaaat ttgcaggcgc tggaaagcaa caggctgtac atccttgatc accatgaccg   2700
gttcatgccg ttcctgatcg acgtcaacaa cctgcccggc aacttcatct acgccacgag   2760
gaccctcttc ttcctgcgcg cgacggcag gctcacgccg ctcgccatcg agctgagcga   2820
gcccatcatc cagggcggcc ttaccacggc caagagcaag gtttacacgc cggtgcccag   2880
cggctccgtc gaaggctggg tgtgggagct cgccaaggcc tacgtcgccg tcaatgactc   2940
cgggtggcac cagctcgtca gccactggta cgttctccac ggtcgatgtg attcagtcag   3000
tcgatgcaca acaactgatc gaaatatgat tgattgaaac gcgcaggctg aacactcacg   3060
cggtgatgga gccgttcgtg atctcgacga accggcacct agcgtgacg cacccggtgc   3120 acaagctgct gagcccgcac taccgcgaca ccatgaccat caacgcgctg gcgcggcaga   3180
cgctcatcaa cgccggcggc atcttcgaga tgacggtgtt cccgggcaag ttcgcgttgg   3240
ggatgtcggc cgtggtgtac aaggactgga agttcaccga gcagggactg ccggacgatc   3300
tcatcaagag gtacgtacct ggtaaatgtt atgaatgtgt aaaacaaatt gggcgtctcg   3360
ctcactgaca ggaacgtggt aaaaaaaatg caggggcatg gcggtggagg acccgtcgag   3420
cccgtacaag gtgcggttgc tggtgtcgga ctacccgtac gcggcggacg ggctggcgat   3480
ctggcacgcc attgagcagt acgtgagcga gtacctggcc atctactacc gaacgacgg   3540 cgtgctgcag ggcgatacgg aggtgcaggc gtgatggaag gagacgcgcg aggtcgggca   3600
cggcgacctc aaggacgccc catggtggcc caagatgcaa agtgtgccgg agctggccaa   3660
ggcgtgcacc accatcatct ggatcgggtc ggcgctgcat gcgcagtca acttcgggca   3720 gtacccctac gcggggttcc tcccgaaccg gccgacggtg agccggcgcc gcatgccgga   3780
```

-continued

```
gcccggcacg gaggagtacg cggagctgga gcgcgacccg gagcgggcct tcatccacac   3840
catcacgagc cagatccaga ccatcatcgg cgtgtcgctg ctggaggtgc tgtcgaagca   3900
ctcctccgac gagctgtacc tcgggcagcg ggacacgccg gagtggacct cggacccaaa   3960
ggccctggag gtgttcaagc ggttcagcga ccggctggtg gagatcgaga gcaaggtggt   4020
gggcatgaac catgacccgg agctcaagaa ccgcaacggc ccggctaagt ttccctacat   4080
gctgctctac cccaacaccct ccgaccacaa gggcgccgct gccgggctta ccgccaaggg   4140
catccccaac agcatctcca tctaa                                         4165
```

<210> SEQ ID NO 3
<211> LENGTH: 862
<212> TYPE: PRT
<213> ORGANISM: Hordeum vulgare cv. Barke

<400> SEQUENCE: 3

```
Met Leu Leu Gly Gly Leu Ile Asp Thr Leu Thr Gly Ala Asn Lys Ser
1               5                   10                  15

Ala Arg Leu Lys Gly Thr Val Val Leu Met Arg Lys Asn Val Leu Asp
            20                  25                  30

Leu Asn Asp Phe Gly Ala Thr Ile Ile Asp Gly Ile Gly Glu Phe Leu
        35                  40                  45

Gly Lys Gly Val Thr Cys Gln Leu Ile Ser Ser Thr Ala Val Asp Gln
    50                  55                  60

Asp Asn Gly Gly Arg Gly Lys Val Gly Ala Glu Ala Glu Leu Glu Gln
65                  70                  75                  80

Trp Val Thr Ser Leu Pro Ser Leu Thr Thr Gly Glu Ser Lys Phe Gly
                85                  90                  95

Leu Thr Phe Asp Trp Glu Val Glu Lys Leu Gly Val Pro Gly Ala Ile
            100                 105                 110

Val Val Asn Asn Tyr His Ser Ser Glu Phe Leu Leu Lys Thr Ile Thr
        115                 120                 125

Leu His Asp Val Pro Gly Arg Ser Gly Asn Leu Thr Phe Val Ala Asn
    130                 135                 140

Ser Trp Ile Tyr Pro Ala Ala Asn Tyr Arg Tyr Ser Arg Val Phe Phe
145                 150                 155                 160

Ala Asn Asp Thr Tyr Leu Pro Ser Gln Met Pro Ala Ala Leu Lys Pro
                165                 170                 175

Tyr Arg Asp Asp Glu Leu Arg Asn Leu Arg Gly Asp Asp Gln Gln Gly
            180                 185                 190

Pro Tyr Gln Glu His Asp Arg Ile Tyr Arg Tyr Asp Val Tyr Asn Asp
        195                 200                 205

Leu Gly Glu Gly Arg Pro Ile Leu Gly Gly Asn Ser Asp His Pro Tyr
    210                 215                 220

Pro Arg Arg Gly Arg Thr Glu Arg Lys Pro Asn Ala Ser Asp Pro Ser
225                 230                 235                 240

Leu Glu Ser Arg Leu Ser Leu Leu Glu Gln Ile Tyr Val Pro Arg Asp
                245                 250                 255

Glu Lys Phe Gly His Leu Lys Ser Asp Phe Leu Gly Tyr Ser Ile
            260                 265                 270

Lys Ala Ile Thr Gln Gly Ile Leu Pro Ala Val Arg Thr Tyr Val Asp
        275                 280                 285

Thr Thr Pro Gly Glu Phe Asp Ser Phe Gln Asp Ile Ile Asn Leu Tyr
    290                 295                 300
```

```
Glu Gly Gly Ile Lys Leu Pro Lys Val Ala Ala Leu Glu Glu Leu Arg
305                 310                 315                 320

Lys Gln Phe Pro Leu Gln Leu Ile Lys Asp Leu Leu Pro Val Gly Gly
            325                 330                 335

Asp Ser Leu Leu Lys Leu Pro Val Pro His Ile Ile Gln Glu Asn Lys
            340                 345                 350

Gln Ala Trp Arg Thr Asp Glu Glu Phe Ala Arg Glu Val Leu Ala Gly
            355                 360                 365

Val Asn Pro Val Met Ile Thr Arg Leu Thr Glu Phe Pro Pro Lys Ser
370                 375                 380

Ser Leu Asp Pro Ser Lys Phe Gly Asp His Thr Ser Thr Ile Thr Ala
385                 390                 395                 400

Glu His Ile Glu Lys Asn Leu Glu Gly Leu Thr Val Gln Gln Ala Leu
            405                 410                 415

Glu Ser Asn Arg Leu Tyr Ile Leu Asp His His Asp Arg Phe Met Pro
            420                 425                 430

Phe Leu Ile Asp Val Asn Asn Leu Pro Gly Asn Phe Ile Tyr Ala Thr
            435                 440                 445

Arg Thr Leu Phe Phe Leu Arg Gly Asp Gly Arg Leu Thr Pro Leu Ala
            450                 455                 460

Ile Glu Leu Ser Glu Pro Ile Ile Gln Gly Gly Leu Thr Thr Ala Lys
465                 470                 475                 480

Ser Lys Val Tyr Thr Pro Val Pro Ser Gly Ser Val Glu Gly Trp Val
                485                 490                 495

Trp Glu Leu Ala Lys Ala Tyr Val Ala Val Asn Asp Ser Gly Trp His
            500                 505                 510

Gln Leu Val Ser His Trp Leu Asn Thr His Ala Val Met Glu Pro Phe
            515                 520                 525

Val Ile Ser Thr Asn Arg His Leu Ser Val Thr His Pro Val His Lys
530                 535                 540

Leu Leu Ser Pro His Tyr Arg Asp Thr Met Thr Ile Asn Ala Leu Ala
545                 550                 555                 560

Arg Gln Thr Leu Ile Asn Ala Gly Gly Ile Phe Glu Met Thr Val Phe
            565                 570                 575

Pro Gly Lys Phe Ala Leu Gly Met Ser Ala Val Val Tyr Lys Asp Trp
            580                 585                 590

Lys Phe Thr Glu Gln Gly Leu Pro Asp Asp Leu Ile Lys Arg Gly Met
            595                 600                 605

Ala Val Glu Asp Pro Ser Ser Pro Tyr Lys Val Arg Leu Leu Val Ser
            610                 615                 620

Asp Tyr Pro Tyr Ala Ala Asp Gly Leu Ala Ile Trp His Ala Ile Glu
625                 630                 635                 640

Gln Tyr Val Ser Glu Tyr Leu Ala Ile Tyr Tyr Pro Asn Asp Gly Val
            645                 650                 655

Leu Gln Gly Asp Thr Glu Val Gln Ala Trp Trp Lys Glu Thr Arg Glu
            660                 665                 670

Val Gly His Gly Asp Leu Lys Asp Ala Pro Trp Trp Pro Lys Met Gln
            675                 680                 685

Ser Val Pro Glu Leu Ala Lys Ala Cys Thr Thr Ile Ile Trp Ile Gly
            690                 695                 700

Ser Ala Leu His Ala Ala Val Asn Phe Gly Gln Tyr Pro Tyr Ala Gly
705                 710                 715                 720
```

```
Phe Leu Pro Asn Arg Pro Thr Val Ser Arg Arg Met Pro Glu Pro
            725                 730                 735

Gly Thr Glu Glu Tyr Ala Glu Leu Glu Arg Asp Pro Gly Arg Ala Phe
        740                 745                 750

Ile His Thr Ile Thr Ser Gln Ile Gln Thr Ile Ile Gly Val Ser Leu
        755                 760                 765

Leu Glu Val Leu Ser Lys His Ser Ser Asp Glu Leu Tyr Leu Gly Gln
        770                 775                 780

Arg Asp Thr Pro Glu Trp Thr Ser Asp Pro Lys Ala Leu Glu Val Phe
785                 790                 795                 800

Lys Arg Phe Ser Asp Arg Leu Val Glu Ile Glu Ser Lys Val Val Gly
                805                 810                 815

Met Asn His Asp Pro Glu Leu Lys Asn Arg Asn Gly Pro Ala Lys Phe
            820                 825                 830

Pro Tyr Met Leu Leu Tyr Pro Asn Thr Ser Asp His Lys Gly Ala Ala
            835                 840                 845

Ala Gly Leu Thr Ala Lys Gly Ile Pro Asn Ser Ile Ser Ile
            850                 855                 860

<210> SEQ ID NO 4
<211> LENGTH: 665
<212> TYPE: PRT
<213> ORGANISM: Hordeum vulgare mutant D112

<400> SEQUENCE: 4

Met Leu Leu Gly Gly Leu Ile Asp Thr Leu Thr Gly Ala Asn Lys Ser
1               5                   10                  15

Ala Arg Leu Lys Gly Thr Val Val Leu Met Arg Lys Asn Val Leu Asp
                20                  25                  30

Leu Asn Asp Phe Gly Ala Thr Ile Ile Asp Gly Ile Gly Glu Phe Leu
            35                  40                  45

Gly Lys Gly Val Thr Cys Gln Leu Ile Ser Ser Thr Ala Val Asp Gln
        50                  55                  60

Asp Asn Gly Gly Arg Gly Lys Val Gly Ala Glu Ala Glu Leu Glu Gln
65                  70                  75                  80

Trp Val Thr Ser Leu Pro Ser Leu Thr Thr Gly Glu Ser Lys Phe Gly
                85                  90                  95

Leu Thr Phe Asp Trp Glu Val Glu Lys Leu Gly Val Pro Gly Ala Ile
            100                 105                 110

Val Val Asn Asn Tyr His Ser Ser Glu Phe Leu Leu Lys Thr Ile Thr
        115                 120                 125

Leu His Asp Val Pro Gly Arg Ser Gly Asn Leu Thr Phe Val Ala Asn
    130                 135                 140

Ser Trp Ile Tyr Pro Ala Ala Asn Tyr Arg Tyr Ser Arg Val Phe Phe
145                 150                 155                 160

Ala Asn Asp Thr Tyr Leu Pro Ser Gln Met Pro Ala Ala Leu Lys Pro
                165                 170                 175

Tyr Arg Asp Asp Glu Leu Arg Asn Leu Arg Gly Asp Gln Gln Gly
            180                 185                 190

Pro Tyr Gln Glu His Asp Arg Ile Tyr Arg Tyr Asp Val Tyr Asn Asp
        195                 200                 205

Leu Gly Glu Gly Arg Pro Ile Leu Gly Gly Asn Ser Asp His Pro Tyr
    210                 215                 220

Pro Arg Arg Gly Arg Thr Glu Arg Lys Pro Asn Ala Ser Asp Pro Ser
225                 230                 235                 240
```

-continued

```
Leu Glu Ser Arg Leu Ser Leu Glu Gln Ile Tyr Val Pro Arg Asp
            245                 250                 255

Glu Lys Phe Gly His Leu Lys Thr Ser Asp Phe Leu Gly Tyr Ser Ile
                260                 265                 270

Lys Ala Ile Thr Gln Gly Ile Leu Pro Ala Val Arg Thr Tyr Val Asp
            275                 280                 285

Thr Thr Pro Gly Glu Phe Asp Ser Phe Gln Asp Ile Ile Asn Leu Tyr
        290                 295                 300

Glu Gly Gly Ile Lys Leu Pro Lys Val Ala Leu Glu Glu Leu Arg
305                 310                 315                 320

Lys Gln Phe Pro Leu Gln Leu Ile Lys Asp Leu Leu Pro Val Gly Gly
                325                 330                 335

Asp Ser Leu Leu Lys Leu Pro Val Pro His Ile Ile Gln Glu Asn Lys
            340                 345                 350

Gln Ala Trp Arg Thr Asp Glu Glu Phe Ala Arg Glu Val Leu Ala Gly
                355                 360                 365

Val Asn Pro Val Met Ile Thr Arg Leu Thr Glu Phe Pro Pro Lys Ser
        370                 375                 380

Ser Leu Asp Pro Ser Lys Phe Gly Asp His Thr Ser Thr Ile Thr Ala
385                 390                 395                 400

Glu His Ile Glu Lys Asn Leu Glu Gly Leu Thr Val Gln Gln Ala Leu
                405                 410                 415

Glu Ser Asn Arg Leu Tyr Ile Leu Asp His His Asp Arg Phe Met Pro
            420                 425                 430

Phe Leu Ile Asp Val Asn Asn Leu Pro Gly Asn Phe Ile Tyr Ala Thr
        435                 440                 445

Arg Thr Leu Phe Phe Leu Arg Gly Asp Gly Arg Leu Thr Pro Leu Ala
    450                 455                 460

Ile Glu Leu Ser Glu Pro Ile Ile Gln Gly Gly Leu Thr Thr Ala Lys
465                 470                 475                 480

Ser Lys Val Tyr Thr Pro Val Pro Ser Gly Ser Val Glu Gly Trp Val
                485                 490                 495

Trp Glu Leu Ala Lys Ala Tyr Val Ala Val Asn Asp Ser Gly Trp His
            500                 505                 510

Gln Leu Val Ser His Trp Leu Asn Thr His Ala Val Met Glu Pro Phe
        515                 520                 525

Val Ile Ser Thr Asn Arg His Leu Ser Val Thr His Pro Val His Lys
    530                 535                 540

Leu Leu Ser Pro His Tyr Arg Asp Thr Met Thr Ile Asn Ala Leu Ala
545                 550                 555                 560

Arg Gln Thr Leu Ile Asn Ala Gly Gly Ile Phe Glu Met Thr Val Phe
                565                 570                 575

Pro Gly Lys Phe Ala Leu Gly Met Ser Ala Val Val Tyr Lys Asp Trp
            580                 585                 590

Lys Phe Thr Glu Gln Gly Leu Pro Asp Asp Leu Ile Lys Arg Gly Met
        595                 600                 605

Ala Val Glu Asp Pro Ser Ser Pro Tyr Lys Val Arg Leu Leu Val Ser
    610                 615                 620

Asp Tyr Pro Tyr Ala Ala Asp Gly Leu Ala Ile Trp His Ala Ile Glu
625                 630                 635                 640

Gln Tyr Val Ser Glu Tyr Leu Ala Ile Tyr Tyr Pro Asn Asp Gly Val
                645                 650                 655
```

Leu Gln Gly Asp Thr Glu Val Gln Ala
        660                 665

<210> SEQ ID NO 5
<211> LENGTH: 3229
<212> TYPE: DNA
<213> ORGANISM: Hordeum vulgare cv: Barke

<400> SEQUENCE: 5

| | | | | | |
|---|---|---|---|---|---|
| atgtttggcg | tcggcggcat | cgtgagcgac | ctgacggggg | gcctccgggg | cgcccacctc | 60 |
| aagggctccg | tcgtcctcat | gcgcaagaac | gcgctcgact | tcaacgactt | cggcgccacc | 120 |
| gtcatggacg | cgtcaccga | gctcctcggc | cgcggcgtca | cctgccagct | catcagctcc | 180 |
| accaacgtcg | accacagtga | gcactcactc | gccactcccc | gttttgtaat | ccctgccact | 240 |
| gtgatacatg | gaaaacggaa | gcagatccgc | atcctcacgc | ccgaaccaag | caaataatat | 300 |
| atataaagaa | ctaaaatgca | cgtatggtta | cggatgcatg | cttatgcttg | agcttgagct | 360 |
| tgagcttgag | agacagggac | gtgcaaaaaa | taacttaata | atggagtaac | taatgtgaga | 420 |
| catgacgcac | ggagggtttt | accttactac | taattaattg | tcgagcagac | aacggtgggc | 480 |
| gcgggaaggt | gggcgcggag | gcgaacctgg | agcagtggct | cctgccgacg | aacctgccgt | 540 |
| tcatcaccac | cggcgagaac | aagttcgccg | tcaccttcga | ctggtcggtg | gacaagctgg | 600 |
| gggtgccggg | ggccatcatc | gtcaagaaca | ccacgcctc | cgagttcttc | ctcaagacca | 660 |
| tcaccctcga | caacgtgccc | ggccgcggca | ccatcgtctt | cgtcgccaac | tcatgggtct | 720 |
| acccgcaggc | caagtaccgc | tacaaccgcg | tcttcttcgc | caacgacgtg | agtatttat | 780 |
| acgagtacca | ctccatggta | gctagtacga | tggatttcgc | ttgctcgatg | cctgactggt | 840 |
| cggttccgtt | gggacatacg | tgccgcagac | gtacctgccg | caccagatgc | cggcggcgct | 900 |
| gaagccgtac | cgcgacgacg | agctccggaa | cctgaggggc | gacgaccagc | aggggccta | 960 |
| cctggaccac | gaccgcgtct | accgctacga | cgtctacaac | gacctcggcg | actcccgcga | 1020 |
| cgtcctcggc | ggctccaagg | acctcccta | cccgcgccgc | tgccgcaccg | gccggaagcc | 1080 |
| ctcggacagc | agtgcgtgtc | tcctcccttc | tccttccttt | cgatctcccc | ataacgtgta | 1140 |
| cttggtctga | caagcatgtg | tggccgacgc | agagcccgac | cacgagagcc | ggctgctgcc | 1200 |
| gctggtgcag | aacgtctacg | tgccgcgcga | cgagctcttc | ggccacctca | agcagtcgga | 1260 |
| cttcctgggc | tacacgctca | aggcgctggt | ggacgggatc | ataccggcca | tccgcaccta | 1320 |
| cgtcgacctc | tcccccggcg | agttcgactc | cttcgccgac | atcctcaagc | tctacgaggg | 1380 |
| cggcatcaag | ctgcccaaca | tcccggccct | cgaggaggtg | cgcaagcgct | cccgctcca | 1440 |
| gctcgtcaag | gacctcatcc | ccaagggcgg | cgacttcctc | ctcaagctcc | caagccgga | 1500 |
| gatcatcaag | gtagaccaga | aagcgtggat | gactgacgag | gagttcgcca | gggagatgct | 1560 |
| cgccggcgtc | aaccccatga | tgatcaaacg | cctcaccgtg | agtgacccac | tccatctacc | 1620 |
| ggccattgaa | caaaatcgtc | catacatgtc | actaatcaat | actcacaccg | ttttgaccgc | 1680 |
| gtgtgcagga | gttccctccc | aagagcactc | tggatccgag | caagtacggc | gaccacacca | 1740 |
| gcaccatgac | cgaggagcac | gtggccaaga | gcctggaggg | cctcaccgtg | cagcaggcgc | 1800 |
| tcgccggcaa | caggctctac | atcgtagacc | agcacgacaa | cctgatgccg | ttcctgatcg | 1860 |
| acatcaacaa | cctcgacgcc | agcttcgtgt | acgccacaag | gacgctgctc | ttcctgcgag | 1920 |
| gggacggcac | gctggcgccg | gtcgccatcg | agctgagctc | gccgctgatc | cagggcgagc | 1980 |
| tgaccaccgc | caagagcgcc | gtgtacacgc | cgcagcacgc | cggcgtggag | ggctggatat | 2040 |

-continued

```
ggcagctcgc caaggcctac gcctccgtga acgactacgg gtggcaccag ctcatcagcc    2100
actggctcaa cacgcacgcc gtcatggagc ccttcgtcat cgccaccaac aggcagctca    2160
gcgtcaccca cccggtctac aagctcctgc acccgcacta ccgcgacacc atgaacatca    2220
acgcgcgggc gcgcgggctg ctcatcaacg ccggcggcgt catcgagatg accgtgttcc    2280
cgcacaagca cgccatgccc atgtcctcca tggtctacaa gcactggaac ttcaccgaac    2340
aagctctccc cgccgatcta atcaagaggt gcaacatgtt tacattatat aattgacgaa    2400
acggtccttg atttgatcaa aatgattaat cgatcttgat ggttgatgat gatgtagggg    2460
catggcggtg gaggacgcat cgagcccgca caaggtgcgg ctgctgatca aggactaccc    2520
gtacgcgacc gacgggctgg ccgtgtggga cgccatcgag cagtgggtgt cggactacct    2580
gaccatctac taccccaacg acggcgtgct gcagggcgac gtggagctgc aggcgtggtg    2640
gaaggaggtg agggaggtcg gcacggcga cctcaaggac gcggcgtggt ggccaaagat    2700
gcagacggtg gcggagctga tcaaggcgtg cgccaccatc atctggaccg gtcggcgct    2760 ccacgcggcc gtcaacttcg ggcagtaccc ctactcgggc taccacccca caagccgtc    2820 ggcgagccgg aggccgatgc cggtgcaggg gagcgaggag tacgcggagc tggagcgaga    2880
cccggagaag gccttcatcc gcaccatcac cagccagttc catgccctgg tgggcatctc    2940
gctcatggag atcctctcca agcactcctc cgacgaggtc tacctgggcc agcacgacac    3000
gccggcgtgg acgtcggacg ccaaggcgct ggaggcgttc aagcggttcg gggcgaagct    3060
ggagggcatc gagaagcagg tggtggccat gaactcggac ccgcagctaa gaaccgcac    3120 cgggccggcc aagttcccat acatgctgct ctacccaaac acctccgacc acacgggaca    3180
ggccgagggg ctcaccgcca gggcatccc gaacagcata tccatctga              3229
```

<210> SEQ ID NO 6
<211> LENGTH: 3229
<212> TYPE: DNA
<213> ORGANISM: Hordeum vulgare Mutant A689

<400> SEQUENCE: 6

```
atgtttggcg tcggcggcat cgtgagcgac ctgacggggg gcctccgggg cgcccacctc     60
aagggctccg tcgtcctcat gcgcaagaac gcgctcgact tcaacgactt cggcgccacc    120
gtcatggacg cgtcaccga gctcctcggc gcggcgtca cctgccagct catcagctcc    180
accaacgtcg accacagtga gcactcactc gccactcccc gttttgtaat ccctgccact    240
gtgatacatg gaaaacggaa gcagatccgc atcctcacgc ccgaaccaag caaataatat    300
atataaagaa ctaaaatgca cgtatggtta cggatgcatg cttatgcttg agcttgagct    360
tgagcttgag agacagggac gtgcaaaaaa taacttaata atggagtaac taatgtgaga    420
catgacgcac ggagggggttt accttactac taattaattg tcgagcagac aacggtgggc    480 gcggaaggt gggcgcggag gcgaacctgg agcagtggct cctgccgacg aacctgccgt    540
tcatcaccac cggcgagaac aagttcgccg tcaccttcga ctggtcggtg acaagctgg    600 gggtgccggg ggccatcatc gtcaagaaca accacgcctc cgagttcttc ctcaagacca    660
tcaccctcga caacgtgccc ggccgcggca ccatcgtctt cgtcgccaac tcatgggtct    720
acccgcaggc caagtaccgc tacaaccgcg tcttcttcgc caacgacgtg agtatttat    780 acgagtacca ctccatggta gctagtacga tggattcgc ttgctcgatg cctgactggt    840
cggttccgtt gggacatacg tgccgcagac gtacctgccg caccagatgc cggcggcgct    900
gaagccgtac cgcgacgacg agctccggaa cctgaggggc gacgaccagc agggccccta    960
```

```
cctggaccac gaccgcgtct accgctacga cgtctacaac gacctcggcg actcccgcga    1020
cgtcctcggc ggctccaagg acctcccta cccgcgccgc tgccgcaccg gccggaagcc     1080
ctcggacagc agtgcgtgtc tcctcccttc tccttccttt cgatctcccc ataacgtgta    1140
cttggtctga caagcatgtg tggccgacgc agagcccgac cacgagagcc ggctgctgcc    1200
gctggtgcag aacgtctacg tgccgcgcga cgagctcttc ggccacctca agcagtcgga    1260
cttcctgggc tacacgctca aggcgctggt ggacgggatc ataccggcca tccgcaccta    1320
cgtcgacctc tccccggcg agttcgactc cttcgccgac atcctcaagc tctacgaggg     1380
cggcatcaag ctgcccaaca tcccggccct cgaggaggtg cgcaagcgct cccgctcca    1440
gctcgtcaag gacctcatcc ccaagggcgg cgacttcctc ctcaagctcc ccaagccgga    1500
gatcatcaag gtagaccaga aagcgtggat gactgacgag gagttcgcca gggagatgct    1560
cgccggcgtc aaccccatga tgatcaaacg cctcaccgtg agtgacccac tccatctacc    1620
ggccattgaa caaaatcgtc catacatgtc actaatcaat actcacaccg ttttgaccgc    1680
gtgtgcagga gttccctccc aagagcactc tggatccgag caagtacggc gaccacacca    1740
gcaccatgac cgaggagcac gtggccaaga gcctggaggg cctcaccgtg cagcaggcgc    1800
tcgccggcaa caggctctac atcgtagacc agcacgacaa cctgatgccg ttcctgatcg    1860
acatcaacaa cctcgacgcc agcttcgtgt acgccacaag gacgctgctc ttcctgcgag    1920
gggacggcac gctggcgccg gtcgccatcg agctgagctc gccgctgatc cagggcgagc    1980
tgaccaccgc caagagcgcc gtgtacacgc cgcagcacgc cggcgtggag ggctggatat    2040
ggcagctcgc caaggcctac gcctccgtga acgactacgg gtggcaccag ctcatcagcc    2100
actggctcaa cacgcacgcc gtcatggagc ccttcgtcat cgccaccaac aggcagctca    2160
gcgtcaccca cccggtctac aagctcctgc acccgcacta ccgcgacacc atgaacatca    2220
acgcgcgggc gcgcgggctg ctcatcaacg ccggcggcgt catcgagatg accgtgttcc    2280
cgcacaagca cgccatgccc atgtcctcca tggtctacaa gcactggaac ttcaccgaac    2340
aagctctccc cgccgatcta atcaagaggt gcaacatgtt tacattatat aattgacgaa    2400
acggtccttg atttgatcaa aatgattaat cgatcttgat ggttgatgat gatgtagggg    2460
catggcggtg gaggacgcat cgagcccgca caaggtgcgg ctgctgatca aggactaccc    2520
gtacgcgacc gacgggctgg ccgtgtggga cgccatcgag cagtgggtgt cggactacct    2580
gaccatctac taccccaacg acggcgtgct gcagggcgac gtggagctgc aggcgtggtg    2640
gaaggaggtg agggaggtcg ggcacggcga cctcaaggac gcggcgtgat ggccaaagat    2700
gcagacggtg gcggagctga tcaaggcgtg cgccaccatc atctggaccg ggtcggcgct    2760
ccacgcggcc gtcaacttcg ggcagtaccc ctactcgggc taccacccca acaagccgtc    2820
ggcgagccgg aggccgatgc cggtgcaggg gagcgaggag tacgcggagc tggagcgaga    2880
cccggagaag gccttcatcc gcaccatcac cagccagttc catgccctgg tgggcatctc    2940
gctcatggag atcctctcca agcactcctc cgacgaggtc tacctgggcc agcacgacac    3000
gccggcgtgg acgtcggacg ccaaggcgct ggaggcgttc aagcggttcg gggcgaagct    3060
ggagggcatc gagaagcagg tggtggccat gaactcggac ccgcagctaa agaaccgcac    3120
cgggccggcc aagttcccat acatgctgct ctacccaaac acctccgacc acacgggaca    3180
ggccgagggg ctcaccgcca ggggcatccc gaacagcata tccatctga                3229
```

<210> SEQ ID NO 7

```
<211> LENGTH: 864
<212> TYPE: PRT
<213> ORGANISM: Hordeum vulgare cv: Barke

<400> SEQUENCE: 7

Met Leu Gly Val Gly Gly Ile Val Ser Asp Leu Thr Gly Gly Ile Arg
1               5                   10                  15

Gly Ala His Leu Lys Gly Ser Val Val Leu Met Arg Lys Asn Ala Leu
            20                  25                  30

Asp Phe Asn Asp Phe Gly Ala His Val Met Asp Gly Val Thr Glu Leu
        35                  40                  45

Leu Gly Arg Gly Val Thr Cys Gln Leu Ile Ser Ser Thr Asn Val Asp
50                  55                  60

His Asn Asn Gly Gly Arg Gly Lys Val Gly Ala Glu Ala Asn Leu Glu
65                  70                  75                  80

Gln Trp Leu Leu Pro Thr Asn Leu Pro Phe Ile Thr Thr Gly Glu Asn
                85                  90                  95

Lys Phe Ala Val Thr Phe Asp Trp Ser Val Asp Lys Leu Gly Val Pro
            100                 105                 110

Gly Ala Ile Ile Val Lys Asn Asn His Ala Ser Glu Phe Phe Leu Lys
        115                 120                 125

Thr Ile Thr Leu Asp Asn Val Pro Gly Arg Gly Thr Ile Val Phe Val
130                 135                 140

Ala Asn Ser Trp Val Tyr Pro Gln Ala Lys Tyr Arg Tyr Asn Arg Val
145                 150                 155                 160

Phe Phe Ala Asn Asp Thr Tyr Leu Pro His Gln Met Pro Ala Ala Leu
                165                 170                 175

Lys Pro Tyr Arg Asp Asp Glu Leu Arg Asn Leu Arg Gly Asp Asp Gln
            180                 185                 190

Gln Gly Pro Tyr Leu Asp His Asp Arg Val Tyr Arg Tyr Asp Val Tyr
        195                 200                 205

Asn Asp Leu Gly Asp Ser Arg Asp Val Leu Gly Gly Ser Lys Asp Leu
210                 215                 220

Pro Tyr Pro Arg Arg Cys Arg Thr Gly Arg Lys Pro Ser Asp Ser Lys
225                 230                 235                 240

Pro Asp His Glu Ser Arg Leu Leu Leu Val Gln Asn Val Tyr Val
                245                 250                 255

Leu Arg Asp Glu Leu Phe Gly His Leu Lys Gln Ser Asp Leu Leu Gly
            260                 265                 270

Tyr Thr Leu Lys Gly Trp Leu Asp Gly Ile Ile Leu Ala Ile Arg Thr
        275                 280                 285

Tyr Val Asp Leu Ser Pro Gly Glu Phe Asp Ser Phe Ala Asp Ile Leu
290                 295                 300

Lys Leu Tyr Glu Gly Gly Ile Lys Leu Pro Asn Ile Pro Ala Leu Glu
305                 310                 315                 320

Glu Val Arg Lys Arg Phe Pro Leu Gln Leu Val Lys Asp Leu Ile Pro
                325                 330                 335

Lys Gly Gly Asp Phe Leu Leu Lys Leu Pro Lys Pro Glu Ile Ile Lys
            340                 345                 350

Val Asp Gln Lys Ala Trp Met Thr Asp Glu Glu Phe Ala Arg Glu Met
        355                 360                 365

Leu Ala Gly Val Asn Pro Met Met Ile Lys Arg Leu Thr Glu Phe Pro
370                 375                 380

Pro Lys Ser Thr Leu Asp Pro Ser Lys Tyr Gly Asp His Thr Ser Thr
```

```
            385                 390                 395                 400
        Met Thr Glu Glu His Val Ala Lys Ser Leu Glu Gly Leu Thr Val Gln
                            405                 410                 415

Gln Ala Leu Ala Gly Asn Arg Leu Tyr Ile Val Asp Gln His Asp Asn
                            420                 425                 430

Leu Met Pro Phe Leu Ile Asp Ile Asn Asn Leu Asp Ala Ser Phe Val
                            435                 440                 445

Tyr Ala Thr Arg Thr Leu Leu Phe Leu Arg Gly Asp Gly Thr Leu Ala
                    450                 455                 460

Pro Val Ala Ile Glu Leu Ser Ser Pro Leu Ile Gln Gly Glu Leu Thr
        465                 470                 475                 480

Thr Ala Lys Ser Ala Val Tyr Thr Pro Gln His Ala Gly Val Glu Gly
                            485                 490                 495

Trp Ile Trp Gln Leu Ala Lys Ala Tyr Ala Ser Val Asn Asp Tyr Gly
                            500                 505                 510

Trp His Gln Leu Ile Ser His Trp Leu Asn Thr His Ala Val Met Glu
                            515                 520                 525

Pro Phe Val Ile Ala Thr Asn Arg Gln Leu Ser Val Thr His Pro Val
                    530                 535                 540

Tyr Lys Leu Leu His Pro His Tyr Arg Asp Thr Met Asn Ile Asn Ala
        545                 550                 555                 560

Arg Ala Arg Gly Leu Leu Ile Asn Ala Gly Gly Val Ile Glu Met Thr
                            565                 570                 575

Val Phe Pro His Lys His Ala Met Pro Met Ser Ser Met Val Tyr Lys
                            580                 585                 590

His Trp Asn Phe Thr Glu Gln Ala Leu Pro Ala Asp Leu Ile Lys Arg
                            595                 600                 605

Gly Met Ala Val Glu Asp Ala Ser Ser Pro His Lys Val Arg Leu Leu
                    610                 615                 620

Ile Lys Asp Tyr Pro Tyr Ala Thr Asp Gly Leu Ala Val Trp Asp Ala
        625                 630                 635                 640

Ile Glu Gln Trp Val Ser Asp Tyr Leu Thr Ile Tyr Tyr Pro Asn Asp
                            645                 650                 655

Gly Val Leu Gln Gly Asp Val Glu Leu Gln Ala Trp Trp Lys Glu Val
                            660                 665                 670

Arg Glu Val Gly His Gly Asp Leu Lys Asp Ala Ala Trp Trp Pro Lys
                            675                 680                 685

Met Gln Thr Val Ala Glu Leu Ile Lys Ala Cys Ala Thr Ile Ile Trp
                    690                 695                 700

Thr Gly Ser Ala Leu His Ala Ala Val Asn Phe Gly Gln Tyr Pro Tyr
        705                 710                 715                 720

Ser Gly Tyr His Pro Asn Lys Pro Ser Ala Ser Arg Arg Pro Met Pro
                            725                 730                 735

Val Gln Gly Ser Glu Glu Tyr Ala Glu Leu Glu Arg Asp Pro Glu Lys
                            740                 745                 750

Ala Phe Ile Arg Thr Ile Thr Ser Gln Phe His Ala Leu Val Gly Ile
                            755                 760                 765

Ser Leu Met Glu Ile Leu Ser Lys His Ser Ser Asp Glu Val Tyr Leu
                    770                 775                 780

Gly Gln His Asp Thr Pro Ala Trp Thr Ser Asp Ala Lys Ala Leu Glu
        785                 790                 795                 800

Ala Phe Lys Arg Phe Gly Ala Lys Leu Glu Gly Ile Glu Lys Gln Val
                            805                 810                 815
```

```
Val Ala Met Asn Ser Asp Pro Gln Leu Lys Asn Arg Thr Gly Pro Ala
            820                 825                 830

Lys Phe Pro Tyr Met Leu Leu Tyr Pro Asn Thr Ser Asp His Thr Gly
        835                 840                 845

Gln Ala Glu Gly Leu Thr Ala Arg Gly Ile Pro Asn Ser Ile Ser Ile
850                 855                 860

<210> SEQ ID NO 8
<211> LENGTH: 684
<212> TYPE: PRT
<213> ORGANISM: Hordeum vulgare mutant A689

<400> SEQUENCE: 8

Met Leu Gly Val Gly Ile Val Ser Asp Leu Thr Gly Gly Ile Arg
1               5                   10                  15

Gly Ala His Leu Lys Gly Ser Val Val Leu Met Arg Lys Asn Ala Leu
                20                  25                  30

Asp Phe Asn Asp Phe Gly Ala His Val Met Asp Gly Val Thr Glu Leu
            35                  40                  45

Leu Gly Arg Gly Val Thr Cys Gln Leu Ile Ser Ser Thr Asn Val Asp
50                  55                  60

His Asn Asn Gly Gly Arg Gly Lys Val Gly Ala Glu Ala Asn Leu Glu
65                  70                  75                  80

Gln Trp Leu Leu Pro Thr Asn Leu Pro Phe Ile Thr Thr Gly Glu Asn
                85                  90                  95

Lys Phe Ala Val Thr Phe Asp Trp Ser Val Asp Lys Leu Gly Val Pro
            100                 105                 110

Gly Ala Ile Ile Val Lys Asn Asn His Ala Ser Glu Phe Phe Leu Lys
        115                 120                 125

Thr Ile Thr Leu Asp Asn Val Pro Gly Arg Gly Thr Ile Val Phe Val
130                 135                 140

Ala Asn Ser Trp Val Tyr Pro Gln Ala Lys Tyr Arg Tyr Asn Arg Val
145                 150                 155                 160

Phe Phe Ala Asn Asp Thr Tyr Leu Pro His Gln Met Pro Ala Ala Leu
                165                 170                 175

Lys Pro Tyr Arg Asp Asp Glu Leu Arg Asn Leu Arg Gly Asp Asp Gln
            180                 185                 190

Gln Gly Pro Tyr Leu Asp His Asp Arg Val Tyr Arg Tyr Asp Val Tyr
        195                 200                 205

Asn Asp Leu Gly Asp Ser Arg Asp Val Leu Gly Gly Ser Lys Asp Leu
    210                 215                 220

Pro Tyr Pro Arg Arg Cys Arg Thr Gly Arg Lys Pro Ser Asp Ser Lys
225                 230                 235                 240

Pro Asp His Glu Ser Arg Leu Leu Leu Val Gln Asn Val Tyr Val
                245                 250                 255

Leu Arg Asp Glu Leu Phe Gly His Leu Lys Gln Ser Asp Leu Leu Gly
            260                 265                 270

Tyr Thr Leu Lys Gly Trp Leu Asp Gly Ile Ile Leu Ala Ile Arg Thr
        275                 280                 285

Tyr Val Asp Leu Ser Pro Gly Glu Phe Asp Ser Phe Ala Asp Ile Leu
    290                 295                 300

Lys Leu Tyr Glu Gly Gly Ile Lys Leu Pro Asn Ile Pro Ala Leu Glu
305                 310                 315                 320

Glu Val Arg Lys Arg Phe Pro Leu Gln Leu Val Lys Asp Leu Ile Pro
```

```
                     325                 330                 335
Lys Gly Gly Asp Phe Leu Leu Lys Leu Pro Lys Pro Glu Ile Ile Lys
                340                 345                 350

Val Asp Gln Lys Ala Trp Met Thr Asp Glu Glu Phe Ala Arg Glu Met
            355                 360                 365

Leu Ala Gly Val Asn Pro Met Met Ile Lys Arg Leu Thr Glu Phe Pro
        370                 375                 380

Pro Lys Ser Thr Leu Asp Pro Ser Lys Tyr Gly Asp His Thr Ser Thr
385                 390                 395                 400

Met Thr Glu Glu His Val Ala Lys Ser Leu Glu Gly Leu Thr Val Gln
                405                 410                 415

Gln Ala Leu Ala Gly Asn Arg Leu Tyr Ile Val Asp Gln His Asp Asn
            420                 425                 430

Leu Met Pro Phe Leu Ile Asp Ile Asn Asn Leu Asp Ala Ser Phe Val
        435                 440                 445

Tyr Ala Thr Arg Thr Leu Leu Phe Leu Arg Gly Asp Gly Thr Leu Ala
    450                 455                 460

Pro Val Ala Ile Glu Leu Ser Ser Pro Leu Ile Gln Gly Glu Leu Thr
465                 470                 475                 480

Thr Ala Lys Ser Ala Val Tyr Thr Pro Gln His Ala Gly Val Glu Gly
                485                 490                 495

Trp Ile Trp Gln Leu Ala Lys Ala Tyr Ala Ser Val Asn Asp Tyr Gly
            500                 505                 510

Trp His Gln Leu Ile Ser His Trp Leu Asn Thr His Ala Val Met Glu
        515                 520                 525

Pro Phe Val Ile Ala Thr Asn Arg Gln Leu Ser Val Thr His Pro Val
    530                 535                 540

Tyr Lys Leu Leu His Pro His Tyr Arg Asp Thr Met Asn Ile Asn Ala
545                 550                 555                 560

Arg Ala Arg Gly Leu Leu Ile Asn Ala Gly Gly Val Ile Glu Met Thr
                565                 570                 575

Val Phe Pro His Lys His Ala Met Pro Met Ser Ser Met Val Tyr Lys
            580                 585                 590

His Trp Asn Phe Thr Glu Gln Ala Leu Pro Ala Asp Leu Ile Lys Arg
        595                 600                 605

Gly Met Ala Val Glu Asp Ala Ser Ser Pro His Lys Val Arg Leu Leu
    610                 615                 620

Ile Lys Asp Tyr Pro Tyr Ala Thr Asp Gly Leu Ala Val Trp Asp Ala
625                 630                 635                 640

Ile Glu Gln Trp Val Ser Asp Tyr Leu Thr Ile Tyr Tyr Pro Asn Asp
                645                 650                 655

Gly Val Leu Gln Gly Asp Val Glu Leu Gln Ala Trp Trp Lys Glu Val
            660                 665                 670

Arg Glu Val Gly His Gly Asp Leu Lys Asp Ala Ala
        675                 680

<210> SEQ ID NO 9
<211> LENGTH: 6459
<212> TYPE: DNA
<213> ORGANISM: Barley cv. Prestige

<400> SEQUENCE: 9
atggctgcgg cggcggggga cgtggaggcg ttcctggcgg cgtgccaggc gtcgggcgac      60
gcggcgtacg gcgccgccaa ggccgtgctg gagcggctcg aggcgccggc cacgcgcgcc     120
```

```
gaggccaggc ggctcctcgg cgccgtgcga cggcgcttcg ccgccggcgg cccggccgcg    180
gggctcgagt gcttccgcac cttccacttc cgcatccacg acgtcgtcct cgaccccccac   240
ctccaaggtt gcccggcccc ttccctacac acccgttgtc gacccgcatc tctttcgccg    300
atctggccgt caaaagcacg cggcttggta gaaatcaagc ctgcaatcct gatccgttta    360
tggctggcca gtcgatcagt aatttggcca taactggagt ataaccttgg tctctaatct    420
ctacctgacc atataccgag ttggttttct ttcttcttgt ttccgtattt gtgtagtttt    480
ttcttttctt tcgagcatga tgttctttga attaatgcgt accagactcc agtaattcga    540
cattttgaat tttggcgagt gttcttggaa tttataacac aacgaggctt tgatcaagtg    600
gtttatgtag aggagtgttt ttgttcttgt gcaccgtata caattctcta tttcccaaca    660
attttgatgg cctctaagca tcctgtagtc atgtctactg tgtaagctac agatttattc    720
atgtctatgt gtaagctgca aatggagaga aaagctatct atttggttgt tccagcttgt    780
tctttggcag aacaatcctg cccatcctat caccataagt ataaaagcac gacaaatgag    840
tggggcaagc atgctgccaa gctaatacac gacataagct acatattttg aggggcatgt    900
tatctttttt tttcccttct actcagtttc tctttggga gaacaatcct actcaaccta     960
taatcataag aataaaagca agacagatga gtgctgcaga ctattggcat ataataacaac  1020
taaataggac atctgtccgc tatatcttta gttaataatt gtatatagac gcagtctttg   1080
tgctggaaaa actgcaacta aatattttct tacattatat ggaatctggg tgtgatatga   1140
cttctttgtt acgttttgtg tgcataaagc attaacttct gtctttagtt ggcgcagcgg   1200
taaaaacacc cattgcttaa tatttatttt gctttccgta gcttgataaa atttcaactg   1260
cttctaggat tccagcaaag aaagaagcta acaatgatgg agatacccag cattttcatt   1320
ccagaagact ggtcattcac tttctacgag ggtctcaacc ggcatccaga ttccatcttc   1380
agggataaga cagtagcaga gctgggatgt ggcaatggtt ggatatccat tgcacttgca   1440
gaaaagtggt gcccttcgaa ggttggcacc tcttgttccg tagatattta tcttatctcg   1500
tttgttgcaa acatgggacc tgcagaagtt agacatttac tcaggttact ttatatgaaa   1560
cttttaggtg tctgccagta gtctgctggt ggtctaattt tcttggtata cctgatgccg   1620
tcgagcatat tgcttccaaa ttttgggcaa ggcattacca ccacatattg tttctacaat   1680
gctgaacaat tgctctcctt tgaaaggaag aaaaacaaga atgacatgca ccttagtagt   1740
ttaagccaca ataccagcg aatcaaatta gtttgcagtc agcttggcat taccttactt    1800
gagccttggt tgttctttg aaggtttatg gtctggatat aaacccaaga gctatcaaga    1860
ttgcatggat aaacctttac ttgaatgcac tagacgacga tggtctccca atctatgatg   1920
cggaggggaa acattgctt gacagagtcg aattctatga atctgatctt ctttcttact    1980
gtagagataa caagatagaa cttgatcgca ttgttggatg cataccacag gtacggtcag   2040
gttttttacca atttcctgtg aatgggatt atagtcgatc agaacttgat caaaatgccc   2100
ttaatatctg cctttcagat tcttaacccc aatccagagg caatgtcaaa gattgtaact   2160
gaaaattcaa gtgaggagtt cttgtactcc ttgagcaact actgtgctct ccaggtgagt   2220
tgagatctat ttaaactcaa gccattcagt ttacctgtta ctaaatggtt acccatgtca   2280
gagtctccaa atctttttct tttctcaaac agcaaagaga aagaaaaact tttaagttct   2340
atcctgaaat tgactttaca atgccttgttc ataatctgct tacgaaatat gcgtttgaac   2400
atttctcttt tccttgtagg catgtggtca gacctttata taagaaaatg aagttttgt    2460
```

```
agaaataatg tatgctttgt acttatgaca tggttccacc agtataatca atttaagtct   2520
aggtagttag gaacctagga tggagagcac cgacagtgta taatatatat atgtcgatag   2580
ggggttagca gtccaaatcc acctcaagtt caacctattg cataactttt ggtcttacaa   2640
cctgtatgga caaatgtgat cagcacccca gtctttccta taaaaatgtc tgctggaata   2700
tggaattatt aacagcggta tttatttta ccctgtttaa ttttttcctt tgctaaaaga    2760
atgataatcc ttatgccacg aggttacatt gtattactca agtcaatatt tgttactatg   2820
gctgattgta cgattccagc ttccggttgt taattttgtt atgtttgtga actttgctgc   2880
attcagggtt ttgttgagga ccaatttggc ctcgggttga ttgctcgggc tgttgaagaa   2940
gggatatctg tgataaagcc tagtggtctt atggtattca acatgggagg ccggccagga   3000
caaggtgtct gtgagcgcct atttctacgc cgtggatttc gcatcaataa gctctggcaa   3060
acaaaaatta tgcaggtagc aattcttga gtgactagat gttaactaat cccagtgttt    3120
ttccatgcca gcaacagcat tatatcctgg ttagaggaat atgctcttca tgttgcacac   3180
caatcttcag ctgggcctag aattttcatc taccggctta catttttaca ttacagaacc   3240
aattttttgtt gaggatcatt accaactagt tgggtctttg caggctgctg acacagacat   3300
ctccgcttta gttgaaattg agaaaaatag ccgacatcgc ttcgagttct ttatggatct   3360
tgttggggat cagcctgtgt gtgcgcgcac agcatgggca tacatgaaat ctggtggccg   3420
catttcacat gctttgtctg tgtatagctg tcaacttcgc cagcccaacc aggtacctat   3480
actctctgat tagatctta caacaataat atagtaatgt caggaataat aataatttgg    3540
agaatttcag gtgaagaaaa tatttgagtt ccttaaagac ggattccatg aagtcagcag   3600
ctccctcgat ttgtcctttg atgatgattc tgttgctgat gaaaaaattc ctttcctagc   3660
ataccctagc tagtttcttgc aagagaataa gtcaatcct tgtgagcctc cagctggatg    3720
tttaaatttc cggaatcttg ttgctggatt tatgaagagt taccaccaca tcccattaac   3780
tcctgatgta agacttggtg tctattgcct acaattatgt ttgcttatta gaaattcata   3840
agatcaacct atttgatgct tctcacgtat gcttcatgtg acacttcctt ttcctctggt   3900
gcaccagaat gttgttgtgt tcccatcccg tgctgttgca atcgaaaatg ctcttcggtt   3960
gttctcacct ggacttgcaa ttgttgacga acacctaacc agacacttgc ccaagcaatg   4020
gttaacatct ttagcaattg aggtactttg accgatactc ccctcttcct ttctgtgttt   4080
ggaactgtgg aaaatacatg tgttctgtga agaaaaagtt atgctgacaa gaatttcgat   4140
gttattgcca ttcttctaaa tttcaggaaa gtaaccatgc taaagataca gtaactgtaa   4200
tcgaagcacc acgccaatca gatttgctga ttgagttgat caggaaactg aagcctcagg   4260
ttgttgttac tggcatggct cagtttgagg ctatcaccag tgctgctttc gtgaacttat   4320
taagtgtaac gaaagatgtt ggttcccgat tattactaga tatttcagaa catctggaat   4380
tgtctagtct gccaagctca aatggtgtat tgaaatatct tgctgggaag accctgcctt   4440
cacatgcggc tatattgtgt ggcttagtta agaatcaggt gtgtgtcaat cagcctgaac   4500
tctagttgaa ctgttgtgca tactatatag aatatcttga cttttatatg tactttagaa   4560
acactgttta aatgtactca tttcttttg cttcattta cttgcaggtt tattctgatc     4620
tggaagttgc ttttgctatc tctgaagatc caactgttta taggcattg tcacaaacta    4680
ttgagctatt ggaaggacat acttctgtga tcagccagca ctattatggt tgtcttttcc   4740
atgagctgct ggcatttcaa attggtgacc ggcatccaca acaagaggta aacatggctt   4800
gcctcttcca gttctccatc tcactcagtt ctgtccacaa ggtgccgaat gatctgttca   4860
```

```
agtggacact cccctcagca cgggcaagct agtccatgaa tttggattag ttccctctta    4920
gctgggtact tcgattacac cacaatgagc tcctcaacgt ggtctggttt atgtttttca    4980
tgttttccct ctaatgtttg gttgctcttt ttcagagaga acctgcagaa gtgatatcta    5040
aggagatgat agggttttca agttcagcta tgtccaccct agaaggagct gagttttcg     5100
ttcctggttc catggaatcc ggtgtcatac atatggatct ggaccgcagc ttcttgccag    5160
taccttctgc agtaaacgcc tccatttcg  aaagttttgt tcgtcagaac atcactgatt    5220
ctgaaaccga tgtccgttcc agcattcagc agctggtgaa agatagctat ggtttctcag    5280
caggcggtgc ttctgaaatt atatacggga acacctgtct cgcgctcttc aacaagcttg    5340
ttctttgctg catgcaagaa cagggcacct tgcttttccc cttgggaacc aacgggcatt    5400
acgtcaacgc agcaaagttt gtgaatgcaa ccaccttgac tattccaacg aaggcagatt    5460
caggcttcaa gatcgaacca agtgctctag ccgacacact agagaaggtg tctcagccgt    5520
gggtctatat ttctggcccc acaatcaacc ctactggctt cctgtacagt gacgacgata    5580
tagcagagct gctttctgtc tgtgcgacat acggagccag ggtggtgata gatacctcct    5640
cctctggtct ggagttccaa gccaccggct gcagccagtg gaatttggaa agatgtcttt    5700
ctaatgtcaa gtcttcaaag ccctcgttct ccgttgtcct gctcggagag ctgtcctttg    5760
agctgaccac ggctgggctt gatttcgggt ttctgattat gagcgactcg tccttggttg    5820
acacatttta cagtttccca agcttgagtc ggccacacag cacgttgaag tacacgttca    5880
ggaagctgtt gggtcttaag aaccagaagg atcagcattt ctctgatctc atccttgagc    5940
agaaggagac gttgaagaat cgtgccgacc agttgatcaa ggtatgcctt ttgggatatc    6000
ctgtgtttag gctctctgtt ttcttcccct gatcagctct ccgatcccct tacatcctta    6060
ggctaatttc agtacttcaa gtttgccacg catttctgac atattctttc ctcttgtttt    6120
attttcctgt gatgtgatga acagacgctt gagagctgcg gctgggacgc tgtgggctgc    6180
catgcggca tctcgatgct tgcaaaaccg accgcctaca ttggcaaatc gctcaaggtg     6240
gacggctttg agggcaagct ggacagccac aacatgaggg aagccctcct gaggtccacc    6300
gggctgtgca ttagcagcag cgggtggaca ggggtgccgg actactgccg cttcagcttt    6360
gctctggaga gcggcgactt cgaccgggcc atggagtgca tcgcccggtt cagggagctg    6420
gtccttggtg gcggtgctaa ggtgaatggt agcaactag                           6459
```

<210> SEQ ID NO 10
<211> LENGTH: 6459
<212> TYPE: DNA
<213> ORGANISM: Barley, Mutant 8063

<400> SEQUENCE: 10

```
atggctgcgg cggcggggga cgtggaggcg ttcctggcgg cgtgccaggc gtcgggcgac      60
gcggcgtacg cgccgccaa  ggccgtgctg agcggctcg  aggcgccggc cacgcgcgcc     120
gaggccaggc ggctcctcgg cgccgtgcga cggcgcttcg ccgccggcgg cccggccgcg     180
gggctcgagt gcttccgcac cttccacttc cgcatccacg acgtcgtcct cgacccccac     240
ctccaaggtt gccggccccc ttccctacac acccgttgtc gacccgcatc tctttcgccg     300
atctggccgt caaaagcacg cggcttggta gaaatcaagc ctgcaatcct gatccgttta     360
tggctggcca gtcgatcagt aatttggcca taactggagt ataaccttgg tctctaatct     420
ctacctgacc atataccgag ttggttttct ttcttcttgt ttccgtattt gtgtagtttt     480
```

```
ttcttttctt tcgagcatga tgttctttga attaatgcgt accagactcc agtaattcga    540
cattttgaat tttggcgagt gttcttggaa tttataacac aacgaggctt tgatcaagtg    600
gtttatgtag aggagtgttt tgttcttgt gcaccgtata caattctcta tttcccaaca     660
attttgatgg cctctaagca tcctgtagtc atgtctactg tgtaagctac agatttattc    720
atgtctatgt gtaagctgca aatggagaga aaagctatct atttggttgt tccagcttgt    780
tctttggcag aacaatcctg cccatcctat caccataagt ataaaagcac acaaatgag     840 tggggcaagc atgctgccaa gctaatacac gacataagct acatattttg aggggcatgt    900 tatcttttt tttcccttct actcagtttc ttctttggga gaacaatcct actcaaccta     960
taatcataag aataaaagca agacagatga gtgctgcaga ctattggcat atataacaac   1020
taaataggac atctgtccgc tatatcttta gttaataatt gtatatagac gcagtctttg   1080
tgctggaaaa actgcaacta aatattttct tacattatat ggaatctggg tgtgatatga   1140
cttctttgtt acgttttgtg tgcataaagc attaacttct gtctttagtt ggcgcagcgg   1200
taaaaacacc cattgcttaa tattttattt gctttccgta gcttgataaa atttcaactg   1260
cttctaggat tccagcaaag aaagaagcta acaatgatgg agatacccag cattttcatt   1320
ccagaagact ggtcattcac tttctacgag ggtctcaacc ggcatccaga ttccatcttc   1380
agggataaga cagtagcaga gctgggatgt ggcaatggtt ggatatccat tgcacttgca   1440
gaaaagtggt gcccttcgaa ggttggcacc tcttgttccg tagatattta tcttatctcg   1500
tttgttgcaa acatgggacc tgcagaagtt agacatttac tcaggttact ttatatgaaa   1560
cttttaggtg tctgccagta gtctgctggt ggtctaattt tcttggtata cctgatgccg   1620
tcgagcatat tgctttcaaa ttttgggcaa ggcattacca ccacatattg tttctacaat   1680
gctgaacaat tgctctcctt tgaaaggaag aaaaacaaga atgacatgca ccttagtagt   1740
ttaagccaca ataccagcg aatcaaatta gtttgcagtc agcttggcat taccttactt    1800
gagccttggt tgttcttttg aaggtttatg gtctggatat aaacccaaga gctatcaaga   1860
ttgcatggat aaaccttac ttgaatgcac tagacgacga tggtctccca atctatgatg    1920
cggaggggaa acattgctt gacagagtcg aattctatga atctgatctt ctttcttact    1980
gtagagataa caagatagaa cttgatcgca ttgttggatg cataccacag gtacggtcag   2040 gttttttacca atttcctgtg aatggggatt atagtcgatc agaacttgat caaaatgccc   2100
ttaatatctg cctttcagat tcttaacccc aatccagagg caatgtcaaa gattgtaact   2160
gaaaattcaa gtgaggagtt cttgtactcc ttgagcaact actgtgctct ccaggtgagt   2220
tgagatctat ttaaactcaa gccattcagt ttacctgtta ctaaatggtt acccatgtca   2280
gagtctccaa atcttttct tttctcaaac agcaaagaga gaagaaaact tttaagttct    2340
atcctgaaat tgactttaca atgcttgttc ataatctgct tacgaaatat gcgtttgaac   2400
atttctcttt tccttgtagg catgtggtca gacctttata taagaaatg aagttttgt     2460 agaaataatg tatgctttgt acttatgaca tggttccacc agtataatca atttaagtct   2520
aggtagttag gaacctagga tggagagcac cgacagtgta atatatat atgtcgatag     2580 ggggttagca gtccaaatcc acctcaagtt caacctattg cataactttt ggtcttacaa   2640
cctgtatgga caaatgtgat cagcacccca gtctttccta aaaaatgtc tgctggaata    2700 tggaattatt aacagcggta tttattttta ccctgtttaa tttttcctt tgctaaaaga    2760 atgataatcc ttatgccacg aggttacatt gtattactca agtcaatatt tgttactatg   2820
gctgattgta cgattccagc ttccggttgt taattttgtt atgtttgtga actttgctgc   2880
```

```
attcagggtt tgttgagga ccaatttggc ctcgggttga ttgctcgggc tgttgaagaa    2940
gggatatctg tgataaagcc tagtggtctt atggtattca acatgggagg ccggccagga    3000
caaggtgtct gtgagcgcct atttctacgc cgtggatttc gcatcaataa gctctggcaa    3060
acaaaaatta tgcagatagc aattctttga gtgactagag gttaactaat cccagtgttt    3120
ttccatgcca gcaacagcat tatatcctgg ttagaggaat atgctcttca tgttgcacac    3180
caatcttcag ctgggcctag aattttcatc taccggctta cattttaca ttacagaacc     3240
aatttttgtt gaggatcatt accaactagt tgggtctttg caggctgctg acacagacat    3300
ctccgcttta gttgaaattg agaaaaatag ccgacatcgc ttcgagttct ttatggatct    3360
tgttggggat cagcctgtgt gtgcgcgcac agcatgggca tacatgaaat ctggtggccg    3420
catttcacat gctttgtctg tgtatagctg tcaacttcgc cagcccaacc aggtacctat    3480
actctctgat tagatcttta caacaataat atagtaatgt caggaataat aataatttgg    3540
agaatttcag gtgaagaaaa tatttgagtt ccttaaagac ggattccatg aagtcagcag    3600
ctccctcgat ttgtcctttg atgatgattc tgttgctgat gaaaaaattc ctttcctagc    3660
atacctagct agtttcttgc aagagaataa gtcaatcct tgtgagcctc cagctggatg     3720
tttaaatttc cggaatcttg ttgctggatt tatgaagagt taccaccaca tcccattaac    3780
tcctgatgta agacttggtg tctattgcct acaattatgt ttgcttatta gaaattcata    3840
agatcaacct atttgatgct tctcacgtat gcttcatgtg acacttcctt ttcctctggt    3900
gcaccagaat gttgttgtgt tcccatcccg tgctgttgca atcgaaaatg ctcttcggtt    3960
gttctcacct ggacttgcaa ttgttgacga acacctaacc agacacttgc ccaagcaatg    4020
gttaacatct ttagcaattg aggtactttg accgatactc ccctcttct ttctgtgttt     4080
ggaactgtgg aaaatacatg tgttctgtga agaaaaagtt atgctgacaa gaatttcgat    4140
gttattgcca ttcttctaaa tttcaggaaa gtaaccatgc taaagataca gtaactgtaa    4200
tcgaagcacc acgccaatca gatttgctga ttgagttgat caggaaactg aagcctcagg    4260
ttgttgttac tggcatggct cagtttgagg ctatcaccag tgctgctttc gtgaacttat    4320
taagtgtaac gaaagatgtt ggttcccgat tattactaga tatttcagaa catctggaat    4380
tgtctagtct gccaagctca aatggtgtat tgaaatatct tgctgggaag accctgcctt    4440
cacatgcggc tatattgtgt ggcttagtta agaatcaggt gtgtgtcaat cagcctgaac    4500
tctagttgaa ctgttgtgca tactatatag aatatcttga cttttatatg tactttagaa    4560
acactgttta aatgtactca tttcttttg cttcatttta cttgcaggtt tattctgatc     4620
tggaagttgc ttttgctatc tctgaagatc caactgttta taaggcattg tcacaaacta    4680
ttgagctatt ggaaggacat acttctgtga tcagccagca ctattatggt tgtcttttcc    4740
atgagctgct ggcatttcaa attggtgacc ggcatccaca acaagaggta aacatggctt    4800
gcctcttcca gttctccatc tcactcagtt ctgtccacaa ggtgccgaat gatctgttca    4860
agtggacact ccctcagca cgggcaagct agtccatgaa tttggattag ttccctctta     4920
gctgggtact tcgattacac cacaatgagc tcctcaacgt ggtctggttt atgttttca     4980
tgttttccct ctaatgtttg gttgctcttt ttcagagaga acctgcagaa gtgatatcta    5040
aggagatgat agggtttca agttcagcta tgtccaccct agaaggagct gagttttcg     5100
ttcctggttc catggaatcc ggtgtcatac atatggatct ggaccgcagc ttcttgccag    5160
taccttctgc agtaaacgcc tccattttcg aaagttttgt tcgtcagaac atcactgatt    5220
```

```
ctgaaaccga tgtccgttcc agcattcagc agctggtgaa agatagctat ggtttctcag    5280
caggcggtgc ttctgaaatt atatacggga acacctgtct cgcgctcttc aacaagcttg    5340
ttctttgctg catgcaagaa cagggcacct tgcttttccc cttgggaacc aacgggcatt    5400
acgtcaacgc agcaaagttt gtgaatgcaa ccaccttgac tattccaacg aaggcagatt    5460
caggcttcaa gatcgaacca agtgctctag ccgacacact agagaaggtg tctcagccgt    5520
gggtctatat ttctggcccc acaatcaacc ctactggctt cctgtacagt gacgacgata    5580
tagcagagct gctttctgtc tgtgcgacat acggagccag ggtggtgata gatacctcct    5640
cctctggtct ggagttccaa gccaccggct gcagccagtg gaatttggaa agatgtcttt    5700
ctaatgtcaa gtcttcaaag ccctcgttct ccgttgtcct gctcggagag ctgtcctttg    5760
agctgaccac ggctgggctt gatttcgggt ttctgattat gagcgactcg tccttggttg    5820
acacatttta cagtttccca agcttgagtc ggccacacag cacgttgaag tacacgttca    5880
ggaagctgtt gggtcttaag aaccagaagg atcagcattt ctctgatctc atccttgagc    5940
agaaggagac gttgaagaat cgtgccgacc agttgatcaa ggtatgcctt ttgggatatc    6000
ctgtgtttag gctctctgtt ttcttcccct gatcagctct ccgatcccct tacatcctta    6060
ggctaatttc agtacttcaa gtttgccacg catttctgac atattctttc ctcttgtttt    6120
attttcctgt gatgtgatga acagacgctt gagagctgcg gctgggacgc tgtgggctgc    6180
catggcggca tctcgatgct tgcaaaaccg accgcctaca ttggcaaatc gctcaaggtg    6240
gacggctttg agggcaagct ggacagccac aacatgaggg aagccctcct gaggtccacc    6300
gggctgtgca ttagcagcag cgggtggaca ggggtgccgg actactgccg cttcagcttt    6360
gctctggaga gcggcgactt cgaccgggcc atggagtgca tcgcccggtt cagggagctg    6420
gtccttggtg gcggtgctaa ggtgaatggt agcaactag                           6459
```

<210> SEQ ID NO 11
<211> LENGTH: 6459
<212> TYPE: DNA
<213> ORGANISM: Barley cv. Sebastian

<400> SEQUENCE: 11

```
atggctgcgg cggcggggga cgtggaggcg ttcctggcgg cgtgccaggc gtcgggcgac      60
gcggcgtacg cgccgccaa ggccgtgctg gagcggctcg aggcgccggc cacgcgcgcc     120
gaggccaggc ggctcctcgg cgccgtgcga cggcgcttcg ccgccggcgg cccggccgcg     180
gggctcgagt gcttccgcac cttccacttc cgcatccacg acgtcgtcct cgaccccca     240 ctccaaggtt gcccggcccc ttccctacac acccgttgtc gacccgcatc tctttcgccg     300
atctggccgt caaaagcacg cggcttggta gaaatcaagc ctgcaatcct gatccgttta     360
tggctggcca gtcgatcagt aatttggcca taactggagt ataaccttgg tctctaatct     420
ctacctgacc atataccgag ttggttttct ttcttcttgt ttccgtattt gtgtagtttt     480 ttctttttctt tcgagcatga tgttctttga attaatgcgt accagactcc agtaattcga     540
cattttgaat tttggcgagt gttcttggaa tttataacac aacgaggctt tgatcaagtg     600
gtttatgtag aggagtgttt ttgttcttgt gcaccgtata caattctcta tttcccaaca     660
attttgatgg cctctaagca tcctgtagtc atgtctactg tgtaagctac agatttattc     720
atgtctatgt gtaagctgca aatggagaga aaagctatct attggttgt tccagcttgt      780 tctttggcag aacaatcctg cccatcctat caccataagt ataaaagcac gacaaatgag     840
tggggcaagc atgctgccaa gctaatacac gacataagct acatattttg agggggcatgt    900
```

```
tatcttttt   tttcccttct   actcagtttc   ttctttggga   gaacaatcct   actcaaccta      960
taatcataag  aataaaagca   agacagatga   gtgctgcaga   ctattggcat   atataacaac     1020
taaataggac  atctgtccgc   tatatcttta   gttaataatt   gtatatagac   gcagtctttg     1080
tgctggaaaa  actgcaacta   aatattttct   tacattatat   ggaatctggg   tgtgatatga     1140
cttctttgtt  acgttttgtg   tgcataaagc   attaacttct   gtctttagtt   ggcgcagcgg     1200
taaaaacacc  cattgcttaa   tattttattt   gctttccgta   gcttgataaa   atttcaactg     1260
cttctaggat  tccagcaaag   aaagaagcta   acaatgatgg   agatacccag   catttcatt      1320
ccagaagact  ggtcattcac   tttctacgag   ggtctcaacc   ggcatccaga   ttccatcttc     1380
agggataaga  cagtagcaga   gctgggatgt   ggcaatggtt   ggatatccat   tgcacttgca     1440
gaaaagtggt  gcccttcgaa   ggttggcacc   tcttgttccg   tagatattta   tcttatctcg     1500
tttgttgcaa  acatgggacc   tgcagaagtt   agacatttac   tcaggttact   ttatatgaaa     1560
cttttaggtg  tctgccagta   gtctgctggt   ggtctaattt   tcttggtata   cctgatgccg     1620
tcgagcatat  tgctttcaaa   ttttgggcaa   ggcattacca   ccacatattg   tttctacaat     1680
gctgaacaat  tgctctcctt   tgaaaggaag   aaaaacaaga   atgacatgca   ccttagtagt     1740
ttaagccaca  ataccagcg   aatcaaatta    gtttgcagtc   agcttggcat   taccttactt     1800
gagccttggt  tgttcttttg   aaggtttatg   gtctggatat   aaacccaaga   gctatcaaga     1860
ttgcatggat  aaacctttac   ttgaatgcac   tagacgacga   tggtctccca   atctatgatg     1920
cggaggggaa  acattgctt    gacagagtcg   aattctatga   atctgatctt   ctttcttact     1980
gtagagataa  caagatagaa   cttgatcgca   ttgttggatg   cataccacag   gtacggtcag     2040
gtttttacca  atttcctgtg   aatgggatt    atagtcgatc   agaacttgat   caaaatgccc     2100
ttaatatctg  cctttcagat   tcttaaccc    aatccagagg   caatgtcaaa   gattgtaact     2160
gaaaattcaa  gtgaggagtt   cttgtactcc   ttgagcaact   actgtgctct   ccaggtgagt     2220
tgagatctat  ttaaactcaa   gccattcagt   ttacctgtta   ctaaatggtt   acccatgtca     2280
gagtctccaa  atctttttct   tttctcaaac   agcaaagaga   gaagaaaact   tttaagttct     2340
atcctgaaat  tgactttaca   atgcttgttc   ataatctgct   tacgaaatat   gcgtttgaac     2400
atttctcttt  tccttgtagg   catgtggtca   gacctttata   taagaaaatg   aagttttgt      2460
agaaataatg  tatgctttgt   acttatgaca   tggttccacc   agtataatca   atttaagtct     2520
aggtagttag  gaacctagga   tggagagcac   cgacagtgta   taatatatat   atgtcgatag     2580
ggggttagca  gtccaaatcc   acctcaagtt   caacctattg   cataactttt   ggtcttacaa     2640
cctgtatgga  caaatgtgat   cagcacccca   gtctttccta   taaaaatgtc   tgctggaata     2700
tggaattatt  aacagcggta   tttattttta   ccctgtttaa   tttttccctt   tgctaaaaga     2760
atgataatcc  ttatgccacg   aggttacatt   gtattactca   agtcaatatt   tgttactatg     2820
gctgattgta  cgattccagc   ttccggttgt   taattttgtt   atgtttgtga   actttgctgc     2880
attcagggtt  ttgttgagga   ccaatttggc   ctcgggttga   ttgctcgggc   tgttgaagaa     2940
gggatatctg  tgataaagcc   tagtggtctt   atggtattca   acatgggagg   ccggccagga     3000
caaggtgtct  gtgagcgcct   atttctacgc   cgtggatttc   gcatcaataa   gctctggcaa     3060
acaaaaatta  tgcaggtagc   aattctttga   gtgactagat   gttaactaat   cccagtgttt     3120
ttccatgcca  gcaacagcat   tatatcctgg   ttagaggaat   atgctcttca   tgttgcacac     3180
caatcttcag  ctgggcctag   aattttcatc   taccggctta   cattttaca   ttacagaacc      3240
```

```
aatttttgtt gaggatcatt accaactagt tgggtctttg caggctgctg acacagacat    3300
ctccgcttta gttgaaattg agaaaaatag ccgacatcgc ttcgagttct ttatggatct    3360
tgttggggat cagcctgtgt gtgcgcgcac agcatgggca tacatgaaat ctggtggccg    3420
catttcacat gctttgtctg tgtatagctg tcaacttcgc cagcccaacc aggtacctat    3480
actctctgat tagatcttta caacaataat atagtaatgt caggaataat aataatttgg    3540
agaatttcag gtgaagaaaa tatttgagtt ccttaaagac ggattccatg aagtcagcag    3600
ctccctcgat ttgtcctttg atgatgattc tgttgctgat gaaaaaattc ctttcctagc    3660
atacctagct agtttcttgc aagagaataa gtctaatcct tgtgagcctc agctggatg     3720
tttaaatttc cggaatcttg ttgctggatt tatgaagagt taccaccaca tcccattaac    3780
tcctgatgta agacttggtg tctattgcct acaattatgt ttgcttatta gaaattcata    3840
agatcaacct atttgatgct tctcacgtat gcttcatgtg acacttcctt ttcctctggt    3900
gcaccagaat gttgttgtgt tcccatcccg tgctgttgca atcgaaaatg ctcttcggtt    3960
gttctcacct ggacttgcaa ttgttgacga acacctaacc agacacttgc ccaagcaatg    4020
gttaacatct ttagcaattg aggtactttg accgatactc ccctctttct ttctgtgttt    4080
ggaactgtgg aaaatacatg tgttctgtga agaaaaagtt atgctgacaa gaatttcgat    4140
gttattgcca ttcttctaaa tttcaggaaa gtaaccatgc taaagataca gtaactgtaa    4200
tcgaagcacc acgccaatca gatttgctga ttgagttgat caggaaactg aagcctcagg    4260
ttgttgttac tggcatggct cagtttgagg ctatcaccag tgctgctttc gtgaacttat    4320
taagtgtaac gaaagatgtt ggttcccgat tattactaga tatttcagaa catctggaat    4380
tgtctagtct gccaagctca aatggtgtat tgaaatatct tgctgggaag accctgcctt    4440
cacatgcggc tatattgtgt ggcttagtta agaatcaggt gtgtgtcaat cagcctgaac    4500
tctagttgaa ctgttgtgca tactatatag aatatcttga cttttatatg tactttagaa    4560
acactgttta aatgtactca tttctttttg cttcatttta cttgcaggtt tattctgatc    4620
tggaagttgc ttttgctatc tctgaagatc caactgttta taaggcattg tcacaaacta    4680
ttgagctatt ggaaggacat acttctgtga tcagccagca ctattatggt tgtcttttcc    4740
atgagctgct ggcatttcaa attggtgacc ggcatccaca acaagaggta aacatggctt    4800
gcctcttcca gttctccatc tcactcagtt ctgtccacaa ggtgccgaat gatctgttca    4860
agtggacact ccctcagca cgggcaagct agtccatgaa tttggattag ttccctctta    4920
gctgggtact tcgattacac cacaatgagc tcctcaacgt ggtctggttt atgttttca    4980
tgtttccct ctaatgtttg gttgctcttt ttcagagaga acctgcagaa gtgatatcta    5040
aggagatgat agggttttca agttcagcta tgtccaccct agaaggagct gagttttcg    5100
ttcctggttc catggaatcc ggtgtcatac atatggatct ggaccgcagc ttcttgccag    5160
taccttctgc agtaaacgcc tccatttcg aaagttttgt tcgtcagaac atcactgatt    5220
ctgaaaccga tgtccgttcc agcattcagc agctggtgaa agatagctat ggtttctcag    5280
caggcggtgc ttctgaaatt atatacggga acacctgtct cgcgctcttc aacaagcttg    5340
ttctttgctg catgcaagaa cagggcacct tgcttttccc cttgggaacc aacgggcatt    5400
acgtcaacgc agcaaagttt gtgaatgcaa ccaccttgac tattccaacg aaggcagatt    5460
caggcttcaa gatcgaacca agtgctctag ccgacacact agagaaggtg tctcagccgt    5520
gggtctatat ttctggcccc acaatcaacc ctactggctt cctgtacagt gacgacgata    5580
tagcagagct gctttctgtc tgtgcgacat acggagccag ggtggtgata gatacctcct    5640
```

```
cctctggtct ggagttccaa gccaccggct gcagccagtg gaatttggaa agatgtcttt    5700
ctaatgtcaa gtcttcaaag ccctcgttct ccgttgtcct gctcggagag ctgtcctttg    5760
agctgaccac ggctgggctt gatttcgggt ttctgattat gagcgactcg tccttggttg    5820
acacatttta cagtttccca agcttgagtc ggccacacag cacgttgaag tacacgttca    5880
ggaagctgtt gggtcttaag aaccagaagg atcagcattt ctctgatctc atccttgagc    5940
agaaggagac gttgaagaat cgtgccgacc agttgatcaa ggtatgcctt ttgggatatc    6000
ctgtgtttag gctctctgtt ttcttcccct gatcagctct ccgatcccct tacatcctta    6060
ggctaatttc agtacttcaa gtttgccacg catttctgac atattctttc ctcttgtttt    6120
attttcctgt gatgtgatga acagacgctt gagagctgcg gctgggacgc tgtgggctgc    6180
catggcggca tctcgatgct tgcaaaaccg accgcctaca ttggcaaatc gctcaaggtg    6240
gacggctttg agggcaagct ggacagccac aacatgaggg aagccctcct gaggtccacc    6300
gggctgtgca ttagcagcag cgggtggaca ggggtgccgg actactgccg cttcagcttt    6360
gctctggaga gcggcgactt cgaccgggcc atggagtgca tcgcccggtt cagggagctg    6420
gtccttggtg gcggtgctaa ggtgaatggt agcaactag                           6459

<210> SEQ ID NO 12
<211> LENGTH: 6459
<212> TYPE: DNA
<213> ORGANISM: Barley, Mutant 14018

<400> SEQUENCE: 12
atggctgcgg cggcggggga cgtggaggcg ttcctggcgg cgtgccaggc gtcgggcgac      60
gcggcgtacg gcgccgccaa ggccgtgctg gagcggctcg aggcgccggc cacgcgcgcc     120
gaggccaggc ggctcctcgg cgccgtgcga cggcgcttcg ccgccggcgg cccggccgcg     180
gggctcgagt gcttccgcac cttccacttc gcatccacg acgtcgtcct cgaccccac      240 ctccaaggtt gcccggcccc ttccctacac acccgttgtc gacccgcatc tctttcgccg     300
atctggccgt caaaagcacg cggcttggta gaaatcaagc ctgcaatcct gatccgttta     360
tggctggcca gtcgatcagt aatttggcca taactggagt ataaccttgg tctctaatct     420
ctacctgacc atataccgag ttggttttct ttcttcttgt ttccgtattt gtgtagtttt     480
ttcttttctt tcgagcatga tgttctttga attaatgcgt accagactcc agtaattcga     540
cattttgaat tttggcgagt gttcttggaa tttataacac aacgaggctt tgatcaagtg     600
gtttatgtag aggagtgttt tgttcttgt gcaccgtata caattctcta tttcccaaca      660
attttgatgg cctctaagca tcctgtagtc atgtctactg tgtaagctac agatttattc     720
atgtctatgt gtaagctgca aatggagaga aagctatct atttggttgt tccagcttgt      780
tctttggcag aacaatcctg cccatcctat caccataagt ataaaagcac gacaaatgag     840
tggggcaagc atgctgccaa gctaatacac gacataagct acatattttg aggggcatgt     900
tatctttttt tttccttct actcagtttc ttctttggga gaacaatcct actcaaccta     960
taatcataag aataaaagca agacagatga gtgctgcaga ctattggcat atataacaac    1020
taaataggac atctgtccgc tatatcttta gttaataatt gtatatagac gcagtctttg    1080
tgctggaaaa actgcaacta aatattttct tacattatat ggaatctggg tgtgatatga    1140 cttcttgtt acgttttgtg tgcataaagc attaacttct gtctttagtt ggcgcagcgg    1200
taaaaacacc cattgcttaa tattttattt gctttccgta gcttgataaa atttcaactg    1260
```

```
cttctaggat tccagcaaag aaagaagcta acaatgatgg agatacccag cattttcatt   1320
ccagaagact ggtcattcac tttctacgag ggtctcaacc ggcatccaga ttccatcttc   1380
agggataaga cagtagcaga gctgggatgt ggcaatggtt ggatatccat tgcacttgca   1440
gaaaagtggt gcccttcgaa gattggcacc tcttgttccg tagatattta tcttatctcg   1500
tttgttgcaa acatgggacc tgcagaagtt agacatttac tcaggttact ttatatgaaa   1560
cttttaggtg tctgccagta gtctgctggt ggtctaattt tcttggtata cctgatgccg   1620
tcgagcatat tgcttttcaaa ttttgggcaa ggcattacca ccacatattg tttctacaat   1680
gctgaacaat tgctctcctt tgaaaggaag aaaaacaaga atgacatgca ccttagtagt   1740
ttaagccaca ataccagcg aatcaaatta gtttgcagtc agcttggcat taccttactt    1800
gagccttggt tgttcttttg aaggtttatg gtctggatat aaacccaaga gctatcaaga   1860
ttgcatggat aaacctttac ttgaatgcac tagacgacga tggtctccca atctatgatg   1920
cggaggggaa acattgctt gacagagtcg aattctatga atctgatctt ctttcttact    1980
gtagagataa caagatagaa cttgatcgca ttgttggatg cataccacag gtacggtcag   2040
gttttttacca atttcctgtg aatggggatt atagtcgatc agaacttgat caaaatgccc   2100
ttaatatctg cctttcagat tcttaacccc aatccagagg caatgtcaaa gattgtaact   2160
gaaaattcaa gtgaggagtt cttgtactcc ttgagcaact actgtgctct ccaggtgagt   2220
tgagatctat ttaaactcaa gccattcagt ttacctgtta ctaaatggtt acccatgtca   2280
gagtctccaa atcttttttct tttctcaaac agcaaagaga aagaaaaact tttaagttct   2340
atcctgaaat tgactttaca atgcttgttc ataatctgct tacgaaatat gcgtttgaac   2400
atttctcttt tccttgtagg catgtggtca gacctttata taagaaaatg aagttttttgt  2460
agaaataatg tatgctttgt acttatgaca tggttccacc agtataatca atttaagtct   2520
aggtagttag gaacctagga tggagagcac cgacagtgta taatatatat atgtcgatag   2580
ggggttagca gtccaaatcc acctcaagtt caacctattg cataactttt ggtcttacaa   2640
cctgtatgga caaatgtgat cagcacccca gtctttccta taaaaatgtc tgctggaata   2700
tggaattatt aacagcggta tttatttttta ccctgtttaa tttttttcctt tgctaaaaga  2760
atgataatcc ttatgccacg aggttacatt gtattactca agtcaatatt tgttactatg   2820
gctgattgta cgattccagc ttccggttgt taatttttgtt atgtttgtga actttgctgc   2880
attcagggtt ttgttgagga ccaatttggc ctcgggttga ttgctcgggc tgttgaagaa   2940
gggatatctg tgataaagcc tagtggtctt atggtattca acatgggagg ccggccagga   3000
caaggtgtct gtgagcgcct atttctacgc cgtggatttc gcatcaataa gctctggcaa   3060
acaaaaatta tgcaggtagc aattctttga gtgactagat gttaactaat cccagtgttt   3120
ttccatgcca gcaacagcat tatatcctgg ttagaggaat atgctcttca tgttgcacac   3180
caatcttcag ctgggcctag aatttttcatc taccggctta catttttaca ttacagaacc   3240
aatttttgtt gaggatcatt accaactagt tgggtctttg caggctgctg acacagacat   3300
ctccgcttta gttgaaattg agaaaaatag ccgacatcgc ttcgagttct ttatggatct   3360
tgttggggat cagcctgtgt gtgcgcgcac agcatgggca tacatgaaat ctggtggccg   3420
catttcacat gctttgtctg tgtatagctg tcaacttcgc cagcccaacc aggtacctat   3480
actctctgat tagatcttta caacaataat atagtaatgt caggaataat ataatttggg  3540
agaatttcag gtgaagaaaa tatttgagtt ccttaaagac ggattccatg aagtcagcag   3600
ctccctcgat ttgtcctttg atgatgattc tgttgctgat gaaaaaattc ctttcctagc   3660
```

```
atacctagct agtttcttgc aagagaataa gtctaatcct tgtgagcctc cagctggatg    3720
tttaaatttc cggaatcttg ttgctggatt tatgaagagt taccaccaca tcccattaac    3780
tcctgatgta agacttggtg tctattgcct acaattatgt ttgcttatta gaaattcata    3840
agatcaacct atttgatgct tctcacgtat gcttcatgtg acacttcctt ttcctctggt    3900
gcaccagaat gttgttgtgt tcccatcccg tgctgttgca atcgaaaatg ctcttcggtt    3960
gttctcacct ggacttgcaa ttgttgacga acacctaacc agacacttgc ccaagcaatg    4020
gttaacatct ttagcaattg aggtactttg accgatactc ccctctttct ttctgtgttt    4080
ggaactgtgg aaaatacatg tgttctgtga agaaaaagtt atgctgacaa gaatttcgat    4140
gttattgcca ttcttctaaa tttcaggaaa gtaaccatgc taaagataca gtaactgtaa    4200
tcgaagcacc acgccaatca gatttgctga ttgagttgat caggaaactg aagcctcagg    4260
ttgttgttac tggcatggct cagtttgagg ctatcaccag tgctgctttc gtgaacttat    4320
taagtgtaac gaaagatgtt ggttcccgat tattactaga tatttcagaa catctggaat    4380
tgtctagtct gccaagctca aatggtgtat tgaaatatct tgctgggaag accctgcctt    4440
cacatgcggc tatattgtgt ggcttagtta agaatcaggt gtgtcaat cagcctgaac    4500
tctagttgaa ctgttgtgca tactatatag aatatcttga cttttatatg tactttagaa    4560
acactgttta aatgtactca tttcttttg cttcattta cttgcaggtt tattctgatc    4620
tggaagttgc ttttgctatc tctgaagatc caactgttta taaggcattg tcacaaacta    4680
ttgagctatt ggaaggacat acttctgtga tcagccagca ctattatggt tgtcttttcc    4740
atgagctgct ggcatttcaa attggtgacc ggcatccaca acaagaggta aacatggctt    4800
gcctcttcca gttctccatc tcactcagtt ctgtccacaa ggtgccgaat gatctgttca    4860
agtggacact cccctcagca cgggcaagct agtccatgaa tttggattag ttccctctta    4920
gctgggtact tcgattacac cacaatgagc tcctcaacgt ggtctggttt atgttttca    4980
tgttttccct ctaatgtttg ttgctctt tcagagaga acctgcagaa gtgatatcta    5040
aggagatgat agggttttca agttcagcta tgtccaccct agaaggagct gagttttcg    5100
ttcctggttc catggaatcc ggtgtcatac atatggatct ggaccgcagc ttcttgccag    5160
taccttctgc agtaaacgcc tccattttcg aaagttttgt tcgtcagaac atcactgatt    5220
ctgaaaccga tgtccgttcc agcattcagc agctggtgaa agatagctat ggtttctcag    5280
caggcggtgc ttctgaaatt atatacggga cacctgtct cgcgctcttc aacaagcttg    5340
ttcttttgctg catgcaagaa cagggcacct tgcttttccc cttgggaacc aacgggcatt    5400
acgtcaacgc agcaaagttt gtgaatgcaa ccaccttgac tattccaacg aaggcagatt    5460
caggcttcaa gatcgaacca agtgctctag ccgacacact agagaaggtg tctcagccgt    5520
gggtctatat ttctggcccc acaatcaacc ctactggctt cctgtacagt gacgacgata    5580
tagcagagct gctttctgtc tgtgcgacat acggagccag ggtggtgata gatacctcct    5640
cctctggtct ggagttccaa gccaccggct gcagccagtg gaatttggaa agatgtcttt    5700
ctaatgtcaa gtcttcaaag ccctcgttct ccgttgtcct gctcggagag ctgtcctttg    5760
agctgaccac ggctgggctt gatttcgggt ttctgattat gagcgactcg tccttggttg    5820
acacatttta cagttcccca agcttgagtc ggccacacag cacgttgaag tacacgttca    5880
ggaagctgtt gggtcttaag aaccagaagg atcagcattt ctctgatctc atccttgagc    5940
agaaggagac gttgaagaat cgtgccgacc agttgatcaa ggtatgcctt ttgggatatc    6000
```

```
ctgtgtttag gctctctgtt ttcttcccct gatcagctct ccgatcccct tacatcctta    6060
ggctaatttc agtacttcaa gtttgccacg catttctgac atattctttc ctcttgtttt    6120
attttcctgt gatgtgatga acagacgctt gagagctgcg gctgggacgc tgtgggctgc    6180
catggcggca tctcgatgct tgcaaaaccg accgcctaca ttggcaaatc gctcaaggtg    6240
gacggctttg agggcaagct ggacagccac aacatgaggg aagccctcct gaggtccacc    6300
gggctgtgca ttagcagcag cgggtggaca ggggtgccgg actactgccg cttcagcttt    6360
gctctggaga gcggcgactt cgaccgggcc atggagtgca tcgcccggtt cagggagctg    6420
gtccttggtg gcggtgctaa ggtgaatggt agcaactag                           6459
```

<210> SEQ ID NO 13
<211> LENGTH: 1088
<212> TYPE: PRT
<213> ORGANISM: Barley cv. Prestige

<400> SEQUENCE: 13

```
Met Ala Ala Ala Gly Asp Val Glu Ala Phe Leu Ala Ala Cys Gln
 1               5                  10                  15

Ala Ser Gly Asp Ala Ala Tyr Gly Ala Ala Lys Ala Val Leu Glu Arg
                20                  25                  30

Leu Glu Ala Pro Ala Thr Arg Ala Glu Ala Arg Arg Leu Leu Gly Ala
            35                  40                  45

Val Arg Arg Phe Ala Ala Gly Gly Pro Ala Ala Gly Leu Glu Cys
 50                  55                  60

Phe Arg Thr Phe His Phe Arg Ile His Asp Val Val Leu Asp Pro His
 65                  70                  75                  80

Leu Gln Gly Phe Gln Gln Arg Lys Lys Leu Thr Met Met Glu Ile Pro
                85                  90                  95

Ser Ile Phe Ile Pro Glu Asp Trp Ser Phe Thr Phe Tyr Glu Gly Leu
            100                 105                 110

Asn Arg His Pro Asp Ser Ile Phe Arg Asp Lys Thr Val Ala Glu Leu
        115                 120                 125

Gly Cys Gly Asn Gly Trp Ile Ser Ile Ala Leu Ala Glu Lys Trp Cys
    130                 135                 140

Pro Ser Lys Val Tyr Gly Leu Asp Ile Asn Pro Arg Ala Ile Lys Ile
145                 150                 155                 160

Ala Trp Ile Asn Leu Tyr Leu Asn Ala Leu Asp Asp Gly Leu Pro
                165                 170                 175

Ile Tyr Asp Ala Glu Gly Lys Thr Leu Leu Asp Arg Val Glu Phe Tyr
            180                 185                 190

Glu Ser Asp Leu Leu Ser Tyr Cys Arg Asp Asn Lys Ile Glu Leu Asp
        195                 200                 205

Arg Ile Val Gly Cys Ile Pro Gln Ile Leu Asn Pro Asn Pro Glu Ala
    210                 215                 220

Met Ser Lys Ile Val Thr Glu Asn Ser Ser Glu Glu Phe Leu Tyr Ser
225                 230                 235                 240

Leu Ser Asn Tyr Cys Ala Leu Gln Gly Phe Val Glu Asp Gln Phe Gly
                245                 250                 255

Leu Gly Leu Ile Ala Arg Ala Val Glu Gly Ile Ser Val Ile Lys
            260                 265                 270

Pro Ser Gly Leu Met Val Phe Asn Met Gly Gly Arg Pro Gly Gln Gly
        275                 280                 285

Val Cys Glu Arg Leu Phe Leu Arg Arg Gly Phe Arg Ile Asn Lys Leu
```

```
            290                 295                 300
Trp Gln Thr Lys Ile Met Gln Ala Ala Asp Thr Asp Ile Ser Ala Leu
305                 310                 315                 320

Val Glu Ile Glu Lys Asn Ser Arg His Arg Phe Glu Phe Phe Met Asp
                325                 330                 335

Leu Val Gly Asp Gln Pro Val Cys Ala Arg Thr Ala Trp Ala Tyr Met
                340                 345                 350

Lys Ser Gly Gly Arg Ile Ser His Ala Leu Ser Val Tyr Ser Cys Gln
                355                 360                 365

Leu Arg Gln Pro Asn Gln Val Lys Lys Ile Phe Glu Phe Leu Lys Asp
        370                 375                 380

Gly Phe His Glu Val Ser Ser Leu Asp Leu Ser Phe Asp Asp Asp
385                 390                 395                 400

Ser Val Ala Asp Glu Lys Ile Pro Phe Leu Ala Tyr Leu Ala Ser Phe
                405                 410                 415

Leu Gln Glu Asn Lys Ser Asn Pro Cys Glu Pro Pro Ala Gly Cys Leu
                420                 425                 430

Asn Phe Arg Asn Leu Val Ala Gly Phe Met Lys Ser Tyr His His Ile
        435                 440                 445

Pro Leu Thr Pro Asp Asn Val Val Phe Pro Ser Arg Ala Val Ala
        450                 455                 460

Ile Glu Asn Ala Leu Arg Leu Phe Ser Pro Gly Leu Ala Ile Val Asp
465                 470                 475                 480

Glu His Leu Thr Arg His Leu Pro Lys Gln Trp Leu Thr Ser Leu Ala
                485                 490                 495

Ile Glu Glu Ser Asn His Ala Lys Asp Thr Val Thr Val Ile Glu Ala
                500                 505                 510

Pro Arg Gln Ser Asp Leu Leu Ile Glu Leu Ile Arg Lys Leu Lys Pro
        515                 520                 525

Gln Val Val Thr Gly Met Ala Gln Phe Glu Ala Ile Thr Ser Ala
        530                 535                 540

Ala Phe Val Asn Leu Leu Ser Val Thr Lys Asp Val Gly Ser Arg Leu
545                 550                 555                 560

Leu Leu Asp Ile Ser Glu His Leu Glu Leu Ser Ser Leu Pro Ser Ser
                565                 570                 575

Asn Gly Val Leu Lys Tyr Leu Ala Gly Lys Thr Leu Pro Ser His Ala
                580                 585                 590

Ala Ile Leu Cys Gly Leu Val Lys Asn Gln Val Tyr Ser Asp Leu Glu
        595                 600                 605

Val Ala Phe Ala Ile Ser Glu Asp Pro Thr Val Tyr Lys Ala Leu Ser
        610                 615                 620

Gln Thr Ile Glu Leu Leu Glu Gly His Thr Ser Val Ile Ser Gln His
625                 630                 635                 640

Tyr Tyr Gly Cys Leu Phe His Glu Leu Leu Ala Phe Gln Ile Gly Asp
                645                 650                 655

Arg His Pro Gln Gln Glu Arg Glu Pro Ala Glu Val Ile Ser Lys Glu
                660                 665                 670

Met Ile Gly Phe Ser Ser Ala Met Ser Thr Leu Glu Gly Ala Glu
                675                 680                 685

Phe Phe Val Pro Gly Ser Met Glu Ser Gly Val Ile His Met Asp Leu
        690                 695                 700

Asp Arg Ser Phe Leu Pro Val Pro Ser Ala Val Asn Ala Ser Ile Phe
705                 710                 715                 720
```

Glu Ser Phe Val Arg Gln Asn Ile Thr Asp Ser Thr Asp Val Arg
                725                 730                 735

Ser Ser Ile Gln Gln Leu Val Lys Asp Ser Tyr Gly Phe Ser Ala Gly
                740                 745                 750

Gly Ala Ser Glu Ile Ile Tyr Gly Asn Thr Cys Leu Ala Leu Phe Asn
                755                 760                 765

Lys Leu Val Leu Cys Cys Met Gln Glu Gln Gly Thr Leu Leu Phe Pro
770                 775                 780

Leu Gly Thr Asn Gly His Tyr Val Asn Ala Ala Lys Phe Val Asn Ala
785                 790                 795                 800

Thr Thr Leu Thr Ile Pro Thr Lys Ala Asp Ser Gly Phe Lys Ile Glu
                805                 810                 815

Pro Ser Ala Leu Ala Asp Thr Leu Glu Lys Val Ser Gln Pro Trp Val
                820                 825                 830

Tyr Ile Ser Gly Pro Thr Ile Asn Pro Thr Gly Phe Leu Tyr Ser Asp
                835                 840                 845

Asp Asp Ile Ala Glu Leu Leu Ser Val Cys Ala Thr Tyr Gly Ala Arg
                850                 855                 860

Val Val Ile Asp Thr Ser Ser Ser Gly Leu Glu Phe Gln Ala Thr Gly
865                 870                 875                 880

Cys Ser Gln Trp Asn Leu Glu Arg Cys Leu Ser Asn Val Lys Ser Ser
                885                 890                 895

Lys Pro Ser Phe Ser Val Val Leu Leu Gly Glu Leu Ser Phe Glu Leu
                900                 905                 910

Thr Thr Ala Gly Leu Asp Phe Gly Phe Leu Ile Met Ser Asp Ser Ser
                915                 920                 925

Leu Val Asp Thr Phe Tyr Ser Phe Pro Ser Leu Ser Arg Pro His Ser
                930                 935                 940

Thr Leu Lys Tyr Thr Phe Arg Lys Leu Leu Gly Leu Lys Asn Gln Lys
945                 950                 955                 960

Asp Gln His Phe Ser Asp Leu Ile Leu Glu Gln Lys Glu Thr Leu Lys
                965                 970                 975

Asn Arg Ala Asp Gln Leu Ile Lys Thr Leu Glu Ser Cys Gly Trp Asp
                980                 985                 990

Ala Val Gly Cys His Gly Gly Ile Ser Met Leu Ala Lys Pro Thr Ala
                995                 1000                1005

Tyr Ile Gly Lys Ser Leu Lys Val Asp Gly Phe Glu Gly Lys Leu
        1010                1015                1020

Asp Ser His Asn Met Arg Glu Ala Leu Leu Arg Ser Thr Gly Leu
        1025                1030                1035

Cys Ile Ser Ser Ser Gly Trp Thr Gly Val Pro Asp Tyr Cys Arg
        1040                1045                1050

Phe Ser Phe Ala Leu Glu Ser Gly Asp Phe Asp Arg Ala Met Glu
        1055                1060                1065

Cys Ile Ala Arg Phe Arg Glu Leu Val Leu Gly Gly Gly Ala Lys
        1070                1075                1080

Val Asn Gly Ser Asn
        1085

<210> SEQ ID NO 14
<211> LENGTH: 1088
<212> TYPE: PRT
<213> ORGANISM: Barley cv. Sebastian

```
<400> SEQUENCE: 14

Met Ala Ala Ala Ala Gly Asp Val Glu Ala Phe Leu Ala Ala Cys Gln
1               5                   10                  15

Ala Ser Gly Asp Ala Ala Tyr Gly Ala Ala Lys Ala Val Leu Glu Arg
            20                  25                  30

Leu Glu Ala Pro Ala Thr Arg Ala Glu Ala Arg Arg Leu Leu Gly Ala
        35                  40                  45

Val Arg Arg Arg Phe Ala Ala Gly Gly Pro Ala Ala Gly Leu Glu Cys
    50                  55                  60

Phe Arg Thr Phe His Phe Arg Ile His Asp Val Val Leu Asp Pro His
65                  70                  75                  80

Leu Gln Gly Phe Gln Gln Arg Lys Lys Leu Thr Met Met Glu Ile Pro
                85                  90                  95

Ser Ile Phe Ile Pro Glu Asp Trp Ser Phe Thr Phe Tyr Glu Gly Leu
            100                 105                 110

Asn Arg His Pro Asp Ser Ile Phe Arg Asp Lys Thr Val Ala Glu Leu
        115                 120                 125

Gly Cys Gly Asn Gly Trp Ile Ser Ile Ala Leu Ala Glu Lys Trp Cys
    130                 135                 140

Pro Ser Lys Val Tyr Gly Leu Asp Ile Asn Pro Arg Pro Ile Lys Ile
145                 150                 155                 160

Ala Trp Ile Asn Leu Tyr Leu Asn Ala Leu Asp Asp Gly Leu Pro
                165                 170                 175

Ile Tyr Asp Ala Glu Gly Lys Thr Leu Leu Asp Arg Val Glu Phe Tyr
            180                 185                 190

Glu Ser Asp Leu Leu Ser Tyr Cys Arg Asp Asn Lys Ile Glu Leu Asp
        195                 200                 205

Arg Ile Val Gly Cys Ile Pro Gln Ile Leu Asn Pro Asn Pro Glu Ala
    210                 215                 220

Met Ser Lys Ile Val Thr Glu Asn Ser Ser Glu Glu Phe Leu Tyr Ser
225                 230                 235                 240

Leu Ser Asn Tyr Cys Ala Leu Gln Gly Phe Val Glu Asp Gln Phe Gly
                245                 250                 255

Leu Gly Leu Ile Ala Arg Ala Val Glu Glu Gly Ile Ser Val Ile Lys
            260                 265                 270

Pro Ser Gly Leu Met Val Phe Asn Met Gly Gly Arg Pro Gly Gln Gly
        275                 280                 285

Val Cys Glu Arg Leu Phe Leu Arg Arg Gly Phe Arg Ile Asn Lys Leu
    290                 295                 300

Trp Gln Thr Lys Ile Met Gln Ala Ala Asp Thr Asp Ile Ser Ala Leu
305                 310                 315                 320

Val Glu Ile Glu Lys Asn Ser Arg His Arg Phe Glu Phe Phe Met Asp
                325                 330                 335

Leu Val Gly Asp Gln Pro Val Cys Ala Arg Thr Ala Trp Ala Tyr Met
            340                 345                 350

Lys Ser Gly Gly Arg Ile Ser His Ala Leu Ser Val Tyr Ser Cys Gln
        355                 360                 365

Leu Arg Gln Pro Asn Gln Val Lys Lys Ile Phe Glu Phe Leu Lys Asp
    370                 375                 380

Gly Phe His Glu Val Ser Ser Leu Asp Leu Ser Phe Asp Asp
385                 390                 395                 400

Ser Val Ala Asp Glu Lys Ile Pro Phe Leu Ala Tyr Leu Ala Ser Phe
                405                 410                 415
```

```
Leu Gln Glu Asn Lys Ser Asn Pro Cys Glu Pro Pro Ala Gly Cys Leu
                420             425             430

Asn Phe Arg Asn Leu Val Ala Gly Phe Met Lys Ser Tyr His His Ile
            435             440             445

Pro Leu Thr Pro Asp Asn Val Val Phe Pro Ser Arg Ala Val Ala
        450             455             460

Ile Glu Asn Ala Leu Arg Leu Phe Ser Pro Gly Leu Ala Ile Val Asp
465             470             475             480

Glu His Leu Thr Arg His Leu Pro Lys Gln Trp Leu Thr Ser Leu Ala
                485             490             495

Ile Glu Glu Ser Asn His Ala Lys Asp Thr Val Thr Val Ile Glu Ala
                500             505             510

Pro Arg Gln Ser Asp Leu Leu Ile Glu Leu Ile Arg Lys Leu Lys Pro
            515             520             525

Gln Val Val Thr Gly Met Ala Gln Phe Glu Ala Ile Thr Ser Ala
        530             535             540

Ala Phe Val Asn Leu Leu Ser Val Thr Lys Asp Val Gly Ser Arg Leu
545             550             555             560

Leu Leu Asp Ile Ser Glu His Leu Glu Leu Ser Ser Leu Pro Ser Ser
                565             570             575

Asn Gly Val Leu Lys Tyr Leu Ala Gly Lys Thr Leu Pro Ser His Ala
            580             585             590

Ala Ile Leu Cys Gly Leu Val Lys Asn Gln Val Tyr Ser Asp Leu Glu
            595             600             605

Val Ala Phe Ala Ile Ser Glu Asp Pro Thr Val Tyr Lys Ala Leu Ser
            610             615             620

Gln Thr Ile Glu Leu Leu Glu Gly His Thr Ser Val Ile Ser Gln His
625             630             635             640

Tyr Tyr Gly Cys Leu Phe His Glu Leu Leu Ala Phe Gln Ile Gly Asp
                645             650             655

Arg His Pro Gln Gln Glu Arg Glu Pro Ala Glu Val Ile Ser Lys Glu
            660             665             670

Met Ile Gly Phe Ser Ser Ser Ala Met Ser Thr Leu Glu Gly Ala Glu
            675             680             685

Phe Phe Val Pro Gly Ser Met Glu Ser Gly Val Ile His Met Asp Leu
        690             695             700

Asp Arg Ser Phe Leu Pro Val Pro Ser Ala Val Asn Ala Ser Ile Phe
705             710             715             720

Glu Ser Phe Val Arg Gln Asn Ile Thr Asp Ser Glu Thr Asp Val Arg
                725             730             735

Ser Ser Ile Gln Gln Leu Val Lys Asp Ser Tyr Gly Phe Ser Ala Gly
            740             745             750

Gly Ala Ser Glu Ile Ile Tyr Gly Asn Thr Cys Leu Ala Leu Phe Asn
            755             760             765

Lys Leu Val Leu Cys Cys Met Gln Glu Gln Gly Thr Leu Leu Phe Pro
            770             775             780

Leu Gly Thr Asn Gly His Tyr Val Asn Ala Ala Lys Phe Val Asn Ala
785             790             795             800

Thr Thr Leu Thr Ile Pro Thr Lys Ala Asp Ser Gly Phe Lys Ile Glu
            805             810             815

Pro Ser Ala Leu Ala Asp Thr Leu Glu Lys Val Ser Gln Pro Trp Val
            820             825             830
```

```
Tyr Ile Ser Gly Pro Thr Ile Asn Pro Thr Gly Phe Leu Tyr Ser Asp
            835                 840                 845

Asp Asp Ile Ala Glu Leu Leu Ser Val Cys Ala Thr Tyr Gly Ala Arg
850                 855                 860

Val Val Ile Asp Thr Ser Ser Ser Gly Leu Glu Phe Gln Ala Thr Gly
865                 870                 875                 880

Cys Ser Gln Trp Asn Leu Glu Arg Cys Leu Ser Asn Val Lys Ser Ser
            885                 890                 895

Lys Pro Ser Phe Ser Val Val Leu Gly Glu Leu Ser Phe Glu Leu
            900                 905                 910

Thr Thr Ala Gly Leu Asp Phe Gly Phe Leu Ile Met Ser Asp Ser Ser
            915                 920                 925

Leu Val Asp Thr Phe Tyr Ser Phe Pro Ser Leu Ser Arg Pro His Ser
            930                 935                 940

Thr Leu Lys Tyr Thr Phe Arg Lys Leu Leu Gly Leu Lys Asn Gln Lys
945                 950                 955                 960

Asp Gln His Phe Ser Asp Leu Ile Leu Glu Lys Glu Thr Leu Lys
            965                 970                 975

Asn Arg Ala Asp Gln Leu Ile Lys Met Leu Glu Ser Cys Gly Trp Asp
            980                 985                 990

Ala Val Gly Cys His Gly Gly Ile Ser Met Leu Ala Lys Pro Thr Ala
            995                 1000                1005

Tyr Ile Gly Lys Ser Leu Lys Val Asp Gly Phe Glu Gly Lys Leu
            1010                1015                1020

Asp Ser His Asn Met Arg Glu Ala Leu Leu Arg Ser Thr Gly Leu
            1025                1030                1035

Cys Ile Ser Ser Ser Gly Trp Thr Gly Val Pro Asp Tyr Cys Arg
            1040                1045                1050

Phe Ser Phe Ala Leu Glu Ser Gly Asp Phe Asp Arg Ala Met Glu
            1055                1060                1065

Cys Ile Ala Arg Phe Arg Glu Leu Val Leu Gly Gly Ala Lys
            1070                1075                1080

Val Asn Gly Ser Asn
    1085

<210> SEQ ID NO 15
<211> LENGTH: 186
<212> TYPE: PRT
<213> ORGANISM: Barley, Mutant 14018

<400> SEQUENCE: 15

Met Ala Ala Ala Gly Asp Val Glu Ala Phe Leu Ala Ala Cys Gln
1                   5                   10                  15

Ala Ser Gly Asp Ala Ala Tyr Gly Ala Ala Lys Ala Val Leu Glu Arg
            20                  25                  30

Leu Glu Ala Pro Ala Thr Arg Ala Glu Ala Arg Arg Leu Leu Gly Ala
            35                  40                  45

Val Arg Arg Arg Phe Ala Ala Gly Gly Pro Ala Ala Gly Leu Glu Cys
            50                  55                  60

Phe Arg Thr Phe His Phe Arg Ile His Asp Val Val Leu Asp Pro His
65                  70                  75                  80

Leu Gln Gly Phe Gln Gln Arg Lys Lys Leu Thr Met Met Glu Ile Pro
            85                  90                  95

Ser Ile Phe Ile Pro Glu Asp Trp Ser Phe Thr Phe Tyr Glu Gly Leu
            100                 105                 110
```

```
Asn Arg His Pro Asp Ser Ile Phe Arg Asp Lys Thr Val Ala Glu Leu
            115                 120                 125

Gly Cys Gly Asn Gly Trp Ile Ser Ile Ala Leu Ala Glu Lys Trp Cys
        130                 135                 140

Pro Ser Lys Ile Gly Thr Ser Cys Ser Val Asp Ile Tyr Leu Ile Ser
145                 150                 155                 160

Phe Val Ala Asn Met Gly Pro Ala Glu Val Arg His Leu Leu Arg Leu
                165                 170                 175

Leu Tyr Met Lys Leu Leu Gly Val Cys Gln
            180                 185

<210> SEQ ID NO 16
<211> LENGTH: 180
<212> TYPE: PRT
<213> ORGANISM: Barley, Mutant 14018

<400> SEQUENCE: 16

Met Ala Ala Ala Gly Asp Val Glu Ala Phe Leu Ala Ala Cys Gln
1               5                   10                  15

Ala Ser Gly Asp Ala Ala Tyr Gly Ala Ala Lys Ala Val Leu Glu Arg
            20                  25                  30

Leu Glu Ala Pro Ala Thr Arg Ala Glu Ala Arg Arg Leu Leu Gly Ala
        35                  40                  45

Val Arg Arg Phe Ala Ala Gly Gly Pro Ala Ala Gly Leu Glu Cys
50                  55                  60

Phe Arg Thr Phe His Phe Arg Ile His Asp Val Val Leu Asp Pro His
65                  70                  75                  80

Leu Gln Gly Phe Gln Gln Arg Lys Lys Leu Thr Met Met Glu Ile Pro
                85                  90                  95

Ser Ile Phe Ile Pro Glu Asp Trp Ser Phe Thr Phe Tyr Glu Gly Leu
            100                 105                 110

Asn Arg His Pro Asp Ser Ile Phe Arg Asp Lys Thr Val Ala Glu Leu
            115                 120                 125

Gly Cys Gly Asn Gly Trp Ile Ser Ile Ala Leu Ala Glu Lys Trp Cys
        130                 135                 140

Pro Ser Lys Ile Gly Thr Ser Cys Ser Val Asp Ile Tyr Leu Ile Ser
145                 150                 155                 160

Phe Val Ala Asn Met Gly Pro Ala Glu Val Arg His Leu Leu Arg Phe
                165                 170                 175

Met Val Trp Ile
            180

<210> SEQ ID NO 17
<211> LENGTH: 163
<212> TYPE: PRT
<213> ORGANISM: Barley, Mutant 14018

<400> SEQUENCE: 17

Met Ala Ala Ala Gly Asp Val Glu Ala Phe Leu Ala Ala Cys Gln
1               5                   10                  15

Ala Ser Gly Asp Ala Ala Tyr Gly Ala Ala Lys Ala Val Leu Glu Arg
            20                  25                  30

Leu Glu Ala Pro Ala Thr Arg Ala Glu Ala Arg Arg Leu Leu Gly Ala
        35                  40                  45

Val Arg Arg Phe Ala Ala Gly Gly Pro Ala Ala Gly Leu Glu Cys
50                  55                  60
```

```
Phe Arg Thr Phe His Phe Arg Ile His Asp Val Val Leu Asp Pro His
 65                  70                  75                  80

Leu Gln Gly Phe Gln Gln Arg Lys Lys Leu Thr Met Met Glu Ile Pro
                 85                  90                  95

Ser Ile Phe Ile Pro Glu Asp Trp Ser Phe Thr Phe Tyr Glu Gly Leu
            100                 105                 110

Asn Arg His Pro Asp Ser Ile Phe Arg Asp Lys Thr Val Ala Glu Leu
        115                 120                 125

Gly Cys Gly Asn Gly Leu Trp Ser Gly Tyr Lys Pro Lys Ser Tyr Gln
    130                 135                 140

Asp Cys Met Asp Lys Pro Leu Leu Glu Cys Thr Arg Arg Arg Trp Ser
145                 150                 155                 160

Pro Asn Leu
```

ENERGY SAVING BREWING METHOD

This application is a National Stage of Application of PCT/DK2011/050186, filed 31 May 2011, which claims benefit of Serial No. PA 2010 70243, filed 3 Jun. 2010 in Denmark; this application is a Continuation-in-Part U.S. Application No. 13/132,765, filed 3 Jun. 2011, which is a National Stage of PCT/DK2009/050315 filed on 1 Dec. 2009, which claims benefit of Serial No. PA 2008 01708 filed 3 Dec. 2008; this application is a Continuation-in-Part of U.S. application Ser. No. 13/141,579, filed 22 Jun. 2011, which is a National Stage of PCT/DK2009/050355 filed 28 Dec. 2009, which claims benefit of Serial No. PA 2008 01851 filed 30 Dec. 2008, and which applications are incorporated herein by reference. To the extent appropriate, a claim of priority is made to each of the above disclosed applications.

All patent and non-patent references cited in the application are hereby incorporated by reference in their entirety.

FIELD OF INVENTION

The present invention relates to energy saving methods for preparing barley based beverages, for example malt based beverages, such as beer. The invention further-more relates to barley plants useful in the disclosed methods. In particular, the invention describes barley plants with combined traits of null-lipoxygenase-1 (null-LOX-1), null-lipoxygenase-2 (null-LOX-2) and null-S-adenosylmethionine:methionine S-methyltransferase (also denoted null-5-methionine (Met)-S-methyltransferase or null-MMT) in one plant, i.e. a null-LOX-1-null-LOX-2-null-MMT barley plant (herein also interchangeably denoted double-null-LOX-null-MMT), which is particularly useful for the energy saving methods to prepare barley based beverages described herein.

BACKGROUND OF INVENTION

Malting Facility and Brewhouse

Barley—*Hordeum vulgare*, L.—is a diploid cereal that is widely grown in different climates for food and beverage production. Beverages based on said plant are produced in large quantities, employing highly energy consuming methods, for example in the malting and brewhouse facilities for kiln drying and wort boiling operations, respectively.

Malting usually involves steeping of barley kernels to promote germination, followed by kiln drying at elevated temperatures, which makes the process particularly energy consuming. Key objectives of kiln drying include: (i) germination termination; (ii) drying the germinated barley grains; (iii) enzyme denaturation, particularly lipase and LOX enzymes in wild-type barley; and (iv) conversion of the dimethyl sulphide (DMS) precursors (DMSP), principally consisting of S-methyl-Met (SMM), into volatile DMS [after kiln drying of a normal pale malt, the DMSP content is on average 4 ppm in dry weight (see Technology Brewing and Malting, Kunze, 2004, VLB Berlin, pp. 158-162)]. Certain enzyme activities are preserved during kiln drying (e.g. amylase, protease, etc).

In the brewhouse, there is in general terms consumed about half of the energy in the brewing process, corresponding to an energy load in the range 48,000-83,000 kJ/hL (Modern brewhouse technology, Brauwelt International 2004, p. 410-412). Most of the energy is consumed in the process of wort boiling, the goal of which is in general to provide: (i) coagulation of protein; (ii) inactivation of enzymes; (iii) wort sterilization; (iv) extraction of hop compounds; (v) isomerization of α-acids; and (vi) evaporation of unwanted volatile compounds, e.g. the sulphury and stale off-flavours DMS and trans-2-nonenal (T2N), respectively.

Wort is traditionally boiled for at least 50-60 min to allow for an overall evaporation of at least 10-15% (see Technology Brewing and Malting, Kunze, 2004, VLB Berlin, Chapter 11), but now often improved by technological means to 6-8%. It has also been attempted to reduce energy consumption even further, for example by minimizing evaporation to as little as 3-4%, combined with a stripping process that extracts unwanted volatile compounds into injected steam (see e.g. Bonacchelli et al., 2007). It is thought that the levels of unwanted, volatile compounds in wort makes it difficult to further reduce, or even eliminate, evaporation.

T2N

T2N—a volatile $C_9$ alkenal with a boiling point of 88° C.—was characterized in 1970 as the molecule conferring the cardboard-like off-flavour in beer (Jamieson and Ghelluwe, 1970). Since the taste-threshold level for T2N in humans is extremely low, previously determined to be around 0.7 nM or 0.1 ppb (Meilgaard, 1975), products with even minute levels of the aldehyde are perceived as aged. However, levels of T2N are generally very low in fresh beer (Lermusieau et al., 1999), indicating that processes during ageing promote liberation of free T2N from corresponding adducts (Nyborg et al., 1999). A subsequent observation revealed correlation between the T2N potential of wort and formed free T2N after product storage (Kuroda et al., 2005).

Kiln drying and wort boiling represent separate processing steps that may be targets for manipulation in order to achieve reduced levels of T2N in barley-based beverages. While kiln drying at high temperatures confer inactivation of the enzymes involved in T2N formation, such as lipases and LOXs (see e.g. Technology Brewing and Malting, Kunze, 2004, VLB Berlin, p. 162), free T2N also can be removed by wort boiling.

The barley kernel contains three LOX enzymes—known as LOX-1, LOX-2, and LOX-3 (van Mechelen et al., 1999). The major activity of LOX-1 catalyzes the formation of 9-hydroperoxy octadecadienoic acid (9-HPODE; see FIG. 1A for a partial overview of the LOX pathway)—a precursor of both T2N and trihydroxy octadecenoic acids (THAs)—from linoleic acid. LOX-2 mainly catalyzes the conversion of linoleic acid to 13-HPODE, which is further metabolized to hexanal, a $C_6$ aldehyde with a ~0.4-ppm-high taste threshold (Meilgaard, supra). Given LOX-2's very little 9-HPODE—forming activity, several reports have noted that T2N is produced via a biochemical pathway involving conversion of linoleic acid to 9-HPODE, initially catalyzed by LOX-1, followed by cleavage of 9-HPODE through 9-hydroperoxide lyase action (see, for example, Kuroda et al., 2003, 2005; Noodermeer et al., 2001).

With regard to the above-mentioned properties of LOX-1, said enzyme is a useful target for inactivation in efforts to lower T2N levels in barley-based products, actually substantiated by the following two observations: (i) Kuroda et al. (2005) suggested a correlation between LOX-1 activity and the wort T2N potential, primarily because LOX-2 has been considered inferior with respect to formation of the T2N potential in said wort. However, there appears to be no correlation between the overall LOX activity in malt and the wort T2N potential; (ii) methods have been described to obtain reduced activity of LOX-1 in barley.

Several different barley plants have been developed that share the property of partially or totally reduced LOX-1 activity. For example, barley kernels and barley plants having a low LOX-1 activity were disclosed in PCT Application WO 02/053721 to Douma, A. C. et al., while WO 2005/087934 to Breddam, K. et al. focused on two different barley mutants deficient in LOX-1 activity—a splice site mutant and a mutant with a premature translational stop codon. In addition, EP 1609866 to Hirota, N. et al. described a barley plant with no LOX-1 activity, which was identified by screening a collection of barley landraces.

DMS

In barley-based beverages—as also in many vegetables and foodstuffs, including tea, cocoa, milk, wines, spirits (such as rum), sweet corn, and numerous cooked vegetables—DMS adds prominent odour and flavour notes to the product. Depending on beer type, DMS levels typically can reach 150 ppb (150 µg/L), with said compound often contributing to undesirable "cooked vegetable" or "cabbage-like" flavours. In this regard, it is not only important that the sensory threshold is around 30-45 µg/L (Meilgaard, 1982), but also that the DMS-derived flavour remains unnoticed at levels <10 ppb.

The aforementioned kiln drying and wort boiling processing steps in beer production influence the levels of DMS in barley-based beverages, primarily because both of said processes may induce chemical conversion of SMM to DMS (see e.g. Technology Brewing and Malting, Kunze, 2004, VLB Berlin, p. 160). Due to the latter compound's boiling point of only 37-38° C., a major part of the DMS will simply evaporate to the atmosphere. However, when duration or vigor of wort boiling is inadequate to convert residual SMM, DMS may continue to form as the wort cools—with high probability of transfer to the beer.

SMM represents almost all, possibly all, of the DMSP pool in germinating barley kernels, synthesized by the action of functional components of the SMM cycle (FIG. 1B). Here, MMT catalyzes the transfer of a methyl group from S-adenosyl-Met (AdoMet) to Met, forming SMM. The latter compound can in turn serve as methyl donor for Met synthesis from homocysteine (Hcy), a reaction catalyzed by the enzyme Hcy-S-methyltransferase (HMT).

In the scientific literature, it has been considered an opportunity to regulate SMM synthesis by using, for example, antisense technology (McElroy and Jacobsen, 1995). However, no guidance was provided on relevant target genes to antisense. Despite that, it was expected that the likelihood of a positive outcome was questionable as large reductions in SMM levels could be harmful to barley growth and development. Alternative solutions for obtaining lower level of SMM were not discussed by McElroy and Jacobsen (supra). And also, as discussed in detail herein below, antisense technologies have not been successfully applied in barley to completely abolish gene expression.

Technological methods for reducing the level of DMS in beer have been developed. Thus, AU 38578/93 described a method of reducing DMS levels in malt, comprising steam treatment of said malt. In patent application US 2006/0057684 to Bisgaard-Frantzen, H. et al. was described brewing methods comprising heat treatment of mash at ≥70° C. And in U.S. Pat. No. 5,242,694 to Reuther, H. was noted methods for preparing low-carbohydrate beer, wherein the methods comprise extensive boiling of wort followed by washing of said wort with carbon dioxide ($CO_2$). However, all of the aforementioned treatments are known to consume high levels of energy, possibly altering malt or wort characteristics.

Mutant Barley Plants

Unfortunately no methods are available for preparing transgenic barley plants that completely lack expression of a given protein. In general for barley, application of antisense techniques lead to transgenic plants still expressing some of the protein in question (see for example Robbins et al. 1998; Stahl et al., 2004; Hansen et al., 2007). Also, effective methods for preparing specific mutations using chimeric RNA/DNA or site directed mutagenesis have not been developed for use in barley plants. In line with this, and despite intensive efforts, inventors of the present application remain unaware of any published example on successful oligonucleotide-directed gene targeting in barley. Although not pursued in barley, Iida and Terada (2005) note that oligonucleotide-directed gene targeting has been tested in maize, tobacco and rice—but in all cases with the herbicide-resistance gene acetolactate synthase (ALS) as a target. According to the conclusion by Iida and Terada (supra), it remains to be established whether the above-mentioned strategy, with appropriate modifications, is applicable to genes other than those directly selectable, such as the ALS genes. Although not yet substantiated, targeted mutagenesis using zinc-finger nucleases represents another tool that potentially could allow future investigations in basic plant biology or modifications in crop plants (Durai et al., 2005; Tzfira and White, 2005; Kumar et al., 2006). Also in this case, however, mutagenesis has not been pursued or successfully applied in barley.

Nonetheless, barley mutants may be prepared by random mutagenesis using irradiation or chemical treatment, such as incubating kernels for 12 h to over night with a solution of sodium azide ($NaN_3$). An example concerns barley kernels mutagenized through the use of $NaN_3$, and subsequently screened for high levels of free phosphate in an effort to screen for low-phytate mutants (Rasmussen and Hatzack, 1998); a total of 10 mutants out of 2,000 screened kernels were identified. Although far from always possible, finding a particular mutant after $NaN_3$ treatment is dependent on persistence and an effective screening method.

Sustainability

In a world seeking solutions to its energy, environmental and food challenges, one focus of society is to limit or reduce atmospheric $CO_2$ concentrations—especially focusing on $CO_2$ emissions from industrial systems. The principal reason is that an increase in the concentration of a greenhouse gas causes a change in Earth's energy balance, with $CO_2$ being the largest single contributor. As a consequence of the widespread concern about climate change, and also based on economic rationales and constraints, breweries may play an active part by using energy as efficiently as possible, and by reducing greenhouse gas emissions from operations more effectively. Until now, the focal point has been on technological means to solve the above-mentioned issues on sustainability.

SUMMARY OF INVENTION

Heat treatment methods have been described for reduction of LOX activity and DMS levels of DMS. Said treatment was generally undertaken during malting and/or preparation of wort, meaning that products of LOX activity were allowed to accumulate in barley until undertaking of the heat treatment. Analysis of barley revealed that significant amounts of products of LOX activity were present in barley, even prior to malting (Wackerbauer and Meyna, 2002). It is apparent that heat treatment methods are highly energy consuming.

The present invention provides methods for preparing a cereal based beverage with low levels of one or more off-flavours and precursors thereof (notably low levels of DMS and T2N and precursors thereof), wherein the method involves reduced energy input, the method comprising the steps of:
- (i) providing a cereal plant, or part thereof, wherein said cereal plant comprises:
  - (a) a first mutation that results in a total loss of functional LOX-1; and
  - (b) a second mutation resulting in a total loss of functional LOX-2; and
  - (c) a third mutation resulting in a total loss of functional MMT;
- (ii) optionally malting at least part of said cereal, thereby obtaining malted cereal;
- (iii) mashing said cereal and/or malted cereal and optionally additional adjuncts, thereby obtaining a wort;
- (iv) heating said wort optionally in the presence of additional ingredient(s), wherein at the most 4% of the wort volume is evaporated, thereby obtaining heated wort;
- (v) processing said heated wort into a beverage;

thereby preparing a cereal derived beverage with low levels of one or more off-flavours and precursors thereof.

In particular, the invention provides methods for preparing a barley based beverage with low levels of one or more off-flavours and precursors thereof (notably low levels of DMS and T2N and precursors thereof), wherein the method involves reduced energy input, the method comprising the steps of:
- (i) providing a barley plant, or part thereof, wherein said barley plant comprises:
  - (a) a first mutation that results in a total loss of functional LOX-1; and
  - (b) a second mutation resulting in a total loss of functional LOX-2; and
  - (c) a third mutation resulting in a total loss of functional MMT;
- (ii) optionally malting at least part of said barley, thereby obtaining malted barley;
- (iii) mashing said barley and/or malted barley and optionally additional adjuncts, thereby obtaining a wort;
- (iv) heating said wort optionally in the presence of additional ingredient(s), wherein at the most 4% of the wort volume is evaporated, thereby obtaining heated wort;
- (v) processing said heated wort into a beverage;

thereby preparing a barley derived beverage with low levels of one or more off-flavours and precursors thereof.

It is also an objective of the present invention to provide barley plants suitable for use in the disclosed methods. Thus, it is an objective of the invention to provide agronomically useful barley plants comprising all of the three different traits, i.e. a null-LOX-1-null-LOX-2-null-MMT barley plant (herein also denoted "double-null-LOX-null-MMT"). Selection of a useful barley plant concerns not only plant vigour, but also the combined lack of LOX-1, LOX-2 and MMT enzymic activities, utilizing biochemical assays as described in detail herein below. The barley plants according to the present invention may be introduced into any suitable breeding scheme, such as selfing, backcrossing, crossing to populations, and the like.

A way to accelerate the process of plant breeding comprises the initial multiplication of generated mutants by application of tissue culture and regeneration techniques. As described in Example 3 and schematically shown in FIG. 3, a traditional barley breeding scheme was employed to generate a barley plant with the double-null-LOX-null-MMT trait from a double-null-LOX barley plant and a null-MMT plant. Thus, another aspect of the present invention is to provide cells, which upon growth and differentiation produce barley plants having the double-null-LOX-null-MMT trait. For example, breeding may involve traditional crossings, preparing fertile anther-derived, doubled haploid plants using tissue culturing such as anther culture or microspore culturings.

The present invention discloses that reduced energy input for kiln drying is achievable through application of null-LOX grains, because there is no need to inactivate endogenous LOX enzyme. The double-null-LOX-null-MMT mutant described by the present invention can be utilized for production of a raw material lacking the corresponding enzyme activities, making the mutant of interest to achieve lower energy consumption during kiln drying in the malting facility, but also in the brewhouse because of reduced heat input during wort boiling.

From a beer or beverage quality standpoint, there is also a need for a double-null-LOX-null-MMT raw material, in order to functionally eliminate or drastically reduce T2N and DMS levels in the products.

In addition to the above-mentioned, potential properties of a double-null-LOX-null-MMT malt, a corresponding barley could be useful for the production of off-flavour— low barley beer, here defined as beer produced through omission of the malting process, but instead providing a mash consisting of numerous external enzymes (e.g. Ondea Pro, an enzyme mixture produced by Novozymes). As addressed herein below in Example 7, it was surprising by the present inventors to find that wort produced by mashing unmalted double-null-LOX-null-MMT barley raw material contained very low levels of T2N and DMS off-flavours, while that from wild-type barley was surprisingly high in DMS levels despite that the barley kernels had not undergone germination. Accordingly, some DMS precursors (DMSP) must be present in the dry, mature barley kernel—a new, not-yet described property, which is explored in beer products of the instant application. Accordingly, double-null-LOX-null-MMT grains are useful in the production of barley-brewed wort and beer in order to minimize levels of T2N and DMS in fresh and aged beer products.

DESCRIPTION OF DRAWINGS

FIG. 1B shows selected components of the SMM cycle in which SMM is synthesized by methyl transfer from S-adenosylmethionine (SAM) to methionine (Met), catalyzed by the enzyme Met-S-methyltransferase (MMT). SMM can in turn serve as methyl donor for Met synthesis from homocysteine (Hcy), in a reaction catalyzed by the enzyme Hcy-S-methyltransferase (HMT). The illustration shows how the essentially irreversible reactions are connected. Each turn of the cycle is futile as it consumes and then regenerates two Mets while converting ATP to adenosine, PPi and Pi (not shown).

and SMM. Fluorescence of OPA-derivatized extracts of barley shoots were excited at 340 nm and emission measured at 450 nm. (B) HPLC-based separation of extracts from the indicated mutants and wild-type cv. Sebastian. Separation of components in a mutant extract provided a chromatogram without SMM-specific peaks.

Figure 3:
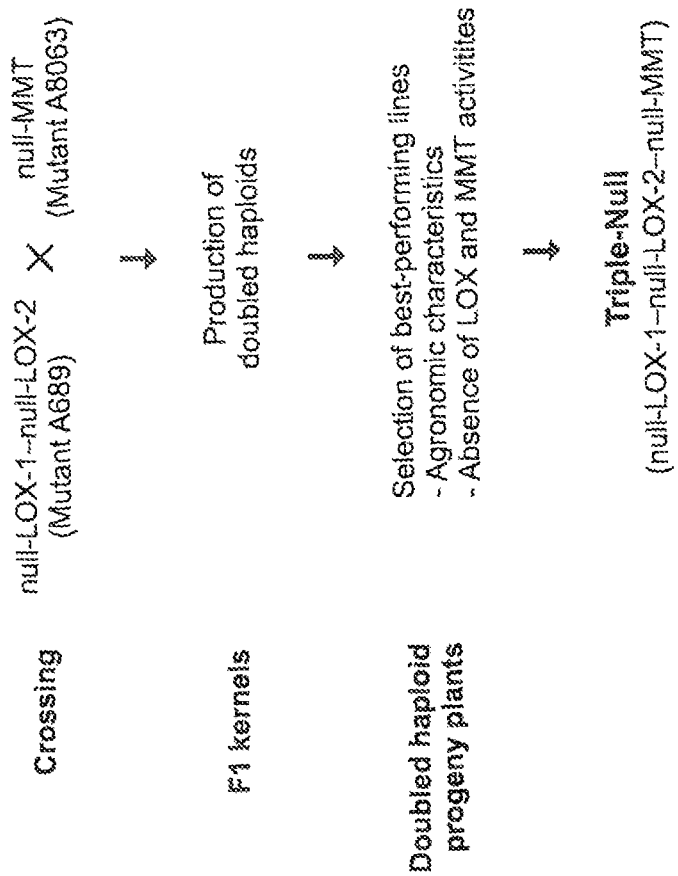

FIG. 3 illustrates the work flow from crossing of null-LOX-1-null-LOX-2 (double-null-LOX) and null-MMT barley plants to the Triple-Null barley.

Figure 4:
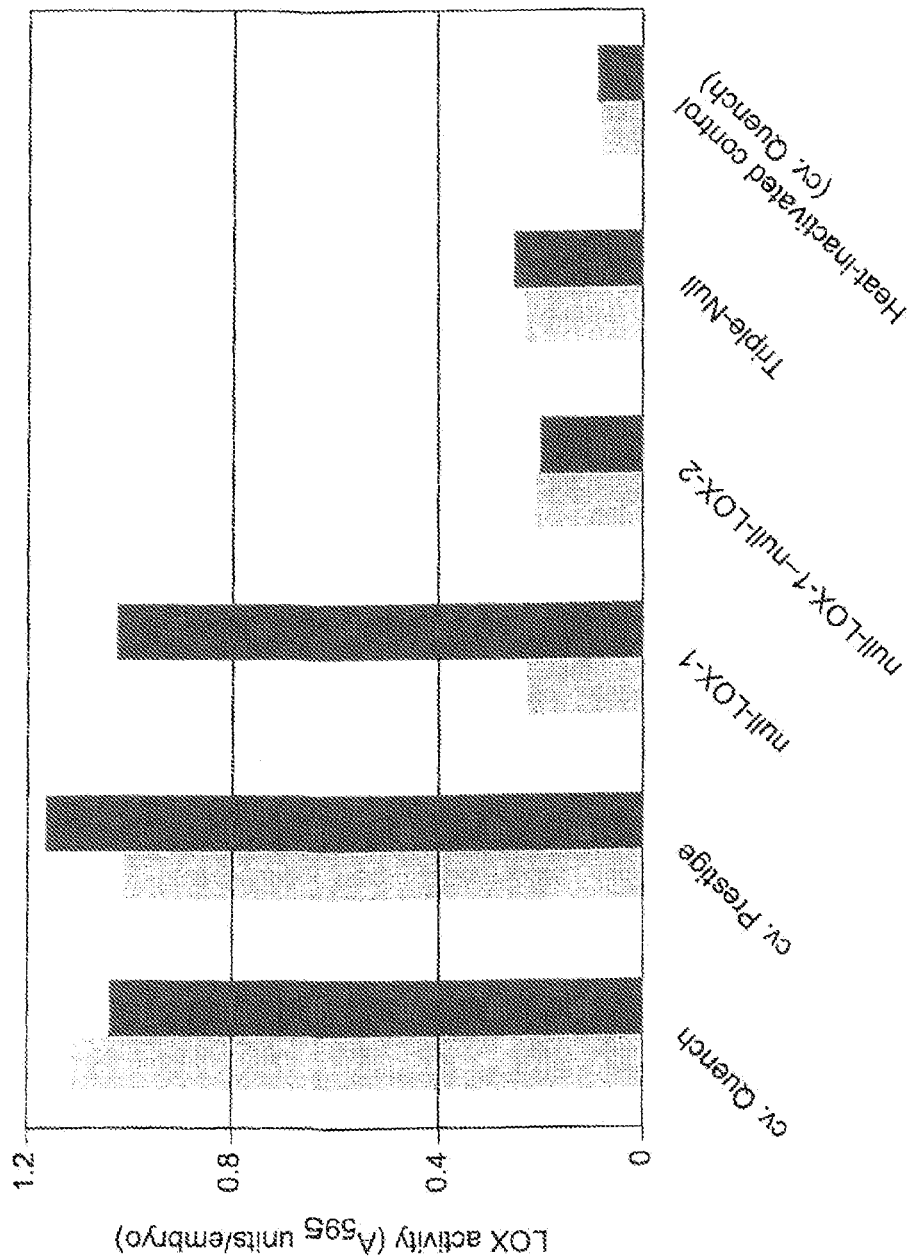

FIG. 4 highlights LOX activities in samples derived from the indicated plants. Results of total LOX activity determinations in mature barley kernels are shown with grey bars, while those in black indicate LOX-2 activities in germinating embryos. Very low LOX activities were observed in both null-LOX-1-null-LOX-2 and Triple-Null plants.

Figure 5:
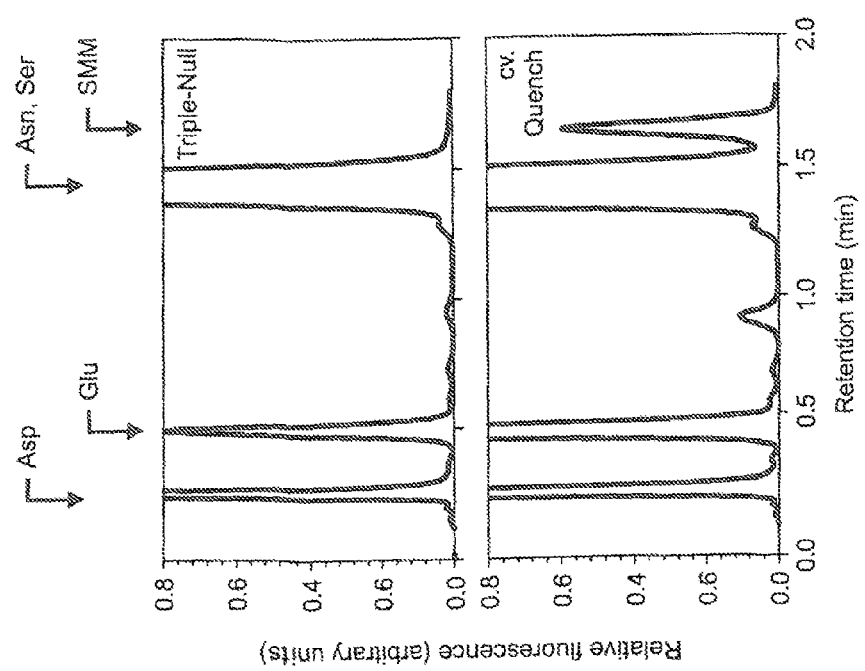

FIG. 5 illustrates that germinated Triple-Null plants cannot synthesize SMM (upper panel in which the corresponding peak is absent in the UPLC chromatogram), while said compound is easily detectable as a corresponding chromatogram peak in an extract of germinating wild-type barley, cv. Quench (lower panel). The elution positions of selected amino acids are indicated.

Figure 6:
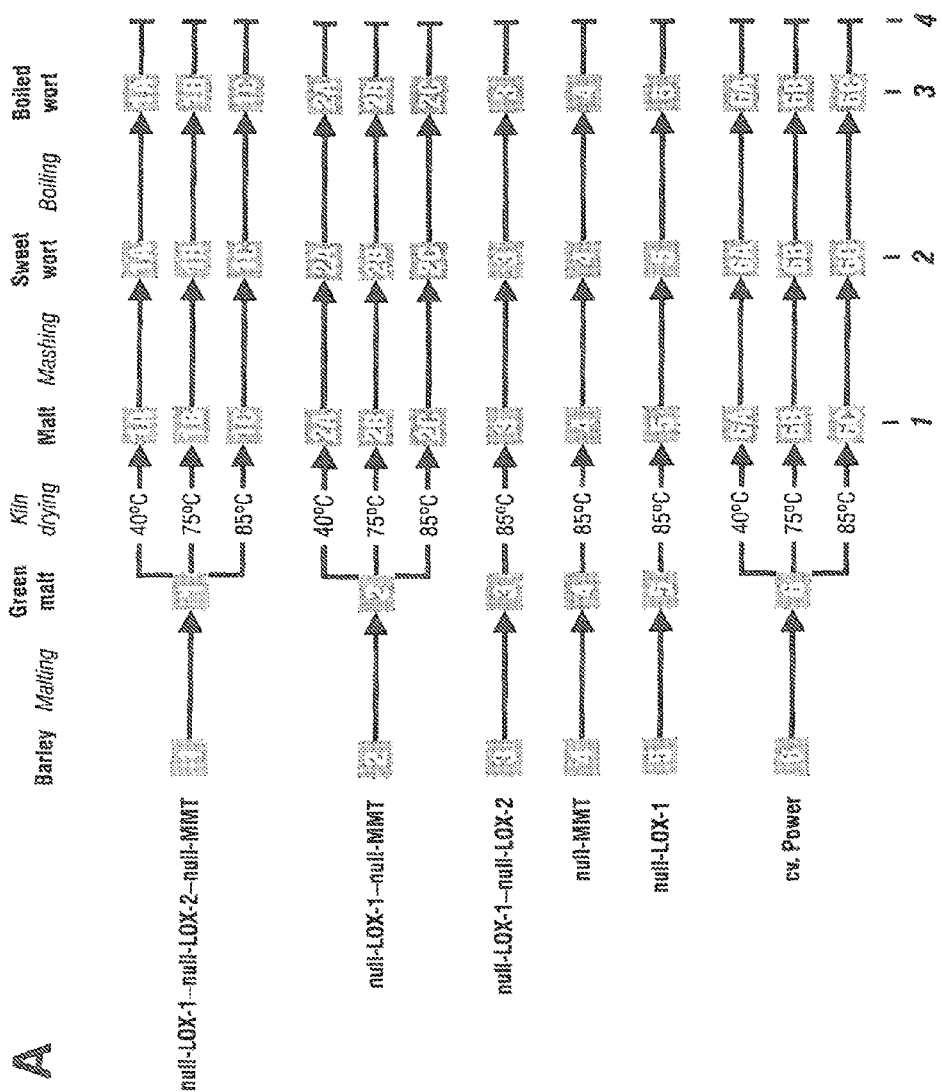
Figure 6:
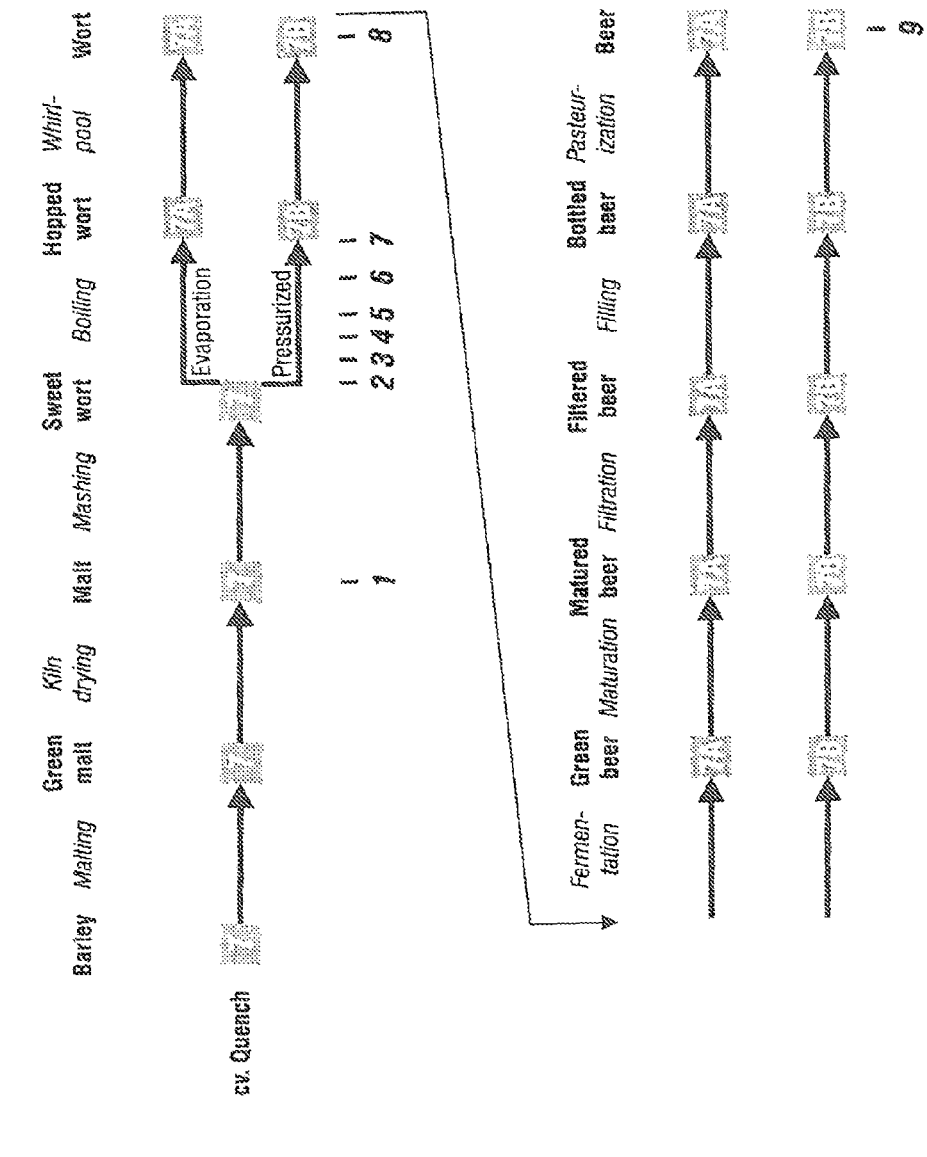
Figure 6:
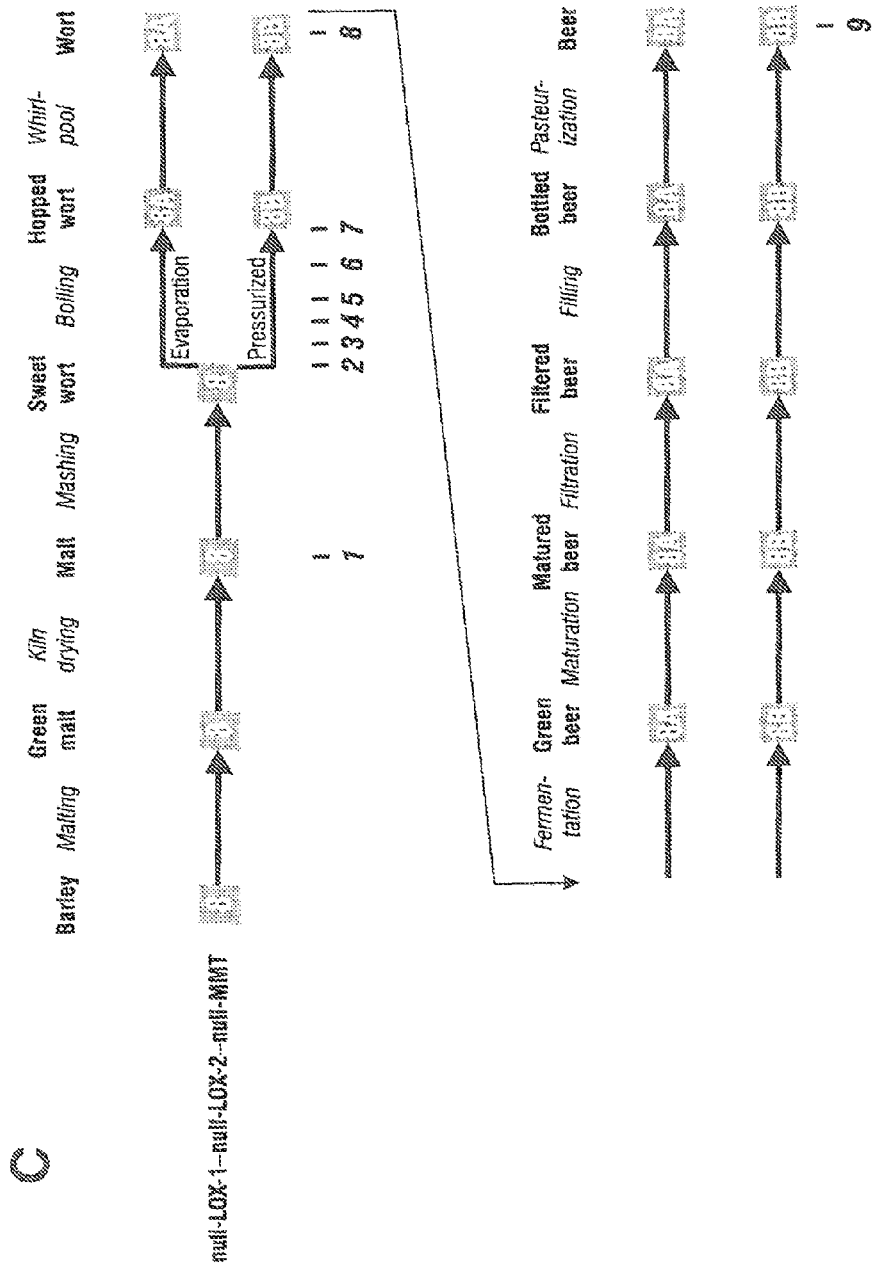

FIG. 6 details graphically the workflow of micro-maltings and -mashings (A), in addition to that of pilot-maltings, -mashings and -brewings of kernels from wild-type barley (B) and the Triple-Null mutant (C). The flow of individual samples (marked in grey boxes) is illustrated with arrows. Start, intermediate and end products are marked in bold font type on top of the list; processes are in italics font type. In (A), numbers in italics below the flow list refer to sampling points for determination of levels of free T2N and its precursors (2 and 4), and DMSP and DMS (1, 2, 3), where measuring point 4 represents cooled-down, heated wort. For micro-mashing of barley flour, samples were measured at sampling points 2, 3 and 4. In (B) and (C), DMSP, DMS, T2N precursor and free T2N levels were determined at all sampling points.

Figure 7:
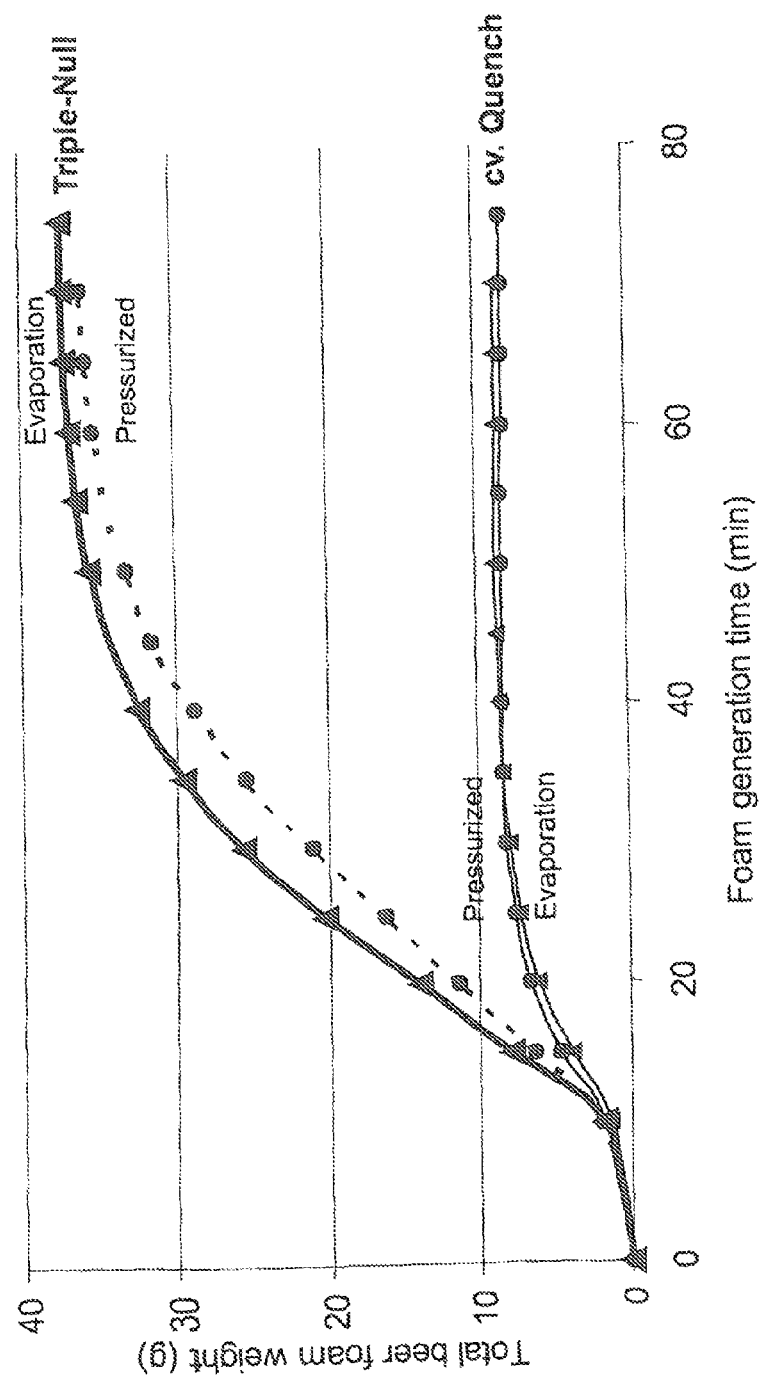

FIG. 7 shows that beer made of Triple-Null malt generates around four times more beer foam than that of a beer brewed on malt of wild-type cv. Quench—irrespective of pressurized or normal wort boiling.

Figure 8:
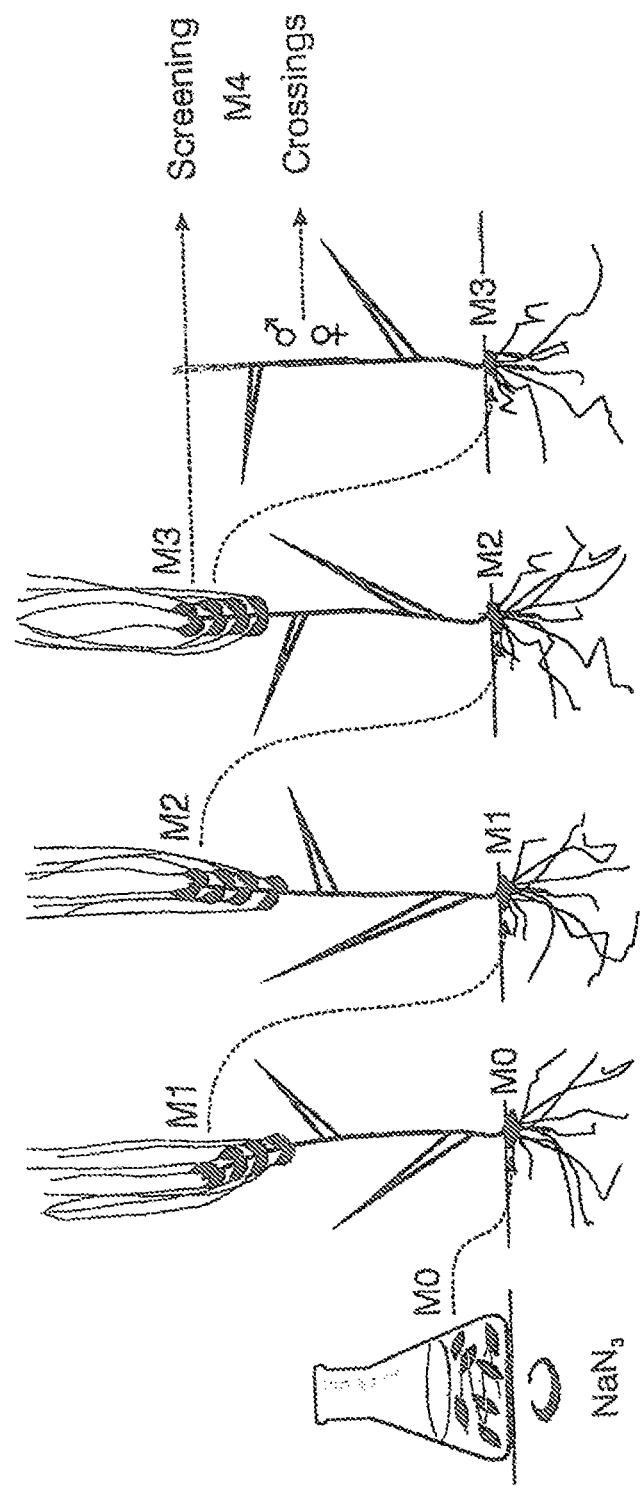

FIG. 8 provides one example on how $NaN_3$-mutagenized barley kernels may be propagated. Kernels of generation M0 grow into plants that develop kernels of generation M1. These may be sown for development into M1 plants, which produce new kernels of generation M2. Next, M2 plants grow and set kernels of generation M3. Kernels of generation M3 may be allowed to germinate, for example for analysis of coleoptiles of the germinated M3 plants. Additionally, flowers derived from kernels of M3 plants may be used in crossings with barley lines or cultivars to obtain plants of generation M4. A similar figure is presented as FIG. 1A in PCT patent application WO 2005/087934 to Breddam, K. et al.

Figure 9:
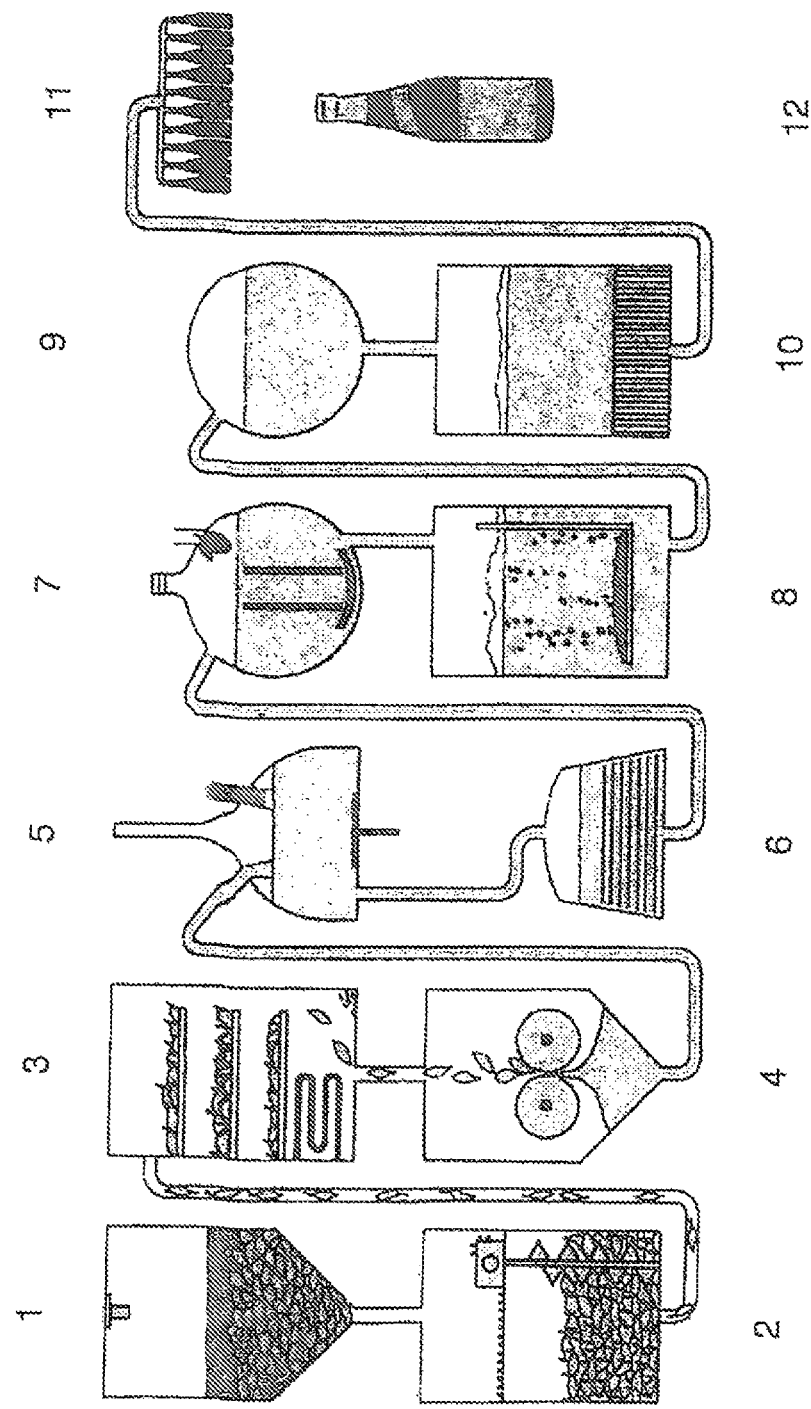

FIG. 9 shows a simplified, schematic overview of a preferred beer production process, including steeping of barley grain (1), malting (2), kiln drying (3), milling of the dried malt (4), mashing (5), filtration (6), wort boiling in the presence of added hops (7), fermentation in the presence of yeast (8), beer maturation (9), beer filtration (10), packaging, such as the packaging into bottles, cans, or the like (11), and labeling (12). The individual processes can be grouped into sections comprising malt production (1-3), wort production (4-7), fermentation (8-9), and the preparation of the finished beer (10-12). Although a preferred method is illustrated, other methods may be envisaged that omit some of the depicted steps (filtration may, for example, be omitted, or hops may not be added—or additional steps may be added, such as addition of adjuncts, sugars, syrups, or carbonate).

Figure 10:
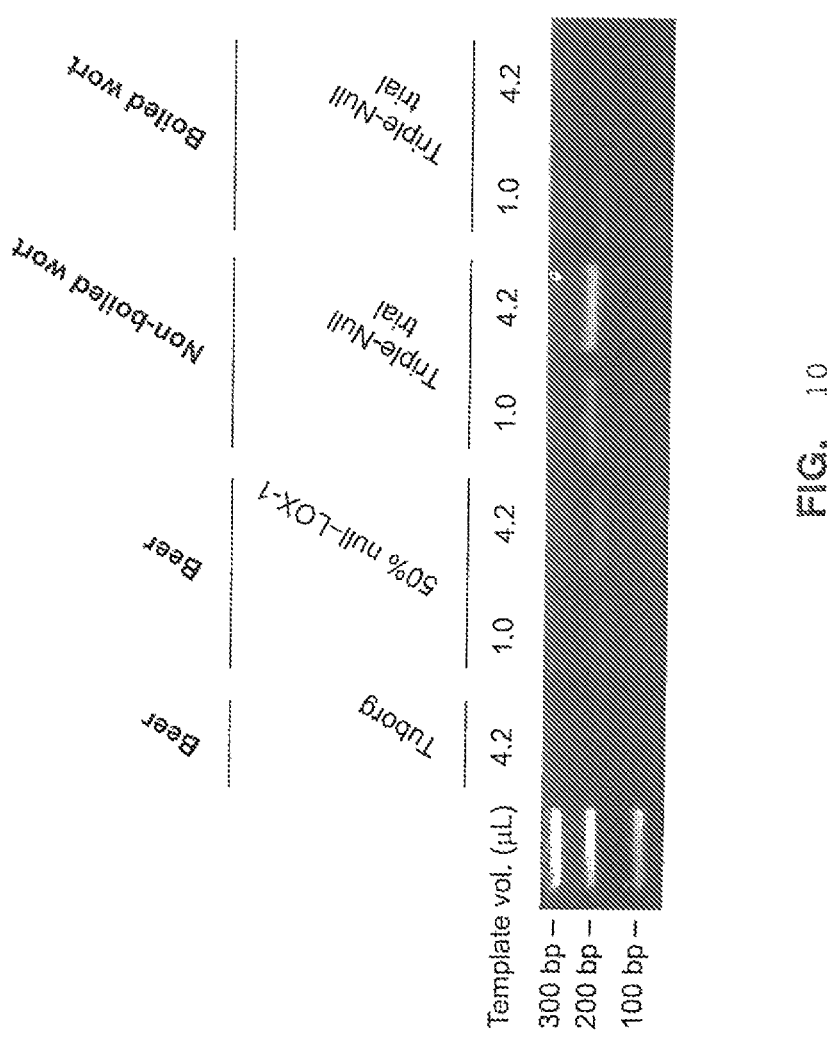

FIG. 10 illustrates how to identify null-LOX-1 derived DNA fragments in beer (mixture comprising 50% null-LOX-1) and wort samples (Triple-Null) produced using null-LOX-1 raw materials, but not in beer produced using flour of a mixture of normal malt and wild-type barley (Tuborg). Template volume of the concluding PCR amplification is indicated.

DETAILED DESCRIPTION OF THE INVENTION

Definitions

In the description, figures, and tables that follow, a number of terms are used. In order to provide the specifications and claims, including the scope to be given such terms, the following definitions are provided:

As used herein, "a" can mean one or more, depending on the context in which it is used.

The term "agronomic trait" describes a phenotypic or genetic trait of a plant that contributes to the performance or economic value of said plant. Such traits include disease resistance, insect resistance, virus resistance, nematode resistance, drought tolerance, high salinity tolerance, yield, plant height, days to maturity, kernel grading (i.e. kernel size fractionation), kernel nitrogen content and the like.

The term "barley" in reference to the process of making barley based beverages, such as beer, particularly when used to describe the malting process, means barley kernels. In all other cases, unless otherwise specified, "barley" means the barley plant (*Hordeum vulgare*, L.), including any breeding line or cultivar or variety, whereas part of a barley plant may be any part of a barley plant, for example any tissue or cells.

In the process of "barley brewing", wort is prepared by incubating an extract of un-malted barley with an enzyme mixture that hydrolyzes the barley components. A wort produced by barley brewing may be denoted "barley wort", or "barley-brewed" wort.

By "disease resistance" is intended that the plants avoid disease symptoms, which are the outcome of plant-pathogen interactions. In this way, pathogens are prevented from causing plant diseases and the associated disease symptoms. Alternatively, the disease symptoms caused by the pathogen are minimized or reduced, or even prevented.

"DMSP" as used herein is an abbreviation for DMS precursor or DMS potential, i.e. the molecules that can be converted to DMS during the production of beverages. SMM represents the major part of, if not all, DMSP. The level of DMSP is defined herein as the quantity of DMS that can be generated from DMSP in the specified plant material, or product thereof, by boiling at alkaline conditions for 1 h. As defined herein, 1 ppb DMSP can be converted to 1 ppb DMS.

As used herein the term "double null-LOX" refers to a first mutation resulting in a total loss of functional LOX-1 and a second mutation resulting in a total loss of functional LOX-2. Thus, a "double null-LOX barley plant" is a barley plant comprising a first mutation resulting in a total loss of functional LOX-1 and a second mutation resulting in a total loss of functional LOX-2. Similarly, "double null-LOX kernels" are kernels having a first mutation resulting in a total loss of functional LOX-1 and a second mutation resulting in a total loss of functional LOX-2.

The term "double-null-LOX-null-MMT" refers to a first mutation resulting in a total loss of functional LOX-1 and a second mutation resulting in a total loss of functional LOX-2 and a third mutation resulting in a total loss of functional MMT. Thus, a "double-null-LOX-null-MMT barley plant" is a barley plant comprising a first mutation resulting in a total loss of functional LOX-1 and a second mutation resulting in a total loss of functional LOX-2 and a third mutation resulting in a total loss of functional MMT. Similarly, "double-null-LOX-null-MMT kernels" are kernels having a first mutation resulting in a total loss of functional LOX-1 and a second mutation resulting in a total loss of functional LOX-2 and a third mutation resulting in a total loss of functional MMT.

An example of a useful double-null-LOX-null-MMT is denoted "Triple-Null" and described in the Examples herein below.

A "cereal" plant, as defined herein, is a member of the Graminae plant family, cultivated primarily for their starch-containing seeds or kernels. Cereal plants include, but are not limited to barley (Hordeum), wheat (Triticum), rice (Oryza), maize (Zea), rye (Secale), oat (Avena), sorghum (Sorghum), and Triticale, a rye-wheat hybrid.

By "encoding" or "encoded", in the context of a specified nucleic acid, is meant comprising the information for translation into the specified protein. A nucleic acid or polynucleotide encoding a protein may comprise non-translated sequences, e.g. introns, within translated regions of the nucleic acid, or may lack such intervening non-translated sequences, e.g. in cDNA. The information by which a protein is encoded is specified by the use of codons.

As used herein, "expression" in the context of nucleic acids is to be understood as the transcription and accumulation of sense mRNA or antisense RNA derived from a nucleic acid fragment. "Expression" used in the context of proteins refers to translation of mRNA into a polypeptide.

The term "gene" means the segment of DNA involved in producing a polypeptide chain; it includes regions preceding and following the coding region (promoter and terminator). Furthermore, plant genes generally consist of exons interrupted by introns. After transcription into RNA, the introns are removed by splicing to generate a mature messenger RNA (mRNA). The "splice sites" between exons and introns are typically determined by consensus sequences acting as splice signals for the splicing process, consisting of a deletion of the intron from the primary RNA transcript and a joining or fusion of the ends of the remaining RNA on either side of the excised intron. In some cases, alternate or different patterns of splicing can generate different proteins from the same single stretch of DNA. A native gene may be referred to as an "endogenous gene".

As used herein, "heterologous" in reference to a nucleic acid is a nucleic acid that originates from a foreign species, or, if from the same species, is substantially modified from its native form in composition and/or genomic locus by deliberate human intervention.

The term "germination" as used herein means the beginning or resumption of growth by a barley kernel in various compositions, such as normal soil as found in nature. Thus, a germinating embryo is an embryo undergoing germination. Germination can also take place in the soil of pots placed in growth chambers an the like, or for example take place on wet filter paper placed in standard laboratory Petri dishes or during malting (for example, in steep tanks or germination boxes of the malting factory). Germination is generally understood to include hydration of the kernels, swelling of the kernels and inducing growth of the embryo. Environmental factors affecting germination include moisture, temperature and oxygen level. Root and shoot development is observed.

The term "kernel" is defined to comprise the cereal caryopsis, also denoted internal seed, the lemma and palea. In most barley varieties, the lemma and palea adhere to the caryopsis and are a part of the kernel following threshing. However, naked barley varieties also occur. In these, the caryopsis is free of the lemma and palea and threshes out free as in wheat. The terms "kernel" and "grain" are used interchangeably herein.

"Grain development" refers to the period starting with fertilization of the egg cell by a pollen cell. During fertilization metabolic reserves—e.g. sugars, oligosaccharides, starch, phenolics, amino acids, and proteins—are deposited, with and without vacuole targeting, to various tissues in the kernel (grain) endosperm, testa, aleurone, and scutellum, thus leading to kernel (grain) enlargement, kernel (grain) filling, and ending with kernel (grain) desiccation.

The term "total loss of functional." refers to the lack of the given enzymatic activity. Thus a barley plant with a "total loss of functional LOX-1 and LOX-2 is a barley plant with no detectable LOX-1 and LOX-2 activities. In the context of the present invention, LOX-1 and LOX-2 activities are determined by an assay procedure determining the formation of 9-HPODE and 13-HPODE from linoleic acid, even though LOX-1 and LOX-2 enzymes may have other activities. Preferably, formation of 9-HPODE and 13-HPODE from linoleic acid is determined as described in Example 4 of international patent PCT/DK2009/050355. The activity should be determined using protein extracts of germinated embryos. In the context of the present invention, generation of a chromatogram peak corresponding to less than 5%, preferably less than 3% of the 9-HPODE peak of the standard shown in FIG. 5A of international patent PCT/DK2009/050355, and/or a peak corresponding to less than 5%, preferably less than 3% of the 13-HPODE peak of the standard shown in FIG. 5A of international patent PCT/DK2009/050355, when using linoleic acid as substrate, is considered as no detectable LOX-1 and LOX-2 activity, when using the assay described in Example 4 of international patent PCT/DK2009/050355. Molecular approaches to obtain a total loss of functional LOX comprise generation of mutations that either cause a total absence of transcripts for said enzyme, total absence of the corresponding encoded enzyme, or mutations that totally inactivate the encoded enzyme. Similarly, a barley plant with "total loss of functional MMT" refers to the lack of the MMT enzymatic activity, i.e. a barley plant with no detectable MMT activity when using the assay described in Example 2 herein below. Alternatively, MMT activity of a barley plant is determined by isolating MMT cDNA of said barley and determining whether the protein encoding by said cDNA is capable of catalyzing transfer of a methyl group from SAM to Met, thereby forming SMM.

Figure 1:
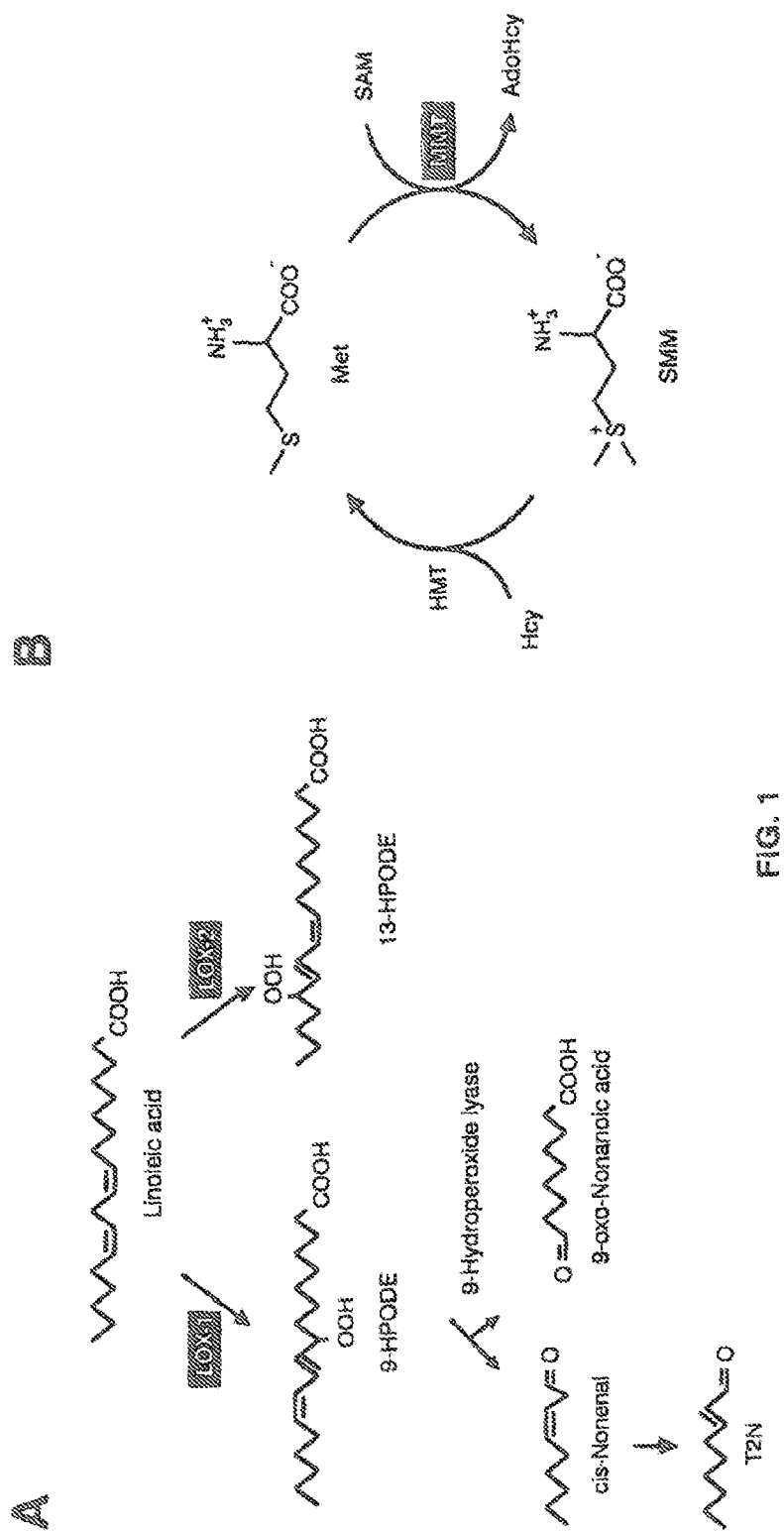
FIG. 1 presents simplified overviews of the barley biochemical pathways leading to formation of T2N (A), and SMM (B). Enzymes absent in Triple-Null barley are highlighted in black boxes. Enzyme abbreviations are those defined in the instant application.

The term "LOX-1 activity" refers to the enzymatic activity of the barley LOX-1 enzyme. Particularly, in the context of the present invention, "LOX-1 activity" is the enzyme-catalyzed dioxygenation of linoleic acid to 9-HPODE, and to a much lesser extent 13-HPODE. Even though the LOX-1 enzyme is capable of catalyzing other reactions, for the purpose of determining the activity of LOX-1 according to the present invention, only the 9- and 13-HPODE forming activities should be considered. FIG. 1A outlines the biochemical pathway wherein linoleic acid is converted to 9-HPODE.

The term "LOX-2 activity" refers to the enzymatic activity of the barley LOX-2 enzyme. Particularly, in the context of the present invention, "LOX-2 activity" is the enzyme-catalyzed dioxygenation of linoleic acid to 13-HPODE, and to a much lesser extent 9-HPODE. Even though the LOX-2 enzyme is capable of catalyzing other reactions, for the purpose of determining the activity of LOX-2 according to the present invention, only the 13- and 9-HPODE forming activities should be considered. FIG. 1A outlines the biochemical pathway wherein linoleic acid is converted to 13-HPODE.

The term "malt beverage" and the term "malt based beverage" refer to beverages prepared using malt, preferably beverages prepared by a method including a step of incubating malt with hot water. The terms are used interchangeably herein. Malt beverages may, for example, be beer or maltinas. Beer of the instant application may also be produced using "barley brewing" (cf. abovementioned definition).

The term "fermented malt beverage" refers to malt beverages, which have been fermented, i.e. incubated with yeast.

"Malting" is a special form of germination of barley kernels taking place under controlled environmental conditions—including, but not limited to steep tanks and germination boxes of the malting factory. In accordance with the process of the present invention, malting begins to occur during and/or after the barley kernels have been steeped. The malting process may be stopped by drying of the barley kernels, for example, in a kiln drying process. Kiln drying is usually performed at elevated temperatures, but an advantage of the present invention is that kiln drying may be performed at lower temperatures. In case that the malt has not been kiln dried, it is denoted "green malt". A malt composition prepared from double-null-LOX-null-MMT barley is understood to comprise double-null-LOX-null-MMT malt, such as pure double null-LOX-null-MMT malt, or any blend of malt comprising double null-LOX-null-MMT malt. Preferably, said composition is prepared only from double-null-LOX-null-MMT malt. Malt may be processed, for example, by milling and thus referred to as "milled malt" or "flour".

"Mashing" is the incubation of milled malt in water. Mashing is preferably performed at a specific temperature, and in a specific volume of water. The temperature and volume of water are of importance, as these affect the rate of decrease of enzyme activity derived from the malt, and hence especially the amount of starch hydrolysis that can occur; protease action may also be of importance. Mashing can occur in the presence of adjuncts, which is understood to comprise any carbohydrate source other than malt, such as, but not limited to, barley (including e.g. double-null-LOX-null-MMT barley), barley syrups, or maize, or rice—either as whole kernels or processed products like grits, syrups or starch. All of the aforementioned adjuncts may be used principally as an additional source of extract (syrups are typically dosed during wort heating). The requirements for processing of the adjunct in the brewery depend on the state and type of adjunct used, and in particular on the starch gelatinization or liquefaction temperatures. If the gelatinization temperature is above that for normal malt saccharification, then starch is gelatinized and liquefied before addition to the mash.

The term "MMT activity" refers to the enzymatic activity of the barley methionine S-methyltransferase enzyme. In the context of the present invention, "MMT activity" is the MMT-catalyzed methylation at the sulfur atom of Met to yield SMM. Even though the MMT enzyme may be capable of catalyzing other reactions, for the purpose of deter-mining the activity of MMT according to the present invention, only the SMM-forming activity should be considered. FIG. 1B outlines the biochemical reactions wherein Met is converted to SMM by methylation.

"Mutations" include deletions, insertions, substitutions, transversions, and point mutations in the coding and non-coding regions of a gene. Deletions may be of the entire gene, or of only a portion of the gene, wherein the noncoding region preferably is either the promoter region, or the terminator region, or introns. Point mutations may concern changes of one base or one base pair, and may result in stop codons, frameshift mutations or amino acid substitutions. With reference to FIG. 8 herein—which presents an overview on how grains of mutated barley may be propagated in a breeding program—grains of generation M3, and directly propagated grains thereof, or of any subsequent generation, including the plants thereof, may be termed "raw mutants". Further, still with reference to FIG. 8 herein, the term "breeding line" refers to grains of generation M4, and any subsequent generation, including the plants thereof, which may be the result of a cross to a cultivar plant, or the result of a cross to another breeding line with a separate, specific trait.

The term "null-LOX" refers to the presence of a mutation in a LOX-encoding gene, causing a total loss of function of the encoded LOX enzyme (either LOX-1 or LOX-2 or both LOX-1 and LOX-2). Mutations that generate premature termination (nonsense) codons in a gene encoding LOX represent only one mechanism by which total loss of functional LOX can be obtained. Molecular approaches to obtain total loss of functional LOX comprise the generation of mutations that cause a total absence of transcripts for said enzyme, or mutations that cause total inactivation of the encoded enzyme. "Null-LOX" with reference to a plant refers to a plant having a mutation resulting in a total loss of functional LOX enzyme.

As used herein, the term "null-MMT" refers to a total loss of functional S-adenosylmethionine:methionine S-methyltransferase enzyme (also denoted methionine S-methyl transferase enzyme). Thus, a "null-MMT barley plant" is a barley plant comprising a mutation in the gene encoding MMT that results in a total loss of functional MMT. Similarly, "null-MMT kernels" are kernels comprising a mutation in the gene encoding MMT, resulting in a total loss of functional MMT.

"Operably linked" is a term used to refer to the association of two or more nucleic acid fragments on a single polynucleotide, so that the function of one is affected by the other. For example, a promoter is operably linked with a coding sequence when it is capable of affecting the expression of that coding sequence, i.e. that the coding sequence is under the transcriptional control of the promoter. Coding sequences can be operably linked to regulatory sequences in sense or antisense orientation.

"PCR" or "polymerase chain reaction" is well known by those skilled in the art as a technique used for the amplification of specific DNA segments (U.S. Pat. Nos. 4,683,195 and 4,800,159 to Mullis, K. B. et al.).

"Plant" or "plant material" includes plant cells, plant protoplasts, and plant cell tissue cultures from which barley plants can be regenerated—including plant calli, and plant cells that are intact in plants, or parts of plants, such as embryos, pollen, ovules, flowers, kernels, leaves, roots, root tips, anthers, or any part or product of a plant. Plant material may in one embodiment be plant cells from which no barley plants can be regenerated.

By the term "plant product" is meant a product resulting from the processing of a plant or plant material. Said plant product may thus, for example, be malt, wort, a fermented or non-fermented beverage, a food, or a feed product.

As used herein, "recombinant" in reference to a protein is a protein that originates from a foreign species, or, if from the same species, is substantially modified from its native form in composition by deliberate human intervention.

A "specialist beer taste panel" within the meaning of the present application is a panel of specialists extensively trained in tasting and describing beer flavours, with special focus on aldehydes, papery taste, old taste, esters, higher alcohols, fatty acids and sulfur components. Although a number of analytical tools exist for evaluating flavour components, the relative significance of flavour-active components are difficult to assess analytically. However, such complex properties can be evaluated by taste specialists. Their continuous training includes tasting and evaluation of standard beer samples.

By the term "splice site" is meant the boundaries between exons and introns of a gene. Thus, a splice site may be the border going from exon to intron (called a "donor site"), or the border separating intron from exon (denoted "acceptor site"). A splice site in plants typically comprises consensus sequences. The 5' end of an intron, in general, consists of a conserved GT dinucleotide (GU in the mRNA), and the 3' end of an intron usually consists of a conserved dinucleotide AG. The 5' splice site of an intron thus comprises the 5' end of an intron, and the 3' splice site comprises the 3' end of an intron. Preferably, within the context of the present invention, the splice site of an intron is either the 5' splice site consisting of the most 5' dinucleotides of the intron (which in general is GT), or the 3' splice site consisting of the most 3' dinucleotides of the intron (which in general is AG).

Unless otherwise noted, "T2N" means trans-2-nonenal (T2N) in the free form. T2N is sometimes also referred to as 2-E-nonenal.

By the term "T2N potential" is described the chemical substances which have the capacity to release T2N, or be converted into T2N, in one or more reactions. In the present context, the T2N potential is defined as the concentration of T2N released into a solution, e.g. wort or beer, during incubation for 2 h at 100° C., pH 4.0. In practical terms, the starting T2N concentration is determined, after which the solution is incubated for 2 h at 100° C., pH 4.0, followed by determination of the T2N concentration. The difference between the starting and the end T2N concentration is denoted the T2N potential. The thermal, acidic treatment causes liberation of T2N from the T2N potential, e.g. from "T2N adducts", the latter term used to describe T2N conjugated to one or more substances, including, but not limited to protein(s), sulphite, cellular debris, cell walls, or the like. In general, T2N adducts per se are not sensed by humans as off-flavours. However, T2N released from said T2N adducts may give rise to an off-flavour.

"Tissue culture" indicates a composition comprising isolated cells of the same or different types, or a collection of such cells organized into parts of a plant—including, for example, protoplasts, calli, embryos, pollen, anthers, and the like.

As used herein, "transgenic" includes reference to a cell that has been modified by the introduction of a heterologous nucleic acid, or that the cell is derived from a cell so modified. Thus, for example, transgenic cells express genes that are not found in an identical form within the native form of the cell, or express native genes that are otherwise abnormally expressed, under-expressed, or not expressed at all as a result of deliberate human intervention. The term "transgenic" as used herein in reference to plants, particularly barley plants, does not encompass the alteration of the cell by methods of traditional plant breeding—e.g. $NaN_3$-based mutagenesis, or by naturally occurring events without deliberate human invention.

"Wild barley", Hordeum vulgare ssp. spontaneum, is considered the progenitor of contemporary cultivated forms of barley. The transition of barley from a wild to a cultivated state is thought to have coincided with domestication of the plant into "barley landraces". These are genetically more closely related to modern cultivars than wild barley.

The term "wild-type" barley refers to a conventionally generated barley plant. Preferably, the term refers to the barley plant from which the barley plants of the instant invention have been derived, i.e the parental plants. Wild-type barley kernels are generally available from, for example, seed companies as "cultivars" or "varieties"—i.e. those genetically similar kernels that are listed by national plant breeding organizations. Despite the availability of several null-LOX-1 barley cultivars (e.g. cvs. Chamonix and Charmay), but for the purpose of a better understanding of the instant invention, all null-LOX-1, null-LOX-2, double-null-LOX and double-null-LOX-null-MMT plants are herein considered mutant plants, and not wild-type plants. The notations "cultivar" and "variety" are used interchangeably herein.

By the term "wort" is meant a liquid extract of malt, such as milled malt, or green malt, or milled green malt. In barley brewing, wort may also be prepared by incubating an extract of un-malted barley with an enzyme mixture that hydrolyzes the barley components. In addition to said malt or barley-derived extracts, the liquid extract may be prepared from malt and additional components, such as additional starch-containing material partly converted into fermentable sugars. The wort is in general obtained by mashing, optionally followed by "sparging", in a process of extracting residual sugars and other compounds from spent grains after mashing with hot water. Sparging is typically conducted in a lauter tun, a mash filter, or another apparatus to allow separation of the extracted water from spent grains. The wort obtained after mashing is generally referred to as "first wort", while the wort obtained after sparging is generally referred to as the "second wort". If not specified, the term wort may be first wort, second wort, or a combination of both. During conventional beer production, wort is boiled together with hops, however the present invention provides methods for reducing boiling or avoiding boiling of wort. Wort without hops, may also be referred to as "sweet wort", whereas wort boiled/heated with hops may be referred to as "boiled wort".

Methods for Preparing a Barley Based Beverage

The present invention relates to methods for preparing a barley based beverage with low levels of off-flavours and precursors thereof, wherein the methods involve reduced energy input. The off-flavours are as described herein below, but preferably the off-flavours are T2N and DMS. The methods involve use of a barley plant, which preferably is a double-null-LOX-null-MMT barley plant. Such barley plants are described in more detail herein below.

According to the present invention, the method in general comprises a step of malting said double-null-LOX-null-MMT barley plant, although in some embodiments of the invention, the barley based beverage is prepared using unmalted barley. Malting is described in more detail in the section "Malting" herein below.

The method furthermore comprises a step of preparing wort by mashing a double-null-LOX-null-MMT barley or a double-null-LOX-null-MMT malt or a mixture thereof— optionally in the presence of additional adjuncts. Mashing is described in more detail in the section "Mashing" herein below.

The method also comprises a step of heating said wort optionally in the presence of additional ingredient(s), wherein at the most 4%, for example at the most 2% of the wort volume is evaporated, thereby obtained heated wort. This step is described in more detail herein in the section "Heating wort".

Finally, the method comprises processing heated wort into a beverage. That part of the method is described in more detail in the section "Preparation of beverages" herein below.

Malting

By the term "malting" is to be understood germination of steeped barley kernels in a process taking place under controlled environmental conditions—for example, as illustrated in FIG. 9, steps 2 and 3—followed by a drying step. Said drying step may preferably be kiln drying of the germinated kernels at elevated temperatures.

Prior to drying, the steeped and germinated barley grains are referred to as "green malt", which may also represent a plant product according to the present invention. This aforementioned sequence of malting events is important for the synthesis of numerous enzymes that cause grain modification, processes that principally depolymerize cell walls of the dead endosperm to mobilize the grain nutrients and activate other depolymerases. In the subsequent drying process, flavour and colour are generated due to chemical browning reactions.

Malting is a highly energy consuming process. Due to the need for high temperature, in particular kiln drying also is an energy consuming process. There are several objectives of kiln drying, including in particular: (i) drying the germinated barley kernels; (ii) stopping germination; (iii) denaturation of lipoxygenases in order to decrease levels of T2N and T2N potential; and (iv) generation of DMS from precursors and removal of DMS in order to decrease levels of DMS potential and DMS.

According to the present invention, kiln drying can be performed at low temperature, and still accomplishing the above-mentioned objectives. By employing a barley plant with loss of functional LOX-1 and LOX-2 there is no requirement for denaturation of lipoxygenases. By employing a barley plant with loss of functional MMT there is no requirement for decreasing the levels of DMS and DMS potential, because said levels are minute in such barley plants. Accordingly, barley grains may be dried and germination may be stopped even at low temperatures.

Thus malting according to the present invention preferably comprises the steps of:
(a) steeping double-null-LOX-null-MMT barley;
(b) germinating said barley; and
(c) drying, preferably by kiln drying, said barley.

Steeping may be performed by any conventional method known to the skilled person. One non-limiting example involves steeping at a temperature in the range of 10 to 25° C. with alternating dry and wet conditions. During steeping, for example, the barley may be incubated wet for in the range of 30 min to 3 h followed by incubation dry for in the range of 30 min to 3 h and optionally repeating said incubation scheme in the range of 2 to 5 times. The final water content after steeping may, for example, be in the range of 40 to 50%.

Germination may be performed by any conventional method known to the skilled person. One non-limiting example involves germination at a temperature in the range of 10 to 25° C., optionally with changing temperature in the range of 1 to 4 h.

A non-limiting example of a suitable steeping and germination scheme is outlined in Example 9 herein below.

The kiln drying may be performed at conventional temperatures, such as at least 75° C., for example in the range of 80 to 90° C., such as in the range of 80 to 85° C. Thus, the malt may, for example be produced by any of the methods described by Briggs et al. (1981) and by Hough et al. (1982). However, any other suitable method for producing malt may also be used with the present invention, such as methods for production of specialty malts, including, but not limited to, methods of roasting the malt. Non-limiting examples are described in Examples 6 and 8 and 9.

Preferably, however, said kiln drying is performed at a low temperature, more preferably at a temperature below 80° C., yet more preferably at a temperature below 75° C., such as at temperature below 70° C., for example at a temperature below 65° C., such as at temperature below 60° C., for example at a temperature below 55° C., such as at temperature below 50° C., for example at a temperature below 45° C., such as at temperature below 41° C. Thus, it is preferred that the temperature does not rise above 80° C., preferably does not rise above 75° C. at any time during kiln drying.

In order to sufficiently dry the germinated barley kernels, the kiln drying time may increase if said drying is performed at a low temperature. Preferably, kiln drying is performed for a time sufficient to reduce the water content of the germinated kernels to less than 10%, preferably to less than 8%, more preferably to less than 6%. Thus, at a conventional kiln drying temperature of 85° C., kilning time may be in the range of 1 to 3 h, whereas kilning at a temperature in the range of 70 to 80° C. may require a kilning time of in the range of 1 to 10 h; kilning at a temperature in the range of 50 to 70° C. may require a kilning time of in the range of 3 to 50 h, whereas kilning at a temperature of below 50° C., for example in the range of 40 to 50° C., may require a kilning time of more than 40 h, such as in the range of 40 to 60 h, for example in the range of 45 to 52 h, such as 48 h.

In one aspect, the invention also relates to malt compositions prepared from double-null-LOX-null-MMT barley kernels by malting, preferably by malting as described herein directly above.

Said malt compositions comprise low levels of T2N and T2N potential even when prepared at the low kilning temperatures as described above. In particular, said malt compositions comprise low levels of T2N potential (and T2N precursors).

It has been described that LOX activity in barley kernels may be reduced by a soaking process, wherein barley may be subjected to high temperatures and/or lactic acid treatment. However, such soaking processes are also energy consuming. Furthermore, such treatment may have other adverse effects, such as reducing desirable enzymatic activities, e.g. phytase activity. In addition, such treatment only reduces LOX activity from the point when the heat treatment is undertaken and thus without effect on the prior accumulation of products derived from LOX activity.

In one embodiment according to the invention, the plant products are prepared using a method, wherein the barley kernels are not subjected to soaking at a temperature of at least 70° C. It is also preferred that the plant products according to the invention are prepared using a method, wherein the barley kernels are not subjected to soaking at a temperature of at least 57° C. in the presence of lactic acid.

It is preferred that said malt compositions comprise less than 60%, preferably less than 50%, more preferably less than 40%, even more preferably less than 30%, for example less 20% T2N compared to a malt composition prepared in the same manner from a wild-type barley, preferably from cv. Power or from cv. Quench or from cv. Rosalina.

It is furthermore preferred that said malt compositions—even when kiln dried at a temperature of range of 70 to 80° C.—comprise less than 60%, preferably less than 50%, more preferably less than 40%, even more preferably less than 30%, more preferably less than 20% T2N compared to a malt composition prepared in the same manner from a wild-type barley, preferably from cv. Power or from cv. Quench or from cv. Rosalina.

It is furthermore preferred that said malt compositions—even when kiln dried at a temperature of range of 50 to 70° C.—comprise less than 60%, preferably less than 50%, more preferably less than 40%, even more preferably less than 30%, more preferably less than 20% T2N compared to a malt composition prepared in the same manner from a wild-type barley, preferably from cv. Power or from cv. Quench or from cv. Rosalina.

It is furthermore preferred that said malt compositions—even when kiln dried at a temperature of range of 40 to 50° C.—comprise less than 60%, preferably less than 50%, more preferably less than 40%, even more preferably less than 30%, more preferably less than 20% T2N compared to a malt composition prepared in the same manner from a wild-type barley, preferably from cv. Power or cv. Quench or from cv. Rosalina.

In addition to the low levels of T2N and T2N potential, the malt according to the invention also comprises low levels of DMS and DMS precursor, even when prepared at the low kilning temperatures described above.

Interestingly, DMS is a rather volatile compound with a boiling point of 37° C.-38° C. (Imashuku, supra), and during malt production, for example during kiln drying, the composition is generally subjected to heat, such that substantial amounts of DMS evaporate. However, during cooling of a normal malt composition, more DMS may be generated from DMS precursors (DMSP). One major advantage of the present invention is that no, or only very little, DMSP (in particular SMM) is generated in the malt composition.

Methods for reducing DMS concentration in malt have been described. Many of these methods rely on highly energy consuming heat treatment of malt. Said heat treatment may simply be heating of malt, for example during kiln drying or it may involve volatization and/or removal of free DMS by application of steam. Thus, steam treatment of malt may reduce the levels of free DMS in malt, but again representing a process with high energy consumption. Furthermore, these methods mainly reduce the level of free DMS in malt, with only little effect on the level of SMM. In one embodiment of the invention, the malt compositions of the invention have only been subjected to limited treatment that involve volatizing and removing free DMS by steam, or alternatively have not been subjected to treatment that involve volatizing and removing free DMS using steam during kiln drying.

In one embodiment of the invention, it is preferred that the malt according to the invention has not been treated with a bromate salt, such as potassium bromate or calcium bromate.

The malt compositions of the invention preferably comprise at the most 3, preferably at the most 2, more preferably at the most 1, even more preferably at the most 0.5, such as at the most 0.2 µg/g free DMS. In addition, it is preferred that the malt compositions of the invention preferably comprises at the most 2, preferably at the most 1, more preferably at the most 0.5 µg/g, even more preferably at the most 0.2 µg/g DMSP. The concentration of DMSP, which preferably may be SMM, is here and elsewhere in this document indicated as the concentration of DMS, which may be liberated from said DMSP.

It is furthermore preferred that said malt compositions—even when kiln dried at a temperature in the range of 70 to 80° C.—comprise at the most 2, preferably at the most 1, more preferably at the most 0.5 µg/g, even more preferably at the most 0.2 µg/g DMSP (preferably SMM).

It is furthermore preferred that said malt compositions—even when kiln dried at a temperature of range of 50 to 70° C.—comprise at the most 2, preferably at the most 1, more preferably at the most 0.5 µg/g, even more preferably at the most 0.2 µg/g DMSP (preferably SMM).

It is furthermore preferred that said malt compositions—even when kiln dried at a temperature of range of 40 to 50° C.—comprise at the most 2, preferably at the most 1, more preferably at the most 0.5 µg/g, even more preferably at the most 0.2 µg/g DMSP (preferably SMM).

In another aspect the invention relates to green malt compositions comprising at the most 5000, more preferably at the most 2500, yet more preferably at the most 1000, even more preferably at the most 500, yet more preferably at the most 250, for example at the most 150 ppb DMSP. It is also preferred that said green malt compositions comprises at the most 200, preferably at the most 150, more preferably at the most 100, even more preferably at the most 50, such as at the most 25 ppb free DMS.

Although the primary use of malt is for beverage production, it can also be utilized in other industrial processes, for example as an enzyme source in the baking industry, or in the food industry as a flavouring and colouring agent, e.g. in the form of malt or malt flour or indirectly as a malt syrup, etc. Thus, the plant product according to the invention may be any of the aforementioned products.

In another aspect, the plant products according to the invention comprise, or even consist of syrup, such as a barley syrup, or a barley malt syrup. The plant product may also be an extract of barley or malt.

Malt may be further processed, for example by milling. Thus, the plant product according to the invention may be any kind of malt, such as unprocessed malt or milled malt, such as flour. Milled malt and flour thereof comprise chemical components of the malt and dead cells that lack the capacity to re-germinate.

Preferably milling is performed in a dry state, i.e. the malt is milled while dry. Thus, it is preferred that malt is not milled under water.

Mashing

The method according to the invention comprises a step of producing wort by mashing double-null-LOX-null-MMT barley and/or malt and optionally additional adjuncts. Said mashing step may also optionally comprise sparging, and accordingly said mashing step may be a mashing step including a sparging step or a mashing step excluding a sparging step.

In general, wort production is initiated by the milling of the double-null-LOX-null-MMT malt and/or double-null-LOX-null-MMT barley. If additional adjuncts are added, these may also be milled depending on their nature. If the adjunct is a cereal, it may for example be milled, whereas syrups, sugars and the like will generally not be milled.

Milling will facilitate water access to grain particles in the mashing phase. During mashing enzymatic depolymerization of substrates initiated during malting may be continued.

In FIG. 9, steps 4 to 6 illustrate a common method for preparation of wort from malt. In general, wort is prepared by combining and incubating milled malt and water, i.e. in a mashing process. During mashing, the malt/liquid composition may be supplemented with additional carbohydrate-rich adjunct compositions, for example milled barley, maize, or rice adjuncts. Unmalted cereal adjuncts usually contain little or no active enzymes, making it important to supplement with malt or exogenous enzymes to provide enzymes necessary for polysaccharide depolymerization etc.

During mashing, milled double-null-LOX-null-MMT malt and/or milled double-null-LOX-null-MMT barley—and optionally additional adjuncts are incubated with a liquid fraction, such as water. The incubation temperature is in general either kept constant (isothermal mashing), or gradually increased, for example increased in a sequential manner. In either case, soluble substances in the malt/barley/adjuncts are liberated into said liquid fraction. A subsequent filtration confers separation of wort and residual solid particles, the latter also denoted "spent grain". The wort thus obtained may also be denoted "first wort". Additional liquid, such as water may be added to the spent grains during a process also denoted sparging. After sparging and filtration, a "second wort" may be obtained. Further worts may be prepared by repeating the procedure. Non-limiting examples of suitable procedures for preparation of wort is described by Briggs et al. (supra) and Hough et al. (supra).

It has been described that LOX activity may be reduced by heat treatment of the enzymes and that DMS levels may be reduced by heat treatment. Also, it has been described that wort may be heat treated to reduce LOX activity and reduce levels of DMS and/or that mashing may be performed at high temperatures in order to reach the same objective. However, heat treatment may have adverse effects, such as reducing other enzymatic activities and heat treatment is furthermore energy consuming. In addition, heat treatment only reduces lipoxygenase activity and DMS levels from the point when the heat treatment is undertaken and thus it does not affect the prior accumulation of LOX activity derived products and DMS precursors.

Accordingly, in one embodiment of the invention wort is prepared using a method wherein the initial mashing temperature does not exceed 70° C., preferably does not exceed 69° C., thus for example the initial mashing temperature may be in the range of 30° C. to 69° C., such as in the range of 35° C. to 69° C., for example in the range of 35° C. to 65° C., such as in the range of 35° C. to 55°, for example in the range of 35° C. to 45° C., such as approximately 40° C. It is also preferred that the wort according to the invention has not been subjected to temperatures of 70° C. or higher for more than 25 min, preferably not for more than 20 min, and that the wort has not been subjected to temperatures of 78° C. or more, for more than 20 min, preferably not for more than 15 min, more preferably not for more than 10 min during mashing. If the mashing temperatures are too high, this property will affect the enzymatic activities in the mash and may reduce, or even abolish, desirable enzymatic activities, which will result in an altered quality of the wort. It is furthermore preferred that the wort according to the invention has not been subjected to temperatures of 65° C. or higher for more than 100 min, preferably not for more than 90 min, more preferably not for more than 80 min, yet more preferably not for more than 70 min during mashing.

In a preferred embodiment of the invention, the temperature during mashing does not exceed 80° C., preferably does not exceed 78° C.

One non-limiting example of a suitable mashing is:
(1) mashing-in at a temperature in the range of 35-45° C., such as approximately 40° C., in the range of 10 to 30 min, such as approximately 20 min;
(2) heating to a temperature in the range of 60 to 70° C., preferably in the range of 60 to 65° C., such as approximately 65° C., in the range of 30 to 90 min, preferably in the range of 45 to 75 min, such as approximately 60 min;
(3) heating to a temperature in the range of 70 to 80° C., preferably in the range of 75 to 78° C., such as approximately 78° C., in the range of 5 to 15 min, such as approximately 10 min.

Another non-limiting example of a suitable mashing is:
(4) mashing-in at a temperature in the range of 55-65° C., such as approximately 60° C., in the range of 10 to 30 min, such as approximately 20 min;
(5) heating to a temperature in the range of 60 to 70° C., preferably in the range of 60 to 65° C., such as approximately 65° C., in the range of 30 to 90 min, preferably in the range of 45 to 75 min, such as approximately 60 min;
(6) heating to a temperature in the range of 70 to 80° C., preferably in the range of 75 to 78° C., such as approximately 78° C., in the range of 5 to 15 min, such as approximately 10 min.

As mentioned above, the wort composition may be prepared by mashing double-null-LOX-null-MMT barley plants, or parts thereof, such as unmalted double-null-LOX-null-MMT kernels, in particular milled, unmalted double-null-LOX-null-MMT kernels, or parts thereof. Unmalted barley kernels lack or contain only a limited amount of enzymes beneficial for wort production, such as enzymes capable of degrading cell walls or enzymes capable of depolymerising starch into sugars. Thus, in embodiments of the invention where unmalted double-null-LOX-null-MMT is used for mashing, it is preferred that one or more suitable, external brewing enzymes are added to the mash. Suitable enzymes may be lipases, starch degrading enzymes (e.g. amylases), glucanases [preferably (1-4)- and/or (1-3, 1-4)-β-glucanase], and/or xylanases (such as arabinoxylanase), and/or proteases, or enzyme mixtures comprising one or more of the aforementioned enzymes, e.g. Cereflo, Ultraflo, or Ondea Pro (Novozymes). A method for producing a beverage from wort prepared from unmalted barley may also be referred to as "barley brewing", and a wort composition thereof as "barley wort", or "barley-brewed" wort.

The wort composition may also be prepared by using a mixture of malted and unmalted double null-LOX-null-MMT barley plants, or parts thereof, in which case one or more suitable enzymes may be added during preparation. More specifically, barley of the invention can be used together with malt in any combination for mashing—with or without external brewing enzymes—such as, but not limited to, the proportions of barley:malt=approximately 100:0, or approximately 75:25, or approximately 50:50, or approximately 25:75.

In other embodiments of the invention, it is preferred that no external enzymes, in particular that no external protease, and/or no external celluluase and/or no external α-amylase and/or no external 13-amylase and/or no external maltogenic α-amylase is added before or during mashing.

The wort obtained after mashing may also be referred to as "sweet wort". In conventional methods, the sweet wort is boiled with or without hops where after it may be referred to as boiled wort.

The term "approximately" as used herein means ±10%, preferably ±5%, yet more preferably ±2%.

Heating Wort

The method for preparing a barley based beverage according to the present invention involves a step of heating wort obtained after the mashing step described herein above in the section "Mashing".

It is an advantage of the present invention that barley based beverages with low levels of off-flavours and precursors thereof—in particular T2N and DMS and precursors thereof—may be prepared without the requirement for extensive heating of wort.

In conventional brewing, wort is generally boiled for an extensive length of time. Wort boiling has several objectives, in particular: (i) inactivation of enzymes; (ii) coagulation of protein; (iii) sterilization of the wort; (iv) extraction of hop compounds; (v) isomerisation of $\alpha$-acids; (vi) conversion of DMSP to DMS; and (vii) evaporation of DMS and T2N.

Several of these objectives may be reached without extensive boiling. Thus, sterilization only requires short boiling or heating. Extraction of hop compounds may also be done during a short boiling or heating. Pre-isomerized $\alpha$-acids are commercially available and may be added to the wort.

By employing a barley plant with loss of functional LOX-1 and LOX-2 there is no requirement for denaturation of LOXs. Furthermore, the requirement for reduction of T2N levels is also abolished by employing a barley plant with loss of functional LOX-1 and LOX-2. By employing a barley plant with loss of functional MMT there is also no requirement for decreasing the levels of DMS and DMS potential, because said levels are minute in such barley plants. In addition, barley grains may be dried and germination may be stopped even at low temperatures.

It has been attempted to reduce the energy consumption during wort boiling by various means, for example by reducing evaporation to as little as 3% combined with a stripping process extracting unwanted volatile compounds into steam. However, generation of steam is also an energy consuming process.

It has also been attempted to prepare wort without classic wort boiling. However, these methods in general utilize high temperatures of up to 95° C. during mashing as well as stripping of wort with steam, thus considered high-energy-consuming processes.

The present method provides the possibility for reduced evaporation, and preferably even in the absence of a stripping process. Thus, according to the methods of the present invention wort is heated in a manner so that preferably at the most 4%, yet preferably at the most 3%, even more preferably at the most 2%, even more preferably at the most 1.5%, yet more preferably at the most 1%, even more preferably at the most 0.5%, even more preferably at the most 0.1%, such as at the most 0.01% of the wort volume is evaporated. Even more preferably the aforementioned reduced evaporation is performed in the absence of steam treatment of the wort. It is also preferred that the aforementioned reduced evaporation is performed in the absence of stripping of the wort, e.g. with steam.

The reduced evaporation may be accomplished by heating wort in an essentially closed container or preferably in a closed container.

It is furthermore preferred that no extensive evaporation of liquid is undertaken in any of the other steps of the method. A preferred embodiment of the present invention accordingly relates to methods for preparing barley based beverages with low levels of one or more off-flavours and precursors thereof (preferably T2N and DMS and precursors thereof), wherein the method involves reduced energy input, the method comprising the steps of:

(i) providing a barley plant or part thereof, wherein said barley plant comprises:
  (a) a first mutation that results in a total loss of functional LOX-1; and
  (b) a second mutation resulting in a total loss of functional LOX-2; and
  (c) a third mutation resulting in a total loss of functional MMT;
(ii) optionally malting at least part of said barley, thereby obtaining malted barley;
(iii) mashing said barley and/or malted barley and optionally additional adjuncts, thereby obtaining a wort;
(iv) heating said wort optionally in the presence of additional ingredient(s);
(v) processing said heated wort into a beverage;

wherein at the most 4%, for example at the most 3%, such as at the most 2%, for example at the most 1.5%, such as at the most 1% of the liquid volume is evaporated during the method after completion of step (ii), or even after completion of step (iv) above, thereby preparing a barley derived beverage with low levels of one or more off-flavours and precursors thereof.

It is preferred that step (iv) herein above is performed with the wort in an essentially closed container, such as in a closed container.

In a further preferred embodiment, the invention provides methods for preparing barley based beverages with low levels of one or more off-flavours and precursors thereof (preferably T2N and DMS and precursors thereof), wherein the method involves reduced energy input, the method comprising the steps of:

(i) providing a barley plant or part thereof, wherein said barley plant comprises:
  (a) first mutation that results in a total loss of functional LOX-1; and
  (b) a second mutation resulting in a total loss of functional LOX-2; and
  (c) a third mutation resulting in a total loss of functional MMT;
(ii) optionally malting at least part of said barley, thereby obtaining malted barley;
(iii) mashing said barley and/or malted barley and optionally additional adjuncts, thereby obtaining a wort;
(iv) heating said wort optionally in the presence of additional ingredient(s);
(v) processing said heated wort into a beverage;

wherein the liquid/wort/beverage is heated to a temperature above 80° C. for at the most 30 min, more preferably for at the most 20 min, thereby preparing a barley derived beverage with low levels of one or more off-flavours and precursors thereof.

Preferably, said liquid/wort/beverage is heated to a temperature in the range of 80 to 99.8° C., preferably to a temperature in the range of 80 to 99.5° C., such as to a temperature of 80 to 99° C., yet more preferably to a temperature of in the range of 90 to 99° C., yet more preferably to a temperature of in the range of 95 to 99° C. for at the most 30 min, preferably at the most 20 min, such as for in the range of 10 to 30 min, for example for in the range of 10 to 20 min during said method.

First, second and further worts may be combined, and thereafter subjected to heating or each individual kind or wort may be heated. According to the methods of the invention, the wort must not necessarily be boiled. The non-boiled wort, either a pure first wort or a combined wort, is also referred to as "sweet wort"; after boiling it may be referred to as "boiled wort". If the wort is to be used in production of beer, hops are frequently added prior to boiling.

In traditional brewing methods, the wort is boiled for a long time, in general in the range of 60 min to 120 min, in order to evaporate at least 5% and some times even up to 25% of the wort volume. However, extended boiling is undesirable for a number of other reasons, for example because extended boiling requires pronounced energy supply.

According to the present invention, wort with low levels of T2N, T2N potential, DMS and DMSP can be produced from double-null-LOX-null-MMT barley even without extended boiling. Thus, the wort according to a preferred embodiment of the invention is boiled for at the most 30 min, more preferably for at the most 15 min, even more preferably for at the most 10 min, yet more preferably for at the most 5 min, even more preferably for at the most 1 min, yet more preferably the wort is not boiled at all. It is furthermore, preferred that after completion of step ii) of the method according to the invention the liquid/wort/beverage is boiled for at the most at the most 30 min, more preferably for at the most 15 min, even more preferably for at the most 10 min, yet more preferably for at the most 5 min, even more preferably for at the most 1 min, yet more preferably the liquid/wort/beverage is not boiled at all. Preferably, heating of wort is undertaken in an essentially closed container, preferably in a closed container.

In this context the term, "boiling" means bringing the liquid or wort or beverage to a temperature where water evaporates. Accordingly, at normal pressure boiling would mean to bring an aqueous liquid, such as wort, to 100° C. or slightly above.

It is thus also preferred that the wort according to an embodiment of the invention is kept at a temperature of at least 100° C. for at the most 30 min, more preferably for at the most 15 min, even more preferably for at the most 10 min, yet more preferably for at the most 5 min, even more preferably for at the most 1 min, yet more preferably the wort is not heated to a temperature of at least 100° C. at all. Furthermore, it is preferred that after completion of step (ii) of the method according to the invention the liquid/wort/beverage is kept at a temperature of at least 100° C. for at the most at the most 30 min, more preferably for at the most 15 min, even more preferably for at the most 10 min, yet more preferably for at the most 5 min, even more preferably for at the most 1 min, yet more preferably the liquid/wort/beverage is not at all heated to a temperature of at least 100° C.

It is also preferred that the entire method of preparing barley based beverages according to the invention at no time involves heating to a temperature of more than 99.8° C., preferably 99.5° C., yet more preferably 99° C.

Rather the method may involve a step of heating wort to a temperature of at the most 99.8° C., such as at the most 99.5° C., for example at the most 99° C., such as at the most 98° C. for a limited amount of time. Said limited amount of time is preferably at the most 30 min, more preferably at the most 15 min, even more preferably at the most 10 min.

Thus, it is preferred that the wort is heated to a temperature above 80° C., preferably in the range of 80 to 99.8° C., such as in the range of 80 to 99.5° C., for example in the range of 80 to 99° C., yet more preferably to a temperature of in the range of 90 to 99° C., yet more preferably to a temperature of in the range of 95 to 99° C. for at the most 30 min, preferably at the most 20 min, such as for in the range of 10 to 30 min, for example for in the range of 10 to 20 min.

In an additional embodiment of the invention, it is preferred that the wort is not subjected to (e.g. washing with $CO_2$) subsequent to boiling of wort and prior to fermentation.

Wort

In another aspect, the invention relates to types of plant products, which are wort compositions. Said wort compositions are preferably prepared from malt compositions derived from double-null-LOX-null-MMT kernels. Said malts may be prepared from only double-null-LOX-null-MMT kernels, or mixtures comprising other kernels as well. The invention also relates to wort compositions prepared using double-null-LOX-null-MMT barley, or parts thereof, such as green malt, alone or mixed with other components.

The wort compositions according to the invention are preferably prepared by mashing as described herein above in the section "Mashing". Furthermore, the wort compositions may have been heated as described herein above in the section "Heating wort".

It is preferred that said wort compositions preferably comprise less than 60%, more preferably less than 50%, even more preferably less than 40% T2N potential compared to a wort composition prepared in the same manner from a wild-type barley, preferably from cv. Power or cv. Rosalina.

Said wort may be the first, and/or the second, and/or further worts and/or mixtures thereof. The wort composition may be sweet wort, heated wort, or a mixture thereof. Heated wort is preferably heated as described in the section "Heating wort" herein above. The wort composition may also be barley wort. In general, a wort composition contains a high content of amino nitrogen and fermentable carbohydrates, the latter mainly being maltose.

The wort may in one embodiment be sweet wort, i.e. wort which has not been subjected to heat treatment. Said sweet wort preferably comprises less than 60%, more preferably less than 50% T2N potential compared to a wort composition prepared in the same manner from a wild-type barley, preferably from cv. Power or cv. Rosalina. If said wort has been prepared from malt that was kiln dried at low temperatures it may even comprise less T2N potential. Thus in embodiments of the invention wherein said sweet wort has been prepared from malt, which has been kiln dried at a temperature in the range of 50 to 70° C., then said sweet wort may preferably comprise less than 50%, even more preferably less than 45%, such as less than 40% T2N potential compared to a wort composition prepared in the same manner from a wild-type barley, preferably from cv. Power. In embodiments of the invention wherein said sweet wort has been prepared from malt, which has been kiln dried at a temperature in the range of 40 to 50° C., then said sweet wort may preferably comprise less than 50%, even more preferably less than 40%, yet more preferably less than 30% T2N potential compared to a wort composition prepared in the same manner from a wild-type barley, preferably from cv. Quench or cv. Rosalina.

Said sweet wort preferably also comprises low levels of DMSP, preferably less than 150 µg/L, more preferably less than 100 µg/L, even more preferably less than 50 µg/L, yet more preferably less than 30 µg/L, even more preferably less than 20 µg/L, yet more preferably less than 15 µg/L DMSP (preferably SMM). Even if said wort has been prepared from malt that was kiln dried at low temperatures it still comprises low levels of DMSP. Thus in embodiments of the invention wherein said sweet wort has been prepared from malt, which has been kiln dried at a temperature in the range of 50 to 70° C., then said sweet wort may preferably comprise less than 150 µg/L, more preferably less than 100 µg/L, even more preferably less than 50 µg/L, yet more preferably less than 30 µg/L, even more preferably less than 20 µg/L, yet more preferably less than 15 µg/L DMSP. In embodiments of the invention wherein said sweet wort has been prepared from malt, which has been kiln dried at a temperature in the range of 40 to 50° C., then said sweet wort may preferably comprise less than 150 µg/L, more preferably less than 100 µg/L, even more preferably less than 50 µg/L, yet more preferably less than 30 µg/L, even more preferably less than 20 µg/L, yet more preferably less than 15 µg/L DMSP.

Preferably, said sweet wort also comprises low levels of DMS, preferably less than 90 µg/L, even more preferably less than 50 µg/L, yet more preferably less than 30 µg/L, even more preferably less than 20 µg/L DMS.

The wort may also be wort, which has only been heat treated for a short time, such as at a temperature in the range of 95 to 99.8° C. or in the range of 95 to 99° C. for in the range of 10 to 30 min. In this case said wort preferably comprises at the most 60%, more preferably at the most 50%, even more preferably at the most 45%, more preferably at the most 40% T2N potential compared to a wort composition prepared in the same manner from a wild-type barley, preferably from cv. Power or cv Rosalina. Said wort also preferably comprises at the most 150 µg/L, more preferably less than 100 µg/L, even more preferably less than 50 µg/L, yet more preferably less than 30 µg/L, even more preferably less than 20 µg/L, yet more preferably less than 15 µg/L DMSP. Said wort also preferably comprise at the most 150 µg/L, more preferably less than 100 µg/L, even more preferably less than 50 µg/L, yet more preferably less than 30 µg/L, even more preferably less than 20 µg/L DMS.

The wort may also be heated wort (preferably heated as described herein above in the section "Heating wort") in which case the wort preferably comprises at the most 60%, more preferably at the most 50%, yet more preferably at the most 40% T2N potential compared to a wort composition prepared in the same manner from a wild-type barley, preferably from cv. Power.

Said heated wort preferably also comprises low levels of DMSP, preferably less than 150 µg/L, more preferably less than 100 µg/L, even more preferably less than 50 µg/L, yet more preferably less than 30 µg/L, even more preferably less than 20 µg/L, yet more preferably less than 15 µg/L DMSP. In embodiments of the invention wherein said cooled wort has been prepared from malt, which has been kiln dried at a temperature in the range of 50 to 70° C., then said sweet wort may preferably comprise less than 150 µg/L, more preferably less than 100 µg/L, even more preferably less than 50 µg/L, yet more preferably less than 30 µg/L, even more preferably less than 20 µg/L, yet more preferably less than 15 µg/L DMSP. Even in embodiments of the invention wherein said cooled wort has been prepared from malt, which has been kiln dried at a temperature in the range of 40 to 50° C., then said sweet wort may preferably comprise less than 150 µg/L, more preferably less than 100 µg/L, even more preferably less than 50 µg/L, yet more preferably less than 30 µg/L, even more preferably less than 20 µg/L, yet more preferably less than 15 µg/L DMSP. Said heated wort preferably also comprises low levels of DMS, preferably less than 30 µg/L, more preferably less than 20 µg/L DMSP.

The wort may also be heated wort (preferably heated as described herein above in the section "Heating wort"), which subsequently has been cooled (herein also referred to as cooled wort) in which case the wort preferably comprises at the most 60%, more preferably at the most 50%, yet more preferably at the most 40% T2N potential compared to a wort composition prepared in the same manner from a wild-type barley, preferably from cv. Power or cv. Rosalina. In embodiments of the invention wherein said cooled wort has been prepared from malt, which has been kiln dried at a temperature in the range of 40 to 50° C., then said sweet wort may preferably comprise less than 50%, even more preferably less than 40%, yet more preferably less than 30% T2N potential compared to a wort composition prepared in the same manner from a wild-type barley, preferably from cv. Power or cv. Rosalina.

Said cooled wort preferably also comprises low levels of DMSP, preferably less than 90 µg/L, even more preferably less than 50 µg/L, yet more preferably less than 30 µg/L, even more preferably less than 20 µg/L, yet more preferably less than 15 µg/L DMSP. Said cooled wort preferably also comprises low levels of DMS, preferably less than 90 µg/L, even more preferably less than 50 µg/L, yet more preferably less than 30 µg/L, even more preferably less than 20 µg/L DMS.

In one specific embodiment of the invention the wort composition according to the present invention is a barley wort, such as heated barley wort, i.e. wort prepared by incubating unmalted (and preferably milled) double-null-LOX-null-MMT kernels with water, preferably by mashing and sparging. Such barley wort is characterized by extremely low levels of T2N and T2N potential. It is preferred that said barley wort comprises less than 50%, more preferably less than 40%, even more preferably less than 30% T2N potential compared to a barley wort composition prepared in the same manner from a wild-type barley, preferably from cv. Power. It is also preferred that said barley wort preferably comprises less than 50%, more preferably less than 40%, even more preferably less than 30% T2N precursor compared to a barley wort composition prepared in the same manner from a wild-type barley, preferably from cv. Power or cv. Quench or cv. Rosalina.

Beverages

In a preferred aspect, the present invention relates to beverages, more preferably barley based beverages prepared from double-null-LOX-null-MMT barley. Said beverages may in one preferred embodiment be malt beverages, even more preferred fermented beverages, such as fermented malt beverages, preferably alcoholic beverages, such as beer, wherein said beverage is prepared using double-null-LOX-null-MMT barley, or parts thereof. Hence, in one preferred embodiment of the invention, the beverage is preferably prepared by fermentation of double-null-LOX-null-MMT barley, or parts thereof, or extracts thereof, for example by fermentation of wort from double-null-LOX-null-MMT malt, alone or in combination with other ingredients.

In a preferred embodiment of the invention, the above-mentioned beverage is prepared by a method comprising the steps of:
  (i) providing a barley plant or part thereof, wherein said barley plant comprises:
    (a) a first mutation that results in a total loss of functional LOX-1; and
    (b) a second mutation resulting in a total loss of functional LOX-2; and
    (c) a third mutation resulting in a total loss of functional MMT;

(ii) optionally malting at least part of said barley, thereby obtaining malted barley;
(iii) mashing said barley and/or malted barley and optionally additional adjuncts, thereby obtaining a wort;
(iv) heating said wort optionally in the presence of additional ingredient(s), wherein at the most 4% of the wort volume is evaporated, thereby obtained heated wort;
(v) processing said heated wort into a beverage.

However, in other embodiments the invention relates to any barley based beverage prepared from double-null-LOX-null-MMT barley. Thus, the invention also relates to barley based beverages prepared from double-null-LOX-null-MMT barley using conventional methods, such as conventional brewing methods.

In some embodiments of the invention, the beverage is a non-fermented beverage, for example wort, preferably wort prepared from double-null-LOX-null-MMT malt.

It is also comprised within the present invention that said beverage may be prepared from unmalted barley plants, preferably unmalted double-null-LOX-null-MMT barley plants, or parts thereof, e.g. by barley brewing.

The beverage may be a non-alcoholic beverage, such as non-alcoholic beer or other kinds of non-alcoholic beverages, such as non-alcoholic malt beverages, such as maltina.

Preferably, however, said beverage is prepared from a malt composition prepared from double-null-LOX-null-MMT barley kernels. More preferably, said beverage is beer. This may be any kind of beer known to the person skilled in the art. In one embodiment, the beer is, for example, a lager beer. The beer is preferably brewed using a malt composition comprising germinated double-null-LOX-null-MMT barley, more preferably said beer is brewed using a malt composition prepared exclusively from germinated double-null-LOX-null-MMT barley. The malt composition may, however, also comprise other components, for example other germinated or non-germinated cereals, such as wild-type barley, double-null-LOX-null-MMT barley, wheat and/or rye, or non-germinated raw materials that comprise sugars, or compositions derived from malted or unmalted raw materials, including syrup compositions. Preferably, however, all barley, such as all malted and/or unmalted barley and/or germinated and/or non-germinated barley used for preparation of said beer is preferably double-null-LOX-null-MMT barley.

Thus, the invention also relates to methods of producing a beverage comprising the steps of:
(i) providing a malt composition comprising germinated double-null-LOX-null-MMT kernels;
(ii) processing said malt composition into a beverage.

In a preferred embodiment, the beverage according to the invention is beer that has been produced from wort prepared from kilned malt (preferably prepared as described herein above in the section "Malting"), more preferably by mashing said kilned malt (preferably as described herein above in the section "Mashing"), wherein said mashing may also optionally contain a sparging step. Furthermore, said wort has preferably been heated, preferably as described herein above in the section "Heating wort", although in certain embodiments of the invention, the wort may be heated in a conventional manner by boiling. Beer thus produced may also be referred to as "malted" herein. However, the beverage according to the invention may also be beer prepared from barley wort. Such beer is also referred to as "barley beer".

In general terms, alcoholic beverages—such as beer—may be manufactured from malted and/or unmalted barley grains. Malt, in addition to hops and yeast, contributes to flavour and colour of the beer. Furthermore, malt functions as a source of fermentable sugar and enzymes. A schematic representation of a general process of beer production is shown in FIG. 9, while detailed descriptions of examples of suitable methods for malting and brewing can be found, for example, in publications by Briggs et al. (1981) and Hough et al. (1982). Numerous, regularly updated methods for analyses of barley, malt and beer products are available, for example, but not limited to, American Association of Cereal Chemists (1995), American Society of Brewing Chemists (1992), European Brewery Convention (1998), and Institute of Brewing (1997). It is recognized that many specific procedures are employed for a given brewery, with the most significant variations relating to local consumer preferences. Any such method of producing beer may be used with the present invention.

The first step of producing beer from wort preferably involves heating said wort as described herein above, followed by a subsequent phase of wort cooling and optionally whirlpool rest. After being cooled, the wort is transferred to fermentation tanks containing yeast. Preferably, said yeast is brewer's yeast, *Saccharomyces carlsbergensis*. The wort will be fermented for any suitable time period, in general in the range of 1 to 100 days. During the several-day-long fermentation process, sugar is converted to alcohol and $CO_2$ concomitantly with the development of some flavour substances.

Subsequently, the beer may be further processed, for example chilled. It may also be filtered and/or lagered—a process that develops a pleasant aroma and a less yeasty flavour. Also additives may be added. Furthermore, $CO_2$ may be added. Finally, the beer may be pasteurized and/or filtered, before it is packaged (e.g. bottled or canned). In a preferred embodiment, the beverage according to the invention comprises less than 70%, preferably less than 60%, more preferably less than 50% T2N potential compared to the T2N potential of a beverage prepared in the same manner from wild-type barley, preferably from cv. Power or cv. Quench or cv. Rosalina. It is also preferred that the beverages according to the invention comprise at the most 2 ppb, more preferably at the most 1.5 ppb T2N potential if the °P in the original extract upon which the beverage is based is adjusted to in the range of 10 to 12° P, more preferably to 11° P.

In a preferred embodiment, the beverage according to the invention comprises less than 70%, preferably less than 60%, more preferably less than 50% T2N precursors compared to the T2N precursors of a beverage prepared in the same manner from wild-type barley, preferably from cv. Power or cv. Quench or cv. Rosalina. It is also preferred that the beverages according to the invention comprise at the most 2 ppb, more preferably at the most 1.5 ppb T2N precursor if the ° P in the original extract upon which the beverage is based is adjusted to in the range of 10 to 12° P, more preferably to 11° P.

Said beverage—preferably beer—also preferably comprises at the most 60 ppb, more preferably less than 50 ppb, even more preferably less than 40 ppb, yet more preferably less than 30 ppb, even more preferably less than 20 ppb, yet more preferably less than 10 ppb DMS.

In one specific embodiment of the invention, the beverage is barley beer, which comprises less than 60%, preferably less than 50% T2N potential compared to the T2N potential of a barley beer prepared in the same manner from wild-type barley, preferably from cv. Power or Quench.

In another specific embodiment of the invention, the beverage—preferably beer—is prepared from heated wort, which has only been heat treated for a short time, such as at a temperature in the range of 95 to 99.8° C. or in the range of 95 to 99° C. for in the range of 10 to 30 min. Preferably, said heated wort has been heated as described herein above in the section "Heating wort". In embodiments of the invention wherein the beverage—preferably beer—is prepared from such heated wort, then said beverage—preferably beer—comprises less than 60%, preferably less than 50%, more preferably less than 45% T2N potential compared to the T2N potential of a beer prepared in the same manner from wild-type barley, preferably from cv. Power or cv. Quench or cv. Rosalina. In this embodiment, it is also preferred that said beverage—preferably beer—comprises less than 60%, preferably less than 50%, more preferably less than 45% T2N precursor compared to the T2N precursors of a beverage—preferably beer prepared in the same manner from wild-type barley, preferably from cv. Power or cv. Quench or cv. Rosalina. In this embodiment, it is also preferred that the beer according to the invention comprises at the most 2 ppb, more preferably at the most 1.5 ppb T2N potential. In this embodiment, it is furthermore preferred that the beer according to the invention comprises at the most 2 ppb, more preferably at the most 1.5 ppb T2N precursor if the ° P in the original extract upon which the beverage is based is adjusted to in the range of 10 to 12° P, more preferably to 11° P. Said beverage—preferably beer—also preferably comprises at the most 60 ppb, more preferably less than 50 ppb, even more preferably less than 40 ppb, yet more preferably less than 30 ppb, even more preferably less than 20 ppb, yet more preferably less than 10 ppb DMS.

"Organoleptic qualities" means qualities appealing to the human olfactory and taste senses. Said qualities are analyzed, for example, by a specialist beer taste panel. Preferably, said panel is trained in tasting and describing beer flavours, with special focus on aldehydes, papery taste, old taste, esters, higher alcohols, fatty acids and sulphury components.

In general, the taste panel will consist of in the range of 3 to 30 members, for example in the range of 5 to 15 members, preferably in the range of 8 to 12 members. The taste panel may evaluate the presence of various flavours, such as papery, oxidized, aged, and bready off-flavours as well as flavours of esters, higher alcohols, sulfur components and body of beer. In relation to the present invention, it is preferred that papery and/or aged off-flavours are in particular reduced, whereas flavours such as aromatic, estery, alcoholic/solvent, floral, and/or hoppy may preferably be increased as compared to a beverage prepared from wild type barley using an identical method. A method of determining the "organoleptic qualities" of a beverage is described in Example 6 in international patent application WO 2005/087934. Another method of determining "organoleptic qualities" of a beverage is described in Examples 8 and 9 in international patent application PCT/DK2009/050355. Yet another example is described herein below in Example 9. In preferred embodiments, the stable organoleptic qualities are, at least partly, a result of low levels of T2N or T2N potential. Aromatic, estery, alcoholic/solvent, floral, and/or hoppy taste may preferably be determined as described in Example 7 of international patent application PCT/DK2009/050315. In one preferred embodiment the beverages of the invention have scores for aromatic, estery, alcoholic/solvent, floral, and/or hoppy taste as described in international patent application PCT/DK2009/050315 on p. 41, I. 15 to p. 44, I. 9.

It is preferred that the beverages according to the present invention are characterized by having a less papery taste compared to a similar beverage prepared in the same manner from a wild-type barley plant (preferably cv. Quench or cv. Rosalina) after storage for at least 1 week at in the range of 30 to 40° C., such as around 37° C. Preferably, said papery taste is less than 90%, more preferably less than 80%, such as less than 70% as evaluated by a trained taste panel.

It is also preferred that the beverages according to the present invention have reduced papery taste as compared to similar beverages prepared from wild-type barley after storage at elevated temperatures. When the property "papery taste" is determined by a trained, specialized taste panel (as described above), and scored on a scale from 0 to 5—in which 0 is absent and 5 is extreme—it is preferred that the beverages of the invention have one, or preferably both, of the following scores for papery taste:

(i) a score for papery taste of at least 0.5, preferably at least 0.7 lower than the score for papery taste of a beverage prepared in the same manner from wild-type barley, preferably from cv. Quench or cv. Rosalina after incubation at 37° C. for one week;

(ii) a score for papery taste at least 0.5, preferably at least 0.7, more preferably at least 0.8, at least 1 lower than the score for papery taste of a beverage prepared in the same manner from wild-type barley, preferably from cv. Power or cv. Rosalina after incubation at 37° C. for two weeks.

Interestingly, the present invention discloses that the overall flavour score of a beverage manufactured according to the present invention is improved compared to beverages prepared from wild-type barley. This may partly be attributed to the finding that DMS may mask certain desirable tastes.

Accordingly, it is preferred that the beverages of the present invention have an overall flavour score which is at least 1, preferably at least 1.5, more preferably at least 2 higher that the flavour score of a beverage prepared in the same manner from wild-type barley, preferably from cv. Quench or cv. Rosalina, when said beverage has been prepared without boiling the corresponding wort, preferably using a pressurized heating. Said flavour score should be scored on a scale from 1 to 9, where 9 represents the best score given by a specialist beer taste panel.

A beverage is said to have "stable organoleptic qualities", when said beverage comprises very low levels of free T2N, even after storage. Accordingly, it is an objective of the present invention to provide beverages (such as beer with stable organoleptic qualities), manufactured using a double-null-LOX-null-MMT barley plant.

Accordingly, it is preferred that the beverages of the present invention comprises less than 80%, preferably less than 70%, more preferably less than 65%, even more preferably less than 60% even more preferably less than 55% free T2N compared to a beverage prepared in the same manner from wild-type barley, preferably from cv. Quench or cv. Rosalina—after storage for at least 1 week, preferably at least 2 weeks, more preferably at least 3 weeks, even more preferably for at least 4 weeks at a temperature in the range of 30 to 40° C., preferably at 37° C. It is also preferred that the beverages of the invention comprises less than 0.025 ppb free T2N after storage for 2 weeks at 37° C.

In another specific embodiment of the invention, the beverage—preferably beer—is prepared from heated wort, which has only been heat treated for a short time, such as at a temperature in the range of 95 to 99° C. for in the range of 10 to 30 min. Preferably said heated wort has been heated as described herein above in the section "Heating wort". In embodiments of the invention wherein the beverage—preferably beer—is prepared from such heated wort, then said beverage—preferably beer—comprises less than 80%, preferably less than 70%, more preferably less than 65% free T2N compared to a beverage prepared in the same manner from wild-type barley, preferably from cv. Quench or cv. Rosalina—after storage for at least 1 week, preferably at least 2 weeks, more preferably at least 3 weeks, even more preferably for at least 4 weeks at a temperature in the range of 30 to 40° C., preferably at 37° C.

In particular, it is preferred that such beverages—preferably beer—prepared from said heated wort comprise very low levels of T2N, preferably less than 80%, preferably less than 70%, more preferably less than 65% free T2N compared to a beverage prepared in the same manner from wild-type barley, preferably from cv. Quench or cv. Rosalina—after storage for 2 weeks at a temperature in the range of 30 to 40° C., preferably at 37° C. in the presence of a level of sulphite not exceeding 10 ppm, preferably a level of sulphite in the range of 1 to 10 ppm, more preferably in the range of 1 to 8 ppm, more preferably in the range of 2 to 6 ppm, yet more preferably in the range of 3 to 6 ppm sulphite.

It is also particularly preferred that the beverages according to the invention—such as beer, for example barley beer—comprise very low levels of T2N, preferably less than 80%, preferably less than 70%, more preferably less than 60%, even more preferably less than 5% free T2N compared to a beverage prepared in the same manner from wild-type barley, preferably from cv. Quench or cv. Rosalina—after storage for 8 weeks at 37° C.

In one embodiment, the invention relates to beverages, such as beer, with low levels of certain trihydroxy octadecenoic acids (also denoted THAs), in particular to beverages with low levels of 9,12,13-THA and 9,10,13-THA. THAs are characterized by a bitter taste (Baur and Grosch, 1977; Baur et al., 1977), making said compounds undesirable in beverages.

It is thus desirable that the level of 9,12,13-THA and 9,10,13-THA is as low as possible, for example lower than 1.3 ppm, such as lower than 1 ppm. Accordingly, it is preferred that the level of 9,12,13-THA is as low as possible, for example lower than 1.3 ppm, such as lower than 1 ppm. It is also preferred that the level 9,10,13-THA is as low as possible, for example lower than 1.3 ppm, such as lower than 1 ppm. However, the overall concentration of 9,12,13-THA and 9,10,13-THA in a malt-derived beverage—such as beer—is also dependent on the amount of malt used for preparation of said specific beverage. Thus, in general, a strong beer will comprise more 9,12,13-THA and 9,10,13-THA than a lighter beer, making a higher over-all level of 9,12,13-THA and 9,10,13-THA acceptable in a stronger beer. Accordingly, it is preferred that the beverage according to the invention comprises a lower level of 9,12,13-THA and 9,10,13-THA than a beverage prepared in the same manner from wild-type barley, preferably from cv. Power or from cv. Quench or cv. Rosalina. In particular, a beverage according to the invention preferably has a level of 9,12,13 THA, which is at the most 50%, preferably at the most 40%, more preferably at the most 30% compared to the level in a beverage prepared in the same manner from a wild-type barley, preferably from cv. Power or cv. Rosalina. It is furthermore preferred that a beverage according to the invention has a level of 9,10,13-THA, which is at the most 70%, preferably at the most 60%, such as at the most 50%, for example at the most 40% compared to the level in a beverage prepared in the same manner from a wild-type barley, preferably from cv. Power or cv. Quench or cv. Rosalina. Such beverages may be prepared by using double-null-LOX-null-MMT barley.

In one embodiment of the invention, the beverages prepared from double-null-LOX-null-MMT barley have improved foam quality. This is in particular relevant when the beverage is a beer. Accordingly, it is an objective of the invention to provide beverages, such as beer, with superior foam quality. Preferably, the beverages of the invention produce at least 1.5 times more, preferably at least 2 times more, yet more preferably at least 3 times more foam in 60 to 80 min, preferably in 80 min as compared to a beverage prepared in the same manner from wild-type barley, preferably from cv. Quench. Said foam production is determined as described in Example 8 herein below.

Plant Products

It is an objective of the present invention to provide plant products, preferably barley plant products characterized by low levels of one or more off-flavours. In particular, it is an objective of the invention to provide plant products, preferably barley plant products, with low levels of T2N, DMS and the corresponding precursors thereof. As described by the invention, such plant products may advantageously be prepared from double-null-LOX-null-MMT barley. Said plant product may be malt, preferably any of the malts described herein above in the section "Malting". The product may be wort, preferably any of the worts described herein above in the section "Wort"; it may also be a beverage, preferably any of the beverages described herein above in the section "Beverage". However, the plant product may also be other plant products that are characterized by low levels of T2N, T2N potential, DMS and DMSP prepared from double-null-LOX-null-MMT barley plants, or parts thereof.

The present invention thus relates to plant products, which may be compositions comprising the barley plants described herein below, or parts thereof, or compositions prepared from said barley plants, or parts thereof, such as plant products prepared from said barley plants, or parts thereof. Because said barley plants lack LOX-1, LOX-2 and MMT activities, the compositions in general comprise very low levels of off-flavours and their precursor molecules and in particular of T2N, T2N potential, DMS and DMSP. Examples of useful plant products comprising, or prepared from, barley plants having a first mutation resulting in a total loss of functional LOX-1, a second mutation resulting in a total loss of functional LOX-2 and a third mutation resulting in a total loss of functional MMT are described herein.

It is preferred that said plant products comprise one or more of the following, preferably at least two of the following, even more preferably all of the following:
  (i) less than 60%, even more preferably less than 50%, yet more preferably less than 40%, such as less than 30%, preferably less than 20%, more preferably less than 10%, free T2N;
  (ii) less than 60%, even more preferably less than 50%, yet more preferably less than 40%, such as less than 30%, preferably less than 25% T2N potential;
  (iii) less than 30%, preferably less than 20%, more preferably less than 15%, even more preferably less than 10% DMS;
  (iv) less than 30%, preferably less than 20%, more preferably less than 15%, even more preferably less than 10%, such as less than 5%, for example less than 2% SMM;

(v) less than 30%, preferably less than 20%, more preferably less than 15%, even more preferably less than 10% of the DMSP;

as compared to a similar plant product prepared from wild-type barley plants, preferably from cv. Power or cv. Quench or cv. Rosalina, in the same manner.

The present invention relates, in one aspect, to barley kernels having a first mutation that results in a total loss of functional LOX-1, a second mutation resulting in a total loss of functional LOX-2 and a third mutation resulting in a total loss of functional MMT.

The present invention also relates to compositions comprising said kernels, and compositions prepared from said kernels, as well as to plant products prepared from said kernels.

In a further aspect, the present invention relates to plant products, which may be food compositions, feed compositions, and fragrance raw material compositions that comprise double-null-LOX-null-MMT barley plants, or parts thereof. Food compositions, for example, may be, but are not limited to, malted and unmalted barley kernels, milled barley, barley meals, bread, porridge, cereal mixes comprising barley, health products, such as beverages comprising barley, barley syrups, and flaked, milled, micronized or extruded barley compositions. Feed compositions, for example, include compositions comprising barley kernels, and/or meals. Feed compositions may for example be mash. Fragrance raw material compositions are described herein below.

The invention also relates to mixtures of various plant products of the invention. For example, the invention relates in one aspect to a composition prepared by a mixture of:
(i) a composition comprising a barley plant, or a part thereof, comprising a first mutation that results in a total loss of functional LOX-1, a second mutation resulting in a total loss of functional LOX-2 and a third mutation resulting in a total loss of functional MMT; and
(ii) a malt composition prepared from double-null-LOX-null-MMT kernels.

Various methods are available to determine whether a barley plant, or a plant product, is prepared from a barley plant carrying mutations in the genes for LOX-1, LOX-2 and MMT, causing a total loss of functional LOX-1, a total loss of functional LOX-2 and a total loss of functional MMT, respectively. Plant products will, in general, comprise at least some genomic DNA from the plant utilized for its production. Thus, malt will contain large amounts of genomic DNA, but even barley or malt extracts, such as wort, may comprise genomic DNA or fragments thereof from said barley or malt. Also barley-based beverages, such as beer, may comprise genomic DNA or fragments thereof from said plant. By analysis of DNA in a plant product, it may be established whether the plant, from which the plant product is prepared, carries mutations in the LOX-1, LOX-2 and MMT genes, causing a total loss of functional LOX-1, a total loss of functional LOX-2 and a total loss of functional MMT. Said mutations could, for example, be any of the mutations in the LOX-1 and LOX-2 genes described hereinbelow in the section "Loss of functional LOX". Said mutation in the MMT gene could, for example, be any of the mutations in the MMT gene described hereinabove in the section "Loss of functional MMT". The genomic DNA may be analyzed by any useful method, such as sequencing or by amplification-based methods, including PCR-based methods. If particular mutations in the LOX-1 gene and/or the LOX-2 gene and/or the MMT gene are assumed, then polymorphism analysis may be employed, for example SNP analysis. In relation to determination of a mutation in the LOX-1 gene and/or the LOX-2 gene a non-limiting example of a useful SNP analysis is described in international patent application PCT/DK2009/050355 in Example 10. In relation to determination of a mutation in the MMT gene a non-limiting example of a useful SNP analysis is described in international patent application PCT/DK2009/050315 in Examples 13 and 17. The skilled person will be able to adapt the specific SNP analysis described in these examples for use with other mutations or other starting material.

If the above-mentioned plant products are prepared only from barley plants, which are double-null-LOX-null-MMT, then the presence vs. the absence of barley LOX-1 mRNA, LOX-2 mRNA and MMT mRNA and/or barley LOX-1 protein, LOX-2 protein and MMT protein may also be indicative of whether said plant product is prepared from a double-null-LOX-null-MMT barley plant. Examination of the plant product may also be accomplished by western blot analysis, or other protein analyses, or by RT-PCR, or by Northern blot analysis, or by other mRNA analyses. Such analyses are particularly useful when the plant product is malt.

Barley Plant

The invention relates to cereal based beverages. Cereals may for example be selected from the group consisting of barley, wheat, rye, oat, maize, rice, sorghum, millet, triticale, buckwheat, fonio and quinona. More preferably, the cereal is selected from the groups consisting of barley, wheat, rye, oat, maize and rice, more preferably the cereal is barley.

Thus, preferably the invention relates to barley based beverages and barley plants useful for preparing the beverages of the invention.

Barley is a family of plants. "Wild barley", *Hordeum vulgare* ssp. spontaneum, is considered the progenitor of today's cultivated forms of barley. The transition of barley from a wild to a cultivated state is thought to have coincided with a radical change of allele frequencies at numerous loci. Rare alleles and new mutational events were positively selected for by the farmers who quickly established the new traits in the domesticated plant populations, denoted "barley landraces". These are genetically more closely related to modern cultivars than wild barley. Until the late 19th century, barley landraces existed as highly heterogeneous mixtures of inbred lines and hybrid segregates, including few plants derived from random crossings in earlier generations. Most of the landraces have been displaced in advanced agricultures by pure line cultivars. Intermediate or high levels of genetic diversity characterize the remaining landraces. Initially, "modern barley" cultivars represented selections from landraces. These were later derived from successive cycles of crosses between established pure lines, such as those of diverse geographical origins. Eventually, the result was a marked narrowing of the genetic base in many, probably all, advanced agricultures. Compared with landraces, modern barley cultivars have numerous improved properties (Nevo, 1992; von Bothmer et al., 1992), for example one or more, but not limited to the following: (i) covered and naked kernels; (ii) seed dormancy; (iii) disease resistance; (iv) environmental tolerance (for example to drought or soil pH); (v) quantities of lysine and other amino acids; (vi) protein content; (vii) nitrogen content; (viii) carbohydrate composition; (ix) hordein content and composition; (x) (1-3, 1-4)-β-glucan and arabinoxylan content; (xi) yield; (xii) straw stiffness; and (xiii) plant height.

Within the present invention, the term "barley plant" comprises any barley plant, such as barley landraces or modern barley cultivars. Thus, the invention relates to any barley plant comprising a first mutation resulting in a total loss of functional LOX-1, and a second mutation resulting in a total loss of functional LOX-2 and a third mutation resulting in a total loss of functional MMT. An example of such a barley plant is described in the Examples herein below and denoted "Triple-Null" or "Triple-Null barley".

However, preferred barley plants for use with the present invention are modern barley cultivars or pure lines. The barley cultivar to be used with the present invention may, for example, be selected from the group consisting of Sebastian, Quench, Celeste, Lux, Prestige, Saloon, Neruda, Harrington, Klages, Manley, Schooner, Stirling, Clipper, Franklin, Alexis, Blenheim, Ariel, Lenka, Maresi, Steffi, Gimpel, Chem, Krona, Camargue, Chariot, Derkado, Prisma, Union, Beka, Kym, Asahi 5, KOU A, Swan Hals, Kanto Nakate Gold, Hakata No. 2, Kirin-choku No. 1, Kanto late Variety Gold, Fuji Nijo, New Golden, Satukio Nijo, Seijo No. 17, Akagi Nijo, Azuma Golden, Amagi Nijpo, Nishino Gold, Misato golden, Haruna Nijo, Scarlett, Rosalina and Jersey preferably from the group consisting of Haruna Nijo, Sebastian, Quench, Celeste, Lux, Prestige, Saloon, Neruda and Power, preferably from the group consisting of Harrington, Klages, Manley, Schooner, Stirling, Clipper, Franklin, Alexis, Blenheim, Ariel, Lenka, Maresi, Steffi, Gimpel, Chem, Krona, Camargue, Chariot, Derkado, Prisma, Union, Beka, Kym, Asahi 5, KOU A, Swan Hals, Kanto Nakate Gold, Hakata No. 2, Kirin-choku No. 1, Kanto late Variety Gold, Fuji Nijo, New Golden, Satukio Nijo, Seijo No. 17, Akagi Nijo, Azuma Golden, Amagi Nijpo, Nishino Gold, Misato golden, Haruna Nijo, Scarlett and Jersey preferably from the group consisting of Haruna Nijo, Sebastian, Tangent, Lux, Prestige, Saloon, Neruda, Power, Quench, NFC Tipple, Barke, Class and Vintage.

In one embodiment of the invention, the barley plant is accordingly a modern barley cultivar (preferably a cultivar selected from the group of barley cultivars listed herein above) comprising a first mutation resulting in a total loss of functional LOX-1 and a second mutation resulting in a total loss of functional LOX-2 activity, and a third mutation resulting in a total loss of functional MMT. In this embodiment, it is thus preferred that the barley plant is not a barley landrace.

The barley plant may be in any suitable form. For example, the barley plant according to the invention may be a viable barley plant, a dried plant, a homogenized plant, or a milled barley kernel. The plant may be a mature plant, an embryo, a germinated kernel, a malted kernel, a milled malted kernel, a milled kernel or the like.

Parts of barley plants may be any suitable part of the plant, such as kernels, embryos, leaves, stems, roots, flowers, or fractions thereof. A fraction may, for example, be a section of a kernel, embryo, leaf, stem, root, or flower. Parts of barley plants may also be a fraction of a homogenate or a fraction of a milled barley plant or kernel.

In one embodiment of the invention, parts of barley plants may be cells of said barley plant, such as viable cells that may be propagated in vitro in tissue cultures. In other embodiments, however, the parts of barley plants may be viable cells that are not capable of maturing into an entire barley plant, i.e. cells that are not a reproductive material.

Loss of Functional LOX

The present invention relates to barley plants—or part thereof, or plant products thereof—having a first, a second mutation and a third mutation, wherein the first mutation leads to a total loss of functional LOX-1, and the second mutation leads to a total loss of functional of LOX-2. The third mutation leads to a total loss of functional MMT as is described in more detail in the section "Loss of function MMT" herein below.

The total loss of functional LOX-1 and the total loss of functional LOX-2 may independently be based on different mechanisms. For example, the total loss of function of one or both of LOX-1 and LOX-2 activities may be caused by malfunctioning proteins in the barley plant, i.e. a malfunctioning LOX-1 and/or LOX-2 protein, such as a mutated LOX-1 protein with no detectable 9-HPODE—forming activity (wherein 9-HPODE preferably may be determined as described in Example 4 of international patent application PCT/DK2009/050355), and/or a mutated LOX-2 protein with no detectable 13-HPODE forming activity (wherein 13-HPODE preferably may be determined as described in Example 4 of international patent application PCT/DK2009/050355).

The total loss of functional LOX-1 and/or LOX-2 may be caused by the lack of LOX-1 and/or LOX-2 protein. It is apparent that lack of LOX-1 protein will lead to loss of functional LOX-1, and that lack of LOX-2 protein will lead to total loss of functional LOX-2. Thus, the barley plant may preferably comprise no—or only very little, more preferably no detectable—LOX-1 and/or LOX-2 protein. The LOX-1 and/or LOX-2 protein(s) may be detected by any suitable means known to the person skilled in the art. Preferably, however, the protein(s) is detected by techniques wherein LOX-1 protein is detected by specific LOX-1 and LOX-2 antibodies, such as polyclonal antibodies to LOX-1 and LOX-2. Said techniques may, for example, be Western blotting or ELISA. Said antibodies may be monoclonal or polyclonal. Preferably, however, said antibodies are of a polyclonal nature, recognizing several different epitopes within the LOX-1 and LOX-2 protein, respectively. LOX-1 and/or LOX-2 protein may also be detected indirectly, for example, by methods determining LOX-1 activity, or by methods determining LOX-2 activity. In one preferred embodiment of the invention, LOX-1 protein is detected using the methods outlined in Example 4 of the international patent application WO 2005/087934. LOX-2 protein may be detected in a similar manner, using antibodies binding to barley LOX-2.

The total loss of function of one or both of LOX-1 and LOX-2 activities may also be a result of no, or very little, preferably no expression of a LOX-1 transcript and/or a LOX-2 transcript. The skilled person will acknowledge that the absence of a LOX-1 and/or a LOX-2 transcript also will result in the absence of translated LOX-1 and/or LOX-2 protein, respectively. Alternatively, the total loss of functional LOX-1 and functional LOX-2 may also be a result expression of an aberrant LOX-1 transcript and/or an aberrant LOX-2 transcript. An aberrant LOX-1 and/or LOX-2 transcript may be caused by aberrant splicing of the transcript, for example, due to a mutation in a splice site. Thus, the barley plants of the invention may carry a mutation in a splice site, such as a 5' splice site or a 3' splice site, for example in one or the two most 5' nucleotides of an intron, or in one of the most 3' nucleotides of an intron. An example of a mutant with aberrant splicing of the LOX-1 transcript is described as mutant A618 in WO 2005/087934. Expression of transcripts encoding LOX-1 or LOX-2 may, for example, be detected by Northern blotting or RT-PCR experiments.

Mutations have caused the total loss of functional LOX-1 and LOX-2 enzymes of the barley plants of the present invention. Thus, the barley plants of the present invention in general carry a mutation in the LOX-1 gene. Said mutation may be in the regulatory regions, for example within the promoter or introns, or said mutation may be in the coding region. The mutation may also be deletion of the LOX-1 gene or part thereof, such as deletion of the entire coding region. Similarly, the barley plants of the present invention in general carry a mutation in the LOX-2 gene. Said mutation may be in the regulatory regions, for example within the promoter or introns, or said mutation may be in the coding region. The mutation may also be deletion of the LOX-2 gene or part thereof, such as deletion of the entire coding region. Thus, the cause of the total loss of functional LOX-1 and/or LOX-2 enzymes may also be detected by the identification of mutations in the gene encoding LOX-1, or in the gene encoding LOX-2. Mutations in the genes encoding LOX-1 and LOX-2 may, for example, be detected by sequencing said genes. Preferably, after identifying a mutation, the total loss of function is confirmed by testing for LOX-1 and/or LOX-2 activities.

The term "LOX-1 protein" is meant to cover the full-length LOX-1 protein of barley as set forth in SEQ ID NO:3 (corresponding to SEQ ID NO:3 of WO 2005/087934), or in SEQ ID NO:7 of WO 2005/087934, or a functional homolog thereof. The active site of LOX-1 is situated in the C-terminal part of the enzyme. In particular, it is anticipated that the region spanning amino acid residues 520-862, or parts thereof, (preferably the entire region of amino acids nos. 520-862) are relevant for LOX-1 activity. Accordingly, in one embodiment, null-LOX-1 barley preferably comprises a gene that encodes a mutated form of LOX-1 that lacks some or all of amino acids 520-862 of LOX-1. Said mutated LOX-1 may also lack other amino acid residues, which are present in wild-type LOX-1.

Accordingly, double-null-LOX barley of the invention may comprise a truncated form of LOX-1, which is not functional—such as an N- or a C-terminal truncated form. Preferably, said truncated form comprises no more than 800, more preferably no more than 750, even more preferably no more than 700, yet more preferably no more than 690, even more preferably no more than 680, yet more preferably no more than 670 consecutive amino acids of LOX-1, such as no more than 665, for example no more than 650, such as no more than 600, for example no more than 550, such as no more than 500, for example no more than 450, such as no more than 425, for example no more than 399 consecutive amino acids of LOX-1 of SEQ ID NO:3 (corresponding to SEQ ID NO:3 of WO 2005/087934). Preferably, said truncated form comprises only an N-terminal fragment of LOX-1, preferably at the most the 800, more preferably at the most the 750, even more preferably at the most the 700, yet more preferably at the most the 690, even more preferably at the most the 680, yet more preferably at the most the 670, even more preferably at the most the 665 N-terminal amino acids of SEQ ID NO:3 (corresponding to SEQ ID NO:3 of WO 2005/087934), such as no more than 665, for example no more than 650, such as no more than 600, for example at the most the 550, such as at the most the 500, for example at the most the 450, such as at the most the 425, for example at the most the 399 N-terminal amino acids of SEQ ID NO:3 (corresponding to SEQ ID NO:3 of WO 2005/087934). In addition to the fragment of LOX-1, said truncated form may optionally comprise additional C-terminal sequences not present in wild-type LOX-1. This may in particular be the case if the truncated form has arisen from aberrant splicing. Preferably, said additional C-terminal sequences consist of at the most 50, more preferably at the most 30, even more preferably at the most 10, yet more preferably of at the most 4, or at the most 1 amino acid.

In one very preferred embodiment, the truncated form may consist of amino acids 1-665 of SEQ ID NO:3 (corresponding to SEQ ID NO:3 of WO 2005/087934).

In a preferred embodiment of the invention, the barley plant comprises a LOX-1—encoding gene that is transcribed into mRNA, which comprises a nonsense codon or a stop codon upstream of the stop codon of wild-type LOX-1 mRNA. Such a nonsense codon is herein denoted a premature nonsense codon. Preferably, all LOX-1—encoding genes transcribed into mRNA of said plant comprise a premature nonsense codon or a stop codon. The nonsense codon or stop codon is preferably situated at the most 800, more preferably at the most the 750, even more preferably at the most the 700, yet more preferably at the most the 690, even more preferably at the most the 680, yet more preferably at the most the 670, even more preferably at the most the 665 codons downstream of the start codon. The sequence of wild-type genomic DNA encoding LOX-1 is given in SEQ ID NO:1 (corresponding to SEQ ID NO:1 of WO 2005/087934) or SEQ ID NO:5 of WO 2005/087934.

In one preferred embodiment, the barley plant of the invention comprises a gene encoding LOX-1, wherein the corresponding pre-mRNA transcribed from said gene comprises the sequence corresponding to SEQ ID NO:2 of WO 2005/087934.

In a very preferred embodiment of the invention, the gene encoding mutant LOX-1 of the double null-LOX barley plant according to the invention comprises a nonsense mutation, said mutation corresponding to a G→A substitution at position 3574 of SEQ ID NO:1 of WO 2005/087934.

The term "LOX-2 protein" is meant to cover the full-length LOX-2 protein of barley as set forth in SEQ ID NO:7 (corresponding to SEQ ID NO:5 of international patent application PCT/DK2009/050355), or a functional homolog thereof. The active site of LOX-2 is situated in the C-terminal part of LOX-2. In particular, it is anticipated that the region spanning amino acid residues 515-717, or parts thereof, are relevant for LOX-2 activity. Based on an examination of the soybean LOX-1 crystal structure, anticipated sequence stretches of the active site cleft of the LOX-2 enzyme of barley are represented by amino acid residues 515-525 and 707-717. A translated, mutated LOX-2 protein, i.e. a C-terminally truncated form of LOX-2 of barley double null-LOX mutant A689 contains max. 684 residues, and will therefore lack the second sequence stretch of the active site cleft—making it inactive. According to one embodiment of the invention, double-null-LOX barley of the invention preferably comprises a gene encoding a mutant form of LOX-2 that lacks some, or all, of amino acids 515-717 of LOX-2, preferably lacking some or all of amino acids 707 to 717, even more preferably lacking all of amino acids 707-717. Said mutant LOX-2 may also lack other amino acid residues, which are present in wild-type LOX-2.

Accordingly, double-null-LOX barley may comprise a truncated form of LOX-2, which is not functional, such as an N-terminal or a C-terminal truncated form. Preferably, said truncated form comprises no more than 800, more preferably no more than 750, even more preferably no more than 725, yet more preferably no more than 700, even more preferably no more than 690, yet more preferably no more than 684 consecutive amino acids of LOX-2 of SEQ ID NO:7 (corresponding to SEQ ID NO:5 of international patent application PCT/DK2009/050355). Preferably, said truncated form comprises only an N-terminal fragment of LOX-2. Hence, preferably said truncated form comprises at the most the 800, more preferably at the most the 750, even more preferably at the most the 725, yet more preferably at the most the 700, even more preferably at the most the 690, yet more preferably at the most the 684 N-terminal amino acids of SEQ ID NO:7 (corresponding to SEQ ID NO:5 of international patent application PCT/DK2009/050355). In addition to the fragment of LOX-12, said truncated form may optionally comprise additional C-terminal sequences not present in wild-type LOX-2. This may in particular be the case if the truncated form has arisen from aberrant splicing. Preferably, said additional C-terminal sequences consist of at the most 50, more preferably at the most 30, even more preferably at the most 10, yet more preferably of at the most 4, or at the most 1 amino acid.

In one very preferred embodiment, the truncated form may consist of amino acids 1-684 of SEQ ID NO: 7 (corresponding to SEQ ID NO:5 of international patent application PCT/DK2009/050355).

In a preferred embodiment of the invention, the barley plant comprises a gene transcribed into mRNA for LOX-2, wherein said mRNA comprises a nonsense codon or a stop codon upstream of the stop codon of wild-type LOX-2 mRNA. Such a nonsense codon is herein designated a premature nonsense codon. Preferably all genes transcribed into mRNA encoding LOX-2 of said plant comprise a premature nonsense codon or a stop codon. The nonsense codon or stop codon is preferably situated at the most 800, more preferably at the most the 750, even more preferably at the most the 725, yet more preferably at the most the 700, even more preferably at the most the 690, yet more preferably at the most the 684 codons downstream of the start codon. The sequence of wild-type genomic DNA encoding LOX-2 is given in SEQ ID NO: 5 (corresponding to SEQ ID NO:1 of international patent application PCT/DK20091050355).

In a very preferred embodiment of the invention, the gene encoding mutated LOX-2 of the double null-LOX barley plant comprises a nonsense mutation, said mutation corresponding to a G→A substitution at position 2689 of SEQ ID NO: 5 (corresponding to SEQ ID NO:1 of international patent application PCT/DK2009/050355).

The barley plant according to the invention may be prepared by any suitable method known to the person skilled in the art, preferably by one of the methods outlined herein below in the section "Preparing double-null-LOX-null-MMT barley".

Loss of Functional MMT

The present invention relates to barley plants—or part thereof, or plant products thereof—having a first, a second mutation and a third mutation, wherein the first mutation leads to a total loss of functional LOX-1, and the second mutation leads to a total loss of functional of LOX-2—both described herein above in more detail in the section "Loss of functional LOX". The third mutation leads to a total loss of functional MMT.

The total loss of a functional MMT may be based on different mechanisms. For example, the total loss of functional MMT may result from a malfunctioning protein in said plant, i.e. a malfunctioning MMT enzyme, such as a mutant MMT protein with no detectable activity. For instance, the MMT protein of the mutant may be a truncated protein. The loss of MMT activity may similarly be based on different mechanisms, for example caused by a malfunctioning MMT protein.

Preferably, the activity of a mutated MMT protein is determined by its capacity to catalyze transfer of a methyl group from SAM to Met, thereby forming SMM. This may, for example, be undertaken as described in Example 4 in international patent application PCT/DK2009/050315. Preferably, the amino acid sequence of a mutated MMT is obtained by determining the translated sequence of the corresponding, isolated barley cDNA. This may be done essentially as described in Example 8 of international patent application PCT/DK2009/050315. Alternatively, the mutated MMT of a barley plant of the invention is obtained by heterologous expression in a bacterial cell culture as described in Example 11 and Example 12 in international patent application PCT/DK2009/050315, followed by verifying that the recombinant protein is inactive as an MMT enzyme.

The total loss of functional MMT may be realized by the lack of MMT protein. Lack of MMT protein will lead to loss of MMT function. Thus, the barley plant may comprise no, or only very little, preferably no detectable MMT protein. The presence or absence of MMT protein may be detected by any suitable means known to the person skilled in the art. However, the protein(s) is preferably analyzed by techniques wherein MMT protein is detected by specific antibodies that recognize MMT. Said techniques may, for example, be western blotting or enzyme-linked immunosorbent assay, and said specific antibodies may be monoclonal or polyclonal. Preferably, however, said antibodies are polyclonals that recognize several different epitopes within the MMT protein. This may also be detected indirectly, for example, by methods for MMT activity determination. Thus, in one preferred embodiment of the invention, a barley plant is said to carry a mutation in the gene encoding MMT, thus causing a total loss of MMT activity, when no MMT protein is detectable in said plant. In particular, this is the case when no MMT protein with an approximate mass of 120 kDa, ±10%, is detectable in said barley plant—preferably in kernels of said barley plant, as analyzed by western blotting.

The total loss of functional MMT may also be a result of no, or very little, preferably no, transcription of an MMT mRNA. The skilled person will acknowledge that the absence of an MMT transcript also will result in the absence of MMT protein.

Preferably, however, the total loss of functional MMT is a result of expression of an aberrant MMT transcript. Said transcript may preferably be caused by an aberrant splicing event of the primary transcript, for example, due to a mutation in a splice site. Expression of transcripts encoding MMT may, for instance, be detected by Northern blotting, or by RT-PCR methods.

The total loss of functional MMT in the barley plants of the present invention is caused by one or more mutations. Thus, the barley plants of the present invention, in general, carry at least one mutation in the MMT gene. Said mutation(s) may be in regulatory regions, for instance within the promoter, or introns, or said mutation(s) may be in the protein coding region. The mutation may also be deletion of the MMT gene or part thereof, for example deletion of the coding region of the MMT gene. Thus, the loss of functional MMT may also be detected by analyzing for mutations in the gene encoding MMT. Mutations in the MMT-encoding gene may, for example, be detected by sequencing said gene, followed by comparing it to the wild-type sequence, preferably the wild-type sequence of cv. Prestige given in SEQ ID NO:9 (corresponding to the sequence given in international patent application PCT/DK2009/050315 as SEQ ID NO:3), or that of cv. Sebastian (SEQ ID NO:11 corresponding to SEQ ID NO:16 of international patent application PCT/DK2009/050315). Preferably, after identifying a mutation, the loss of function is confirmed by testing for MMT activity, for instance as described in Example 2 or Example 4 of international patent application PCT/DK2009/050315.

The term MMT protein is meant to cover the full length MMT protein of barley as set forth in SEQ ID NO:13 (corresponding to SEQ ID NO:6 of international patent application PCT/DK2009/050315), or a functional homolog thereof. In this context, a functional homolog is an MMT protein with the same level of MMT activity, ±25%, as that of the MMT protein of barley as set forth in SEQ ID NO:13, wherein the MMT activity is determined as described in Example 2 or Example 4 of international patent application PCT/DK2009/050315.

The barley plant carrying a third mutation causing a total loss of MMT activity may comprise a non-functional, truncated form of MMT, such as an N-terminal or a C-terminal truncated form. A barley plant may comprise more than one truncated form of MMT, such as 2, or for example 3, or such as more than 3 different truncated forms of MMT, which may result from aberrantly spliced transcripts. Said truncated forms comprise only an N-terminal fragment of MMT. In addition to the N-terminal fragment of wild-type MMT, said truncated forms of MMT may comprise additional C-terminal sequences not found in wild-type MMT. Said additional C-terminal sequences may, for instance, be translated intron sequences, such as those comprised in the mutant mRNA due to aberrant splicing. Preferably, said truncated MMT forms comprise at the most the 500, more preferably at the most the 450, even more preferably at the most the 400, yet more preferably at the most the 350, even more preferably at the most the 320, yet more preferably at the most 311, or at the most 288 N-terminal amino acid residues of SEQ ID NO:13 (corresponding to SEQ ID NO:6 of international patent application PCT/DK2009/050315). This is in particular the case when said barley plant has a total loss of MMT activity. However, the MMT may also comprise less, such as no more than 300, for example no more than 250, such as no more than 200, for example at the most the 150, for example no more than 147, or no more than 133 N-terminal amino acids of SEQ ID NO:13 (corresponding to SEQ ID NO:6 of international patent application PCT/DK2009/050315).

In one very preferred embodiment, the truncated MMT form may consist of amino acids 1-311 or amino acids 1-288 of SEQ ID NO:13 (corresponding to SEQ ID NO:6 of international patent application PCT/DK2009/050315) and optionally additional C-terminal sequences not present in wild-type MMT. Preferably, said additional C-terminal sequences consist of at the most 50, more preferably at the most 30, even more preferably at the most 10, yet more preferably of at the most 4, or at the most 1 amino acid. In a very preferred embodiment, the truncated form of MMT may be the protein according to SEQ ID NO:11 of international patent application PCT/DK2009/050315, or SEQ ID NO:13 of international patent application PCT/DK2009/050315, or SEQ ID NO:15 of international patent application PCT/DK2009/050315. None of the proteins of SEQ ID NO:11, or SEQ ID NO:13, or SEQ ID NO:15 of international patent application PCT/DK2009/050315 represent functional MMT enzymes.

In another very preferred embodiment, the truncated MMT form may consist of amino acids 1-147, or of amino acids 1-133, of SEQ ID NO: 14 (corresponding to SEQ ID NO:18 of international patent application PCT/DK2009/050315), and optionally additional C-terminal sequences not present in wild-type MMT. Preferably, said additional C-terminal sequences consist of at the most 50, more preferably at the most 40, even more preferably at the most 39, or at the most 33, or at the most 30 amino acids. In a very preferred embodiment, the truncated form of MMT may be the protein according to SEQ ID NO:15, SEQ ID NO:16 or SEQ ID NO:17 (corresponding to SEQ ID NO:22, or SEQ ID NO:24, or SEQ ID NO:26 of international patent application PCT/DK2009/050315, respectively). None of the proteins of SEQ ID NO:15, SEQ ID NO:16 or SEQ ID NO:17 (corresponding to SEQ ID NO:22, or SEQ ID NO:24, or SEQ ID NO:26 of international patent application PCT/DK2009/050315, respectively) are functional MMT enzymes.

The above-mentioned truncated forms of MMT may, for example be present in barley plants carrying a mutation in the MMT gene, wherein said mutation introduces a premature stop codon resulting in a gene encoding above-mentioned truncated forms of MMT.

In a preferred embodiment of the invention, the barley plant comprises an MMT gene that is transcribed into mRNA, which comprises some, but not all, of the wild-type MMT gene spliced together without intervention (the intron-exon structure of the wild-type MMT gene of barley is shown in FIG. 9 of international patent application PCT/DK2009/050315). In one embodiment of the present invention it is accordingly preferred that the MMT mRNA of the barley plant according to the invention comprises at the most exons 1, 2, 3, 4, and 5 spliced together without intervention, or for example at the most exons 1 and 2 spliced together without intervention. In addition to said spliced-together exons, the MMT mRNAs of the barley plant according to the invention may comprise additional 3' terminal sequences derived from wild-type introns and/or exons, wherein introns separate exons sequences. Preferred examples of aberrant MMT mRNAs of barley plants according to the invention—as determined by RT-PCR and accordingly with fragment lengths in by—are illustrated in FIG. 12 and FIG. 16 of international patent application PCT/DK2009/050315. More preferably, the aberrant mRNAs of barley plants according to the invention are those illustrated in FIG. 12 of international patent application PCT/DK2009/050315, further comprising exons 1 and 2 at the 5' end, or the mRNAs illustrated in FIG. 16 of international patent application PCT/DK2009/050315, further comprising exon 1 at the 5' end.

In a very preferred embodiment of the present invention, the barley plant carrying a third mutation in the gene for MMT causing a total loss of functional MMT comprises a mutation in a splice site within the MMT gene, which results in aberrantly spliced mRNA. More preferably, said mutation is positioned in an intron of the MMT gene, even more preferably in the 5' splice site of an intron, such as in the 5' splice site on intron 1 (the intron separating exons 1 and 2), such as in the 5' splice site on intron 2 (the intron separating exons 2 and 3), such as in the 5' splice site on intron 3 (the intron separating exons 3 and 4), such as in the 5' splice site on intron 4 (the intron separating exons 4 and 5), such as in the 5' splice site on intron 5 (the intron separating exons 5 and 6), such as in the 5' splice site on intron 6 (the intron separating exons 6 and 7), most preferably in the 5' splice site on intron 2 or intron 5.

It is preferred that said mutation is a G→A mutation of the terminal 5' base of the aforementioned introns. Thus, a very preferred mutation is a G→A mutation of the terminal 5' base of intron 2, or a G→A mutation of the most 5' base of intron 5.

The barley plant according to the invention may be prepared by any suitable method known to the person skilled in the art, preferably by the method outlined herein below in the section "Preparing double-null-LOX-null-MMT barley".

Preparing Double-Null-LOX-Null-MMT Barley

The barley plant according to the invention may be prepared by any suitable method known to the person skilled in the art. Preferably, the barley plant of the invention is prepared by a method comprising the steps of mutagenizing barley plants or parts thereof, for example barley kernels, followed by screening and selecting barley plants characterized by a total loss of functional LOX-1, total loss of functional LOX-2 and/or total loss of functional MMT.

The barley plants according to the invention comprise at least 3 mutations. Accordingly, the plants may be prepared by preparing separate barley plants that comprise only one of the mutations and thereafter crossing said barley plants to obtain a barley plant with all of the 3 mutations—or by successively introducing the mutations into a barley plant or by a combination of these methods.

Thus, the barley plant according to the invention may be prepared by mutagenizing a barley plant or parts thereof, for example barley kernels, followed by screening and selecting barley plants characterized by a total loss of functional LOX-1, and mutagenizing another barley plant or parts thereof, for example barley kernels, followed by screening and selecting barley plants characterized by a total loss of functional LOX-2 and mutagenizing yet another barley plant or parts thereof, for example barley kernels, followed by screening and selecting barley plants characterized by a total loss of functional MMT. The selected barley plants may eventually be crossed in several rounds to obtain barley plants carrying all of the three mutations.

Alternatively, the barley plant of the present invention may be prepared by mutagenizing barley plants or parts thereof, for example barley kernels, followed by screening and selecting barley plants characterized by a total loss of functional XX. Said selected barley plants may optionally be propagated and then these barley plants—or parts thereof, for example barley kernels—may be mutagenised, followed by screening and selecting barley plants characterized by a total loss of functional YY. Said selected barley plants, or parts thereof, may optionally be propagated and then either:
  (i) these barley plants—or parts thereof, for example barley kernels—may be mutagenised, followed by screening and selecting barley plants characterized by a total loss of functional ZZ; or
  (ii) these barley plants may be crossed with a barley plant characterized by total loss of functional ZZ.

In the above-mentioned crossings, XX, YY and ZZ each denotes either LOX-1, LOX-2 or MMT, wherein XX is different to YY, which is different to ZZ.

In one preferred embodiment, the barley plant may be prepared by a method involving mutagenizing barley plants, or parts thereof, for example barley kernels, wherein said barley plants already carry a mutation causing a total loss of functional LOX-1 enzyme followed by screening and selecting barley plants further carrying a mutation that causes a total loss of functional LOX-2 (i.e. null-LOX-1-null-LOX-2, or double-null-LOX plants). This method furthermore involves mutagenizing other barley plants, or parts thereof and screening and selecting barley plants with total loss of functional MMT and eventually crossing these barley plants with the null-LOX-1-null-LOX-2 barley plants.

Suitable null-LOX-1 barley plants are, for example, described in international patent application WO 2005/087934.

It is preferred that the screening method utilises germinated embryos as starting material for the identification of barley plants characterized by a total loss of functional LOX-2. Interestingly, the present inventors have found that the use of mature embryos as starting material for a screening for LOX-2 activity is less preferable, based on the screening of as many as 21,000 mature embryos, which did not reveal a single null-LOX-2 barley mutant.

It is an objective of the present invention to provide methods of preparing a double-null-LOX-null-MMT barley plant comprising the steps of: (i) preparing a double-null-LOX barley plant; and (ii) preparing a null-MMT barley plant; (iii) crossing said double-null-LOX barley plant and said null-MMT barley plant; (iv) selecting double-null-LOX-null-MMT barley plants.

Preparing said double-null-LOX barley plants may preferably be done by a method comprising the steps of:
  (i) providing a barley plant, or parts thereof, with a total loss of function of LOX-1 activity, such as total loss of functional LOX-1 enzyme; and
  (ii) mutagenizing said barley plant, and/or barley cells, and/or barley tissue, and/or barley kernels, and/or barley embryos from said barley plant, thereby obtaining generation M0 barley; and
  (iii) breeding said mutagenized barley plants, kernels, and/or embryos for at least 2 generations, thereby obtaining generation Mx barley plants, wherein x is an integer 2; and
  (iv) obtaining embryos from said Mx barley plants; and
  (v) germinating said embryos; and
  (vi) determining the LOX-1 and LOX-2 activities in said germinated embryos, or parts thereof; and
  (vii) selecting plants with a total loss of LOX-1 activity and LOX-2 activity in the germinated embryos; and
  (viii) analyzing for a mutation in the LOX-1 gene and in the LOX-2 gene; and
  (ix) Selecting plants carrying a mutation in the LOX-1 gene and the LOX-2 gene, i.e. double-null-LOX plants;
thereby obtaining a barley plant carrying mutations in the genes for LOX-1 and LOX-2, causing a total loss of functional LOX-1 and functional LOX-2.

Preparing said null-MMT barley plants may preferably be done using a method comprising the steps of:
  (i) mutagenizing barley plants, and/or barley cells, and/or barley tissue, and/or barley kernels, and/or barley embryos, thereby obtaining generation M0 barley; and
  (ii) propagating, e.g. by breeding, said mutagenized barley plants, kernels, and/or embryos for generations, thereby obtaining barley plants of generation Mx, wherein x is an integer 2; and
  (iii) obtaining a sample of said Mx barley plants; and
  (iv) determining the level of SMM in said sample; and
  (v) selecting plants wherein the sample comprises less than 10 ppb SMM, preferably less than 5 ppb SMM, more preferably no detectable SMM; and
  (vi) sequencing at least part of the MMT gene; and
  (vii) selecting plants carrying a mutation in the MMT gene.

The aforementioned barley plant with a total loss of LOX-1 activity may, for example, be any of the barley plants with a total loss of LOX-1 activity described in WO 2005/087934, preferably mutant D112, or progeny plants thereof.

The mutagenizing steps in the aforementioned methods may involve mutagenizing living material selected from the group consisting of barley plants, barley cells, barley tissue, barley kernels, and barley embryos—preferably selected from the group consisting of barley plants, barley kernels, and barley embryos, more preferably barley kernels.

Mutagenesis may be performed by any suitable method. In one embodiment, mutagenesis is performed by incubating a barley plant, or a part thereof—for example barley kernels or individual cells from barley—with a mutagenizing agent. Said agent is known to the person skilled in the art, including, for example, but not limited to, sodium azide (NaN$_3$), ethyl methanesulfonate (EMS), azidoglycerol (AG, 3-azido-1,2-propane-diol), methyl nitrosourea (MNU), and maleic hydrazide (MH).

In another embodiment, mutagenesis is performed by irradiation, for example by UV, a barley plant or a part thereof, such as the kernel. In preferred embodiments of the invention, the mutagenesis is performed according to any of the methods outlined herein below in the section "Chemical mutagenesis". A non-limiting example of a suitable mutagenesis protocol is given in Example 2 of international patent application PCT/DK20091050355.

It is preferred that the mutagenesis is performed in a manner such that the expected frequency of desired mutants is at least 0.5, such as in the range of 0.5 to 5, for example in the range of 0.9 to 2.3 per 10,000 grains, when screening barley of generation M3. In a preferred embodiment, mutagenesis is performed on barley kernels. The kernels applied to the mutagen are designated as generation M0 (see also FIG. 8).

The LOX activity may be determined in a sample consisting of germinating barley embryo, preferably in a liquid extract of a germinating barley embryo. Said sample, such as said extract may be prepared from any suitable part of said germinating embryo. In general, the barley sample must be homogenized using any suitable method prior to preparation of an extract of said sample and determination of LOX-2 activity. In particular, it is preferred that a protein extract is prepared from the germinating embryo, or part thereof, and that the LOX activity is determined using said extract. Homogenization may, for example, be performed using mechanical forces, for example by shaking or stirring, such as by shaking in the presence of a bead, such as a glass or a sand bead.

In a preferred embodiment, the germinating embryo is of generation Mx, wherein x is an integer 2; preferably x is an integer in the range of 2 to 10, more preferably in the range of 3 to 8. In a very preferred embodiment, LOX activity is determined in germinating embryos of generation M3, or a sample derived from such embryos. In that embodiment, it is preferred that mutagenized barley kernels of generation M0 are grown to obtain barley plants, which are crossed to obtain kernels of generation M1. The procedure is repeated until kernels of generation M3 are available (see also FIG. 8).

Determination of LOX activity may be carried out using any suitable assay, preferably by one of the methods outlined hereinafter. In particular, it is preferred that the assay provides data on the dioxygenation of linoleic acid to 9-HPODE and 13-HPODE by LOX-1 and LOX-2. In general, assaying will therefore involve the steps of:
 (i) providing a protein extract prepared from a germinated barley embryo or part thereof; and
 (ii) providing linoleic acid; and
 (iii) incubating said protein extract with said linoleic acid; and
 (iv) detecting dioxygenation of linoleic acid to 9-HPODE and 13-HPODE.

Step (iv) of the method preferably comprises determining the level of 9-HPODE and 13-HPODE in said germinating embryos, preferably in a protein extract prepared from said germinating embryos. The step may comprise a direct or an indirect determination of the levels of 9-HPODE and 13-HPODE. The total level of all HPODEs may be determined, in which case it is preferred that specific measurements of 9-HPODE and 13-HPODE are performed for confirmation. One method could, for example, be a method wherein protein extracts from germinating embryos are incubated with linoleic acid as substrate for formation of 9-HPODE and 13-HPODE. Said HPODEs can then be detected by various methods. One method may involve generation of a detectable compound, such as a dye. For example the method may be the oxidative coupling of 3-dimethylaminobenzoic acid and 3-methyl-2-benzothiazolinone hydrazone in the presence of hemoglobin, catalyzed by the formed HPODEs to form the indamine dye, which can be measured at $A_{595}$ using a spectrophotometer. An example of such a method is described in Examples 1 and 2 in international patent application PCT/DK2009/050355. Using this assay, an absorption reading of less than 0.2 $A_{595}$ unit is considered as indicative of the absence of LOX-1 and the absence of LOX-2 activities. However, a more precise method for determining LOX-1 and LOX-2 activities is to incubate a protein extract from germinating embryos with linoleic acid, followed by determination of 9-HPODE and 13-HPODE contents. 9-HPODE and 13-HPODE contents may, for example, be determined using HPLC-based analysis.

Dioxygenation of linoleic acid to 9-HPODE and 13-HPODEs may be measured directly or indirectly. Any suitable detection method may be used with the present invention. In one embodiment of the invention, linoleic acid hydroperoxides are detected. 9-HPODE and 13-HPODE may be detected directly, for example, by chromatographic methods, such as HPLC as described in Example 4 in international patent application PCT/DK2009/050355.

The present invention discloses that certain aspects of the procedure for extraction of protein from the germinating embryo for determination of LOX activity is of great importance. Thus, it is preferred that the protein is extracted using an acidic buffer, preferably a buffer with a pH in the range of 2 to 6, more preferably in the range of 3 to 5, even more preferably in the range of 3.5 to 5, yet more preferably in the range of 4 to 5, even more preferably a pH of 4.5. The buffer used for extraction is preferably based on an organic acid, more preferably a lactic acid buffer. Most preferably, the protein extract is prepared using a 100-mM lactic acid buffer, pH 4.5.

Certain embodiments of the present invention disclose methods for detection of null-LOX-1 and null-LOX-2 plants that involve reaction of 9-HPODE and 13-HPODE with a dye, e.g. 3-methyl-2-benzothiazolinone hydrazone. Preferably, said dye, e.g. 3-methyl-2-benzothiazolinone hydrazone, is added to the protein extract after addition of linoleic acid. Preferably, the dye is added at least 1 min, more preferably at least 5 min, even more preferably at least 10 min, such as in the range of 1 to 60 min, for example in the range of 5 to 30 min, such as in the range of 10 to 20 min after contacting the protein extract with the linoleic acid.

Preferred methods for selecting barley plants according to the invention are detailed in Example 2 of international patent application PCT/DK2009/050355.

The selection procedure may be adjusted for microtitre plate-based assay procedures, or other known repetitive, high-throughput assay formats to allow rapid screening of many samples. It is preferred that at least 5000, such as at least 7500, for example at least 10,000, such as at least 15,000, for example at least 20,000, such as at least 25,000 mutagenized barley plants are analyzed for LOX-1 and LOX-2 activities.

Determination of a mutation in the gene encoding LOX-1 may be performed by several different methods. For example, the LOX-1 gene may be sequenced completely or partly, and the sequence compared to SEQ ID NO:1 (corresponding to SEQ ID NO:1 of WO 2005/087934) or SEQ ID NO:5 of WO 2005/087934. If searching for a specific mutation, SNP analysis may be applied. The skilled person will be able to design useful primers for detection of a given specific mutation, such as one leading to a premature stop codon in the coding sequence for LOX-1 (e.g. any of the premature stop codons described hereinabove). One example of how to perform a SNP analysis is described in Example 10 of international patent application PCT/DK2009/050355, with primers that are useful for detecting a G→A mutation at nucleotide position 3474 of the LOX-1 gene.

Determination of a mutation in the gene encoding LOX-2 may be performed by several different methods. For example, the LOX-2 gene may be sequenced completely or partly, and the sequence compared to SEQ ID NO:5 (corresponding to SEQ ID NO:1 of international patent application PCT/DK2009/050355. If searching for a specific mutation, SNP analysis may be used. The skilled person will be able to design useful primers for detection of a given specific mutation, such as one leading to a premature stop codon in the LOX-2 coding sequence (e.g. any of the premature stop codons described hereinabove). An example of how to perform a SNP analysis is described in Example 10 in international patent application PCT/DK2009/050355, as are primers useful for detecting a G→A mutation at nucleotide position 2689 of the gene for LOX-2.

It is also comprised within the present invention that steps (viii) and (ix) of the method of preparing a double null-LOX barley plant, as detailed in this section hereinabove, may be performed prior to steps (vi) and (vii), in which case the method will comprise the steps (i), (ii), (iii), (iv), (v), (viii), (ix), (vi), and (vii) in that order. In particular, this could be the case when searching for a specific mutation, for example in progeny plants of already identified double null-LOX barley plants.

Preferably, selection of barley plants with total loss of functional MMT comprises obtaining a sample from a mutagenized barley plant, preferably from a germinating mutagenized barley plant, even more preferably from a mutagenized barley plant, which has germinated for 4 d. It is preferred that the sample is from a coleoptile and/or a primary leaf, preferably from a leaf. Thus, the sample may, for example, be in the range of 1 cm to 3 cm leaf tissue.

The sample may be extracted and analyzed following a newly developed multistep protocol, as described herein, involving the successive use of different solvents and binding materials. In general, the sample may be extracted, for example with a solvent or a mixture of solvents, preferably water and/or organic solvents. The organic solvent may, for example, be an alcohol, preferably methanol—or the organic solvent may for example be an alkyl-halide, preferably chloroform. In one preferred embodiment, the solvent is a mixture of water, methanol, and chloroform. Said extraction may advantageously be performed while mixing, for example, using a shaker or a mixer. A solid support may be added to the solvent/sample mixture—for instance a bead, such as a glass bead.

In a preferred embodiment, the aforementioned leaf sample for determination of MMT activity is taken from generation Mx kernels, wherein x is an integer 2, preferably in the range of 2 to 10, more preferably in the range of 3 to 8. In a very preferred embodiment, the level of SMM is determined in M3-germinated plants, or in samples thereof (such as leaves). In said embodiment, it is preferred that mutagenized barley kernels of generation M0 are grown to obtain barley plants, which subsequently are crossed to obtain kernels of generation M1. The procedure is repeated until kernels of generation M3 are available (cf. FIG. 8).

Determination of the SMM level is preferably based on the novel procedure described below. Interestingly, this method allows for high-throughput screenings, rendering it feasible to identify barley plants characterized by a total loss of functional MMT.

In general terms, the method preferably involves reacting the sample, or preferably an extract of said sample, prepared as described above, with a compound capable of binding SMM. It was found that the OPA reagent (Sigma, cat. no. P7914; cf. FIG. 2 of international patent application PCT/DK2009/050315), hereinafter just referred to as OPA, is particularly useful for determining SMM levels. OPA reacts, amongst others, with SMM to form the molecule referred to as SMM-OPA (cf. FIG. 2 of international patent application PCT/DK2009/050315). The reaction preferably involves incubating OPA with an extract of the sample prepared as described above. In addition, it is preferred that 3-mercaptopropionic acid is added to the reaction mixture. The mixture is preferably kept at alkaline pH, preferably in the range pH 8 to pH 11, more preferably in the range pH 9 to pH 11, even more preferably in the range pH 9.5 to pH 10.5, such as at pH 10. Incubation is preferably performed at a temperature in the range of 0° C. to 10° C., preferably in the range of 1° C. to 8° C., even more preferably in the range of 2° C. to 6° C., yet more preferably in the range of 3° C. to 5° C., such as at 4° C. Incubation time is preferably ≥10 min.

Figure 2:
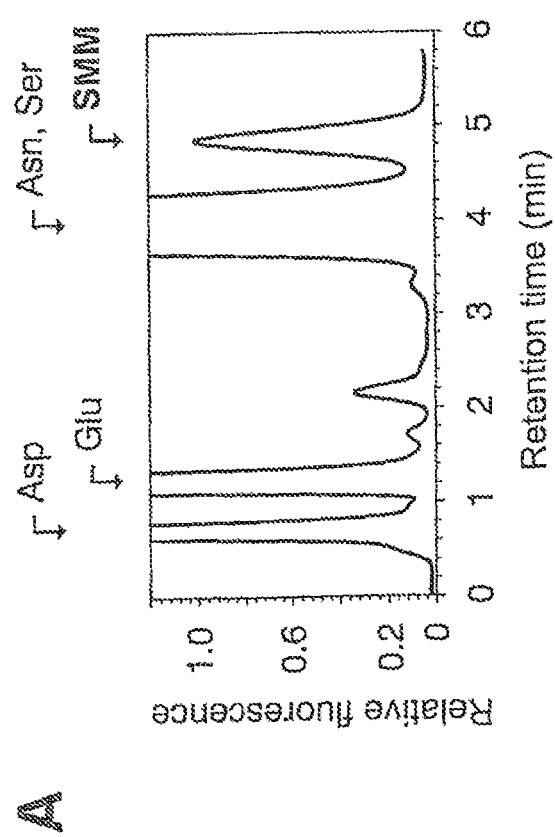
FIG. 2 shows results of HPLC experiments to verify the null-MMT phenotype of Mutant 8063 and Mutant 14018. (A) An example on HPLC-based separation of an extract from shoots of cv. Prestige, showing elution of aspartic acid (Asp), glutamic acid (Glu), asparagine (Asn), serine (Ser)
Figure 2:
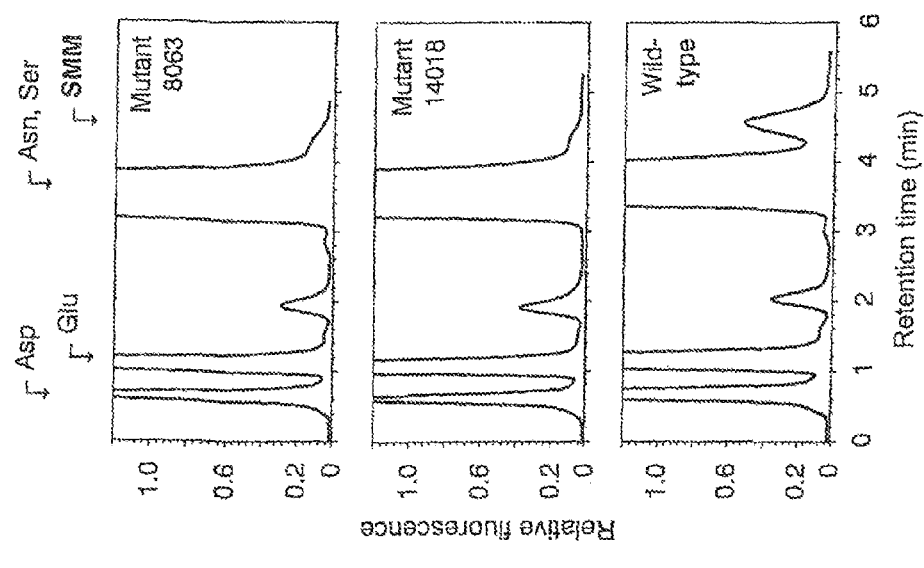

Based on the observation that SMM-OPA absorbs and emits light of 340 nm and 450 nm, respectively, its detection was possible by using fluorescence spectroscopy. The initial process of detection preferably involves extract separation over a column, preferably on a 30×2 mm Gemini 3μ C18 column (Phenomenex, cat. no. 00A-4439-80; Phenomenex, 2006), followed by fluorescence detection using a high-throughput liquid chromatography system, preferably an Ultra Performance Liquid Chromatography (UPLC system, Waters), designed to identify and measure the fluorescent level of molecules having excitation at 340 nm and emission at 450 nm. When using this method, "no detectable SMM" means the absence of detectable compounds that co-elute with SMM. In this context, a small "shoulder" on a chromatogram peak is considered an artifact peak. A small shoulder on the right hand side of the Asn/Ser peak, cf. FIG. 2, is accordingly not considered to represent a SMM peak. Thus, by way of example, the upper two chromatograms as shown in FIG. 2B are considered to depict "no detectable SMM", whereas the lower chromatogram in said figure represents the separation of a sample comprising SMM.

Detection of SMM may preferably be done as described in Example 2 or Example 4. A preferred method for selecting barley plants according to the invention is described hereinafter in Example 2. Tissue for analysis is preferably sampled from a germinating barley plant, even more preferably from a barley plant, which has germinated for 4 days. It is notable that the above-mentioned screening method is particularly useful. First of all the analytical method is novel. Furthermore, it is a significant advantage of the above method that it is established for determination of SMM levels in germinating barley plants, such as leaves of germinating barley plants. The timing of sampling from the germinating barley makes an unexpectedly clean preparation for UPLC-based detection of SMM. Other samples, for example wort samples of similar grains as described above are too complex in composition, and can generally not be utilized in the mentioned chromatography method for determination of SMM levels.

Subsequent to the identification of a barley plant having less than 10 ppb SMM, preferably no detectable SMM, the corresponding MMT gene, or part thereof, is typically sequenced to determine whether the barley plant in question can be classified as having a mutation in the MMT gene. Barley plants characterized by having no detectable SMM, and wherein one or more bases of the MMT-encoding gene are different as compared with the wild-type sequence, are then selected. In this context, the wild-type sequence is preferably the sequence found in the corresponding wild-type barley cultivar, preferably the sequence given as SEQ ID NO:9 (corresponding to SEQ ID NO:3 in international patent application PCT/DK2009/050315). Preferred mutations are described hereinabove.

Selected barley mutants may be further propagated, and plants of subsequent generations re-screened for SMM content. After selection of useful barley plants, these may be included in breeding programs utilizing those conventional methods that are described herein below in the section "Plant breeding".

Once a double-null-LOX-null-MMT barley plant has been identified, which contains a particular mutation in the LOX-1 gene and a particular mutation in the LOX-2 gene and a particular mutation in the MMT gene (such as any of the above-mentioned mutations), additional barley plants with the identical mutations may be generated by conventional breeding methods, such as those well known to the skilled person. For example, said double-null-LOX barley plant may be backcrossed with another barley cultivar.

Subsequent to the selection of useful barley plants with total loss of functional LOX-1, LOX-2 and MMT, one or more additional screenings may optionally be performed. For example, selected mutants may be further propagated, and plants of new generations may be tested for the total loss of functional LOX-1, LOX-2 and MMT.

In one embodiment of the invention, it is preferred that the double-null-LOX-null-MMT barley plant according to the present invention has plant growth physiology and grain development similar to that of wild-type barley. It is hence preferred that the double-null-LOX-1-null-MMT barley plant is similar to wild-type barley (preferably to cv. Power or cv. Quench or cv. Rosalina) with respect to plant height, number of tillers per plant, onset of flowering, and/or number of grains per spike.

Also, it is preferred that the double-null-LOX-null-MMT barley plant according to the present invention is similar to wild-type barley, in particular similar to cv. Power or cv Quench with respect to plant height, heading date, disease resistance, lodging, ear-breakage, maturation time, and yield. In the present context, "similar" is to be understood as the same ±10% in case of numbers. These parameters may be determined as described hereinafter in Example 5.

In a very preferred embodiment of the invention, the barley plant is prepared by crossing the barley Line A689 (ATCC Patent Deposit Designation: PTA-9640), with the barley Line 8063 (ATCC Patent Deposit Designation: PTA-9543) and optionally followed by further breeding.

Seeds of barley line A689 have been deposited 4 Dec. 2008 under the name "Barley, *Hordeum vulgare* L.; Line A689" with American Type Culture Collection (ATCC), Patent Depository, 10801 University Blvd., Manassas, Va. 20110, United States (deposit number PTA-9640).

Seeds of barley line 8063 have been deposited on 13 Oct. 2008 with American Type Culture Collection (ATCC), Patent Depository, 10801 University Blvd., Manassas, Va. 20110, United States and referred to as "Barley, *Hordeum vulgare*; Line 8063" (ATCC Patent Deposit Designation: PTA-9543).

Chemical Mutagenesis

In order to generate double-null-LOX-null-MMT barley plants according to the present invention, a very large number of barley mutants are prepared—typically in multiple rounds—by any suitable mutagenesis method, for example by the use of chemical mutagenesis of barley kernels. This method is known to introduce mutations at random. Mutagenesis of barley may be performed using any mutagenizing chemical. However, it is preferably performed by treating kernels with $NaN_3$, letting the surviving kernels germinate, followed by analysis of off-spring plants. The plant generation growing from the mutagenized kernels, referred to as M0, contains heterozygote chimeras for any given mutation. Progeny plants collected after self-pollination are referred to as the M1 generation, in which a given mutation segregates into the corresponding heterozygotes and homozygotes (cf. FIG. 8).

Treating kernels with $NaN_3$ is not equivalent to treating a single cell, because the kernels after the treatment will contain some non-mutant cells and a variety of cells having DNA mutations. Since mutations in cell lineages that do not lead to the germ line will be lost, the goal is to target the mutagen to the few cells that develop into reproductive tissues which contribute to development of the M1 generation.

To assess the overall mutation efficiency, albino chimeras and albino plants may be counted in the generations M0 and M1. Scoring mutant number as a function of surviving plants gives an estimate for the mutation efficiency, while scoring mutant number as a function of treated seeds measures the combination of both mutation efficiency and kernel kill.

It is notable that cells have quality assurance mechanisms at virtually every step of gene expression, possibly to moderate the effects of damaging mutations. One well-studied example in eukaryotes is nonsense-mediated mRNA decay, denoted NMD, which prevents the synthesis of potentially deleterious, prematurely truncated proteins (Maquat and Carmichael, 2001; Wu et al., 2007). In NMD, a termination codon is identified as premature by its position relative to downstream destabilizing elements. Mutations that generate premature termination (nonsense) codons (PTCs) sometimes increase the levels of alternatively spliced transcripts that skip the offending mutations, thereby potentially saving protein function (Mendell and Dietz, 2001).

Plant Breeding

In one embodiment of the invention, the objective is to provide agronomical useful barley plants comprising the double-null-LOX-null-MMT trait. Crop development is often a lengthy and difficult process that begins with the introduction of the new trait. From the perspective of a plant breeder, however, this step almost always results in a plant that has a less desirable overall profile of agronomic traits than do current commercial varieties.

In addition to the double-null-LOX-null-MMT trait, there are additional factors which also may be considered in the art of generating a commercial barley variety useful for malting and/or brewing and/or as base for beverages, for example kernel yield and size, and other parameters that relate to malting performance or brewing performance.

Since many—if not all—relevant traits have been shown to be under genetic control, the present invention also provides modern, homozygous, high-yielding malting cultivars, which may be prepared from crosses with the double-null-LOX-null-MMT barley plants that are disclosed in the present publication. The skilled barley breeder will be able to select and develop barley plants, which—following crossings with double-null-LOX barley-null-MMT barley—will result in superior cultivars. Alternatively, the barley breeder may utilize plants of the present invention for further mutagenesis to generate new cultivars derived from double-null-LOX-null-MMT barley.

One method to ensure that the double-null-LOX-null-MMT trait is maintained in progeny lines concerns SNP analysis of the LOX-1 gene, the LOX-2 gene and the MMT gene. Preferably, LOX-1, LOX-2 and MMT activities are also determined.

The barley plants according to the present invention may be introduced into any suitable breeding scheme.

Another objective of the present invention is to provide agronomical elite barley plants comprising the double-null-LOX-null-MMT trait. Accordingly, this invention also is directed to methods for producing a new double-null-LOX-null-MMT barley plant by crossing a first parental barley plant with a second parental barley plant, wherein the first or second plant is a double-null-LOX-null-MMT barley. Additionally, both first and second parental barley plants can come from a double-null-LOX-null-MMT barley variety. Thus, any such methods using the double-null-LOX-null-MMT barley variety are part of this invention: selfing, backcrossing, crossing to populations, and the like. All plants produced using a double-null-LOX-null-MMT barley variety as a parent are within the scope of this invention, including those plants developed from varieties derived from a double-null-LOX-null-MMT barley variety. The double-null-LOX-null-MMT barley can also be used for genetic transformation in such cases where exogenous DNA is introduced and expressed in the double-null-LOX-null-MMT plant or plant tissue.

Backcrossing methods can be used with the present invention to introduce into another cultivar the double-null-LOX-null-MMT trait of a mutated barley plant, for example cv. Scarlett or cv. Jersey or cv. Quench or cv. Rosalina, which are contemporary, high-yielding malting barley cultivars. In a standard backcross protocol, the original variety of interest, i.e. the recurrent parental plant, is crossed to a second variety (non-recurrent parental plant), carrying the mutant LOX genes of interest to be transferred. The resulting double null-LOX progeny plants from this cross are subsequently crossed to the recurrent parental plant, with the process being repeated until a barley plant is obtained wherein essentially all of the characteristics specified by the recurrent parent are recovered in the generated plant—in addition to the double-null-LOX-null-MMT trait of the nonrecurrent parental plant. Eventually, the last-generated, backcrossed plant is selfed to yield a pure double-null-LOX-null-MMT breeding progeny plant.

A way to accelerate the process of plant breeding comprises the initial multiplication of generated mutants by application of tissue culture and regeneration techniques. Thus, another aspect of the present invention is to provide cells, which upon growth and differentiation produce barley plants having the double-null-LOX-null-MMT trait. For example, breeding may involve traditional crossings, preparing fertile anther-derived plants or using microspore culture.

LOX Pathway Products

In various embodiments, the present invention relates to barley plants, and products thereof, comprising low levels of T2N and T2N potential. LOX enzymes catalyze dioxygenation of polyunsaturated fatty acids with a cis-1,cis-4 pentadiene system. In barley, the $C_{18}$ polyunsaturated fatty acids linoleic acid ($18:2^{\Delta 9,12}$) and α-linolenic acid ($18:3^{\Delta 9,12,15}$) are major LOX substrates. The lipoxygenase pathway of fatty acid metabolism is initiated by the addition of molecular oxygen at the C-9 position (mostly catalyzed by LOX-1) or C-13 position (mostly catalyzed by LOX-2) of the acyl chain, yielding the corresponding 9- and 13-HPODEs [9- and 13-hydroperoxy octadecatrienoic acids (HPOTEs) are products when the substrate is α-linolenic acid, but HPOTEs do not function as precursors for T2N]. In the hydroperoxide lyase branch of the LOX pathway, both 9- and 13-HPODEs may be cleaved to short-chain oxoacids and aldehydes (cf. FIG. 1A). In particular, 9-HPODE may be cleaved to form cis-nonenal that is converted to T2N, whereas 13-HPODE is the precursor of 2-E-hexenal. Thus, 13-HPODE, the major product of LOX-2-catalyzed dioxygenation of linoleic acid was not anticipated to be an upstream component in the pathway leading to formation of the stale flavour T2N.

It is recognized that the present invention encompasses influencing production of downstream metabolites of LOX-1 and LOX-2 catalysis, which are not produced as a direct product of a LOX-1 or LOX-2—catalyzed reaction, but as a result of a subsequent series of reactions. These include spontaneous, factor-induced, or enzyme-catalyzed isomerizations and conversions. Thus, the production of these downstream metabolites could be influenced by modulating the expression of other components of the pathway, for example hydroperoxide lyase (HPL).

T2N and DMS and Precursors Thereof

The present invention relates to methods for preparing beverages with low levels of one or more off-flavours and precursors thereof. Preferably said off-flavours are T2N and DMS and said precursors thereof are T2N potential and DMSP, respectively.

One objective of the present invention is thus to reduce or eliminate the T2N potential. Thus, it is an objective of the present invention to reduce the formation of T2N precursors and aldehyde adducts. Although several chemical reactions related to beer staling remain elusive, generation of free T2N from T2N potential is recognized as a major cause of the development of stale flavour in beer products (Kuroda et al., supra). Therefore, it is an objective of the present invention to provide beverages with low level of T2N potential as well as beverages with low level of T2N precursors.

Most of the T2N potential is transferred from wort to the finished beer, in which free T2N may be liberated (Liegeois et al., 2002), with the conditions of acidity and temperature being important factors in this process. With reference to the present invention, T2N potential is defined as described hereinabove in the definitions. Other methods for determining the level of T2N potential are also available. In order to avoid confusion, the meaning of "T2N potential" in the present context is as described herein above in the definitions. The chemical substances which have the capacity to release T2N or be converted into T2N are denoted "T2N precursors" herein, and T2N precursors determined or measured by alternative methods other than the method for determining T2N potential are referred to as "T2N precursors". T2N precursors may in particular be determined by first treating a sample such that essentially all (preferably all) of its chemical substances, which have the capacity to release T2N or be converted into T2N actually do release T2N and/or convert to T2N, respectively. Thereafter, the level of T2N is determined.

Barley kernels of the instant invention comprise no LOX-1 and LOX-2 activities in addition to no MMT activity. Interestingly, such barley kernels contain very little T2N potential.

Beers produced using double-null-LOX-null-MMT barley kernels will therefore not only possess a very low level of T2N, but also a very low level of T2N potential. Within the scope of the present invention are double-null-LOX-null-MMT barley kernels, which yield beer products that contain very low levels of T2N potential, preferably less than 60%, more preferably less than 50% of the level of T2N potential of a similar beer product produced in the same manner from wild-type barley (preferably cv. Power).

Also, it is preferred that plant products derived from double-null-LOX-null-MMT barley kernels possess a very low level of T2N precursors. Within the scope of the present invention are plant products prepared from double-null-LOX-null-MMT barley kernels, said plant products containing less than 60%, more preferably less than 50% T2N precursors of a similar plant product produced in the same manner from wild-type barley (preferably cv. Power).

It is notable that measured T2N values often are higher in samples of, and in products from, a micro-malted raw material than that from a raw material produced in larger scale, for example from a 30-kg-large pilot-malted sample. However, the relative, experimental values of T2N between large- and small-scale experiments are in general similar.

Similarly, it is notable that measured T2N potentials and T2N precursors often are higher in samples of, and in products from, a micro-malted raw material than that from a raw material produced in larger scale, for example from a 30-kg-large pilot-malted sample. However, the relative, experimental values of T2N potentials between large- and small-scale experiments are in general similar.

It is also an objective of the present invention to reduce or eliminate DMS and DMSP, wherein DMSP preferably is SMM.

The amount of SMM and DMS in a plant product may be determined by any suitable method. SMM may be determined essentially as described hereinabove in the section "Preparing double-null-LOX-null-MMT barley plants", wherein is described determination of SMM levels in a barley sample. Thus, SMM may be determined by coupling it to a compound, such as OPA, and determining fluorescence, for example, by using a UPLC system. For a quantitative measurement, the chromatogram area corresponding to a SMM peak may be determined.

For a more precise measure, the amounts of both DMS and DMSP (such as SMM), the latter compound measured as DMS after activation, are preferably determined using high resolution capillary gas chromatography. Total DMS in samples of wort or beer are defined herein as the quantitative sum of free DMS and its precursor forms, denoted DMSP. Using this definition, the quantity of DMSP in a wort or beer sample can be determined as the difference between total DMS (measured in the boiled sample, preferably in a sample boiled at alkaline conditions for 1 h), and free DMS (measured in the non-boiled sample). Example 4 details preferable ways to measure levels of total and free DMS.

The amount of DMSP and also of SMM herein is given as the concentration of DMS which may be liberated from said DMSP or said SMM by boiling in alkaline conditions for 1 h.

EXAMPLES

The examples herein illustrate preferred embodiments of the invention and should not be considered as limiting for the invention.

Unless otherwise indicated, basic molecular biological techniques were performed for manipulating nucleic acids and bacteria as described in Sambrook and Russel (2001).

Example 1

Screening for Low LOX-2 Activity in Germinating Barley Embryos

Improved screening material. Kernels collected from barley plants of null-LOX-1 line Ca211901—generated by the crosses (null-LOX-1 mutant D112×Jersey)×Sebastian—were incubated with the mutagen $NaN_3$ according to the details provided by Kleinhofs et al. (1978). Barley null-LOX-1 mutant D112 is described in WO 2005/087934 and deposited with American Type Culture Collection (ATCC), 10801 University Boulevard, Manassas, Va. 20110, USA on Sep. 11, 2003, under the number PTA-5487.

This procedure was chosen since it is known to induce point mutations in the genomic DNA of barley, eventually conferring amino acid residue substitutions or truncations in proteins encoded by the mutagenized DNA. In the mutagenesis experiments of the instant publication, it was chosen to propagate mutated grains of generation M1 in field plots through two subsequent generations, eventually yielding a high proportion of homozygous plants for screening purposes (cf. FIG. 8). While grains of generation M2 were not screened, primarily because these were expected to contain a relatively high proportion of heterozygous point mutations, mutant grains of generation M3 were used as screening material, expecting 0.9-2.3 mutations per 10,000 grains (Kleinhofs et al., supra).

Surprisingly, the instant inventors found that analysis of germinating embryos provided much-improved assay results as compared to analysis of extracts of mature embryos (as described in Example 1 of international application PCT/DK2009/050355). A high-throughput screening procedure was therefore established to measure LOX-2 activity in the germinating embryo, including its scutellum tissue.

Two embryos were isolated from mature grains of 35,125 barley ears (20,977 lines of generation M4 of null-LOX-1 mutant D112, and 14,148 lines of generation M3 of null-LOX-1 line Ca211901lines), and transferred to 96-well storage plates (ABgene). Embryo germination was initiated following addition of 20 μL water to each well, which was covered with a wet Kimnett tissue and a plastic lid. The plates were incubated in plastic bags at 20° C. for 48 h. After incubation, LOX-2 enzyme was extracted; to each well was first added a 5-mm glass bead and 200 μL of extraction buffer (100 mM lactic acid solution, pH 4.5), followed by milling for 35 sec at a frequency of 27 $sec^{-1}$ in an MM 300 laboratory mill (Retsch). Subsequently, the plate was centrifuged at 4,000 rpm for 10 min at 4° C. in an Allegra 6R centrifuge (Beckman-Coulter), to precipitate insoluble material. LOX-2 activity was determined basically as described for analysis of LOX-2 activity of mature embryo extracts (cf. Example 1 in international application PCT/DK2009/050355), only differing in the usage of only 30 μL extract per assay instead of 40 μL.

Identification of Potential Mutants. As described above, two grains each of the above-mentioned 35,125 barley lines were analyzed for LOX-2 activity, with the aim to identify grains highly reduced in said activity when compared with null-LOX-1 and wild-type grains. A total of 7 potential raw mutants were identified in the M3 generation of line Ca211901. These were further propagated in the greenhouse, harvested, and then re-screened for the trait related to very low LOX activity. Eventually, only one mutant of line Ca211901, denoted mutant A689, was shown to exhibit essentially no LOX-2 activity. Detailed measurements of total LOX activity were performed with extracts of germinated embryos in which the LOX activity was conferred almost exclusively by LOX-2 (Schmitt and van Mechelen, 1997). For germinated embryos of M3 grains of mutant A689, the total LOX activity—as determined by the colourimetric LOX assay—was $0.163 \pm 5.5\%$ $A_{595}$ U/germinated embryo, while that for the null-LOX-1 mother variety Ca211901 was $1.224 \pm 3.8\%$ $A_{595}$ U/germinated embryo (the corresponding value for null-LOX-1 raw mutant D112 was $1.215 \pm 6.0\%$ $A_{595}$ U/germinated embryo). Seeds of barley line A689 have been deposited 4 Dec. 2008 under the name "Barley, Hordeum vulgare L.; Line A689" with American Type Culture Collection (ATCC), Patent Depository, 10801 University Blvd., Manassas, Va. 20110, United States (deposit number PTA-9640).

An analysis for HPODE in mutant A689 is described in Example 4 of international patent application PCT/DK2009/050355.

Properties of mutant A689 are described in Example 5 of international patent application PCT/DK2009/050355.

Sequencing of the gene for LOX-2 in barley mutant A689 is described in Example 10 of international patent application PCT/DK2009/050355 and Table 7 therein summarizes the mutations in the LOX-1 and LOX-2 genes of mutant A689.

A method for detecting the double-null-LOX mutant A689 is described in Example 11 of international patent application PCT/DK2009/050355. The method is a SNP based method for detecting the mutation in LOX-1 and the mutation in LOX-2.

Example 2

Screening for Null-MMT Barley Mutants

Kernels collected from barley plants of cv. Prestige and cv. Sebastian were incubated separately with the mutagen NaN$_3$, following the experimental details provided by Kleinhofs et al. (1978). This procedure was chosen because of its known potential for inducing point mutations in the barley genomic DNA.

In the experiments, mutated grains of generation M1 were propagated in field plots through two subsequent generations, eventually yielding a high proportion of homozygous plants of generation M3 for screening purposes. Mutated grains of generation M3 were expected to contain gene mutations at a frequency of 0.9-2.3 per 10,000 grains (Kleinhofs et al., supra). It is notable that M2 grains were not screened.

Interestingly, the present invention describes a rapid high-throughput screening procedure for detection of M3 mutant barley grains lacking MMT activity, providing lack of detectable SMM synthesis during malting. Thus, the inventors found that SMM mainly accumulated in the coleoptile and primary leaf of germinating barley, and that detection of SMM can be performed by extracting amino acids from crushed leaf tissue of 4-d-old germinated grains, followed by reacting the extracted amino acids with OPA to form highly fluorescent products (cf. FIG. 2).

In practical terms, each assay was performed by germinating—in a closed plastic box with one piece of Whatman #1 filter paper (296×20.9 mm)—two grains from each of 94 potential mutants and two wild-type plants. The assay was repeated for multiple, potential mutant grains (see below).

At the beginning of germination, 25 mL of tap water was added to said plastic box, followed by additional 15 mL of tap water at 2 d of germination. After 4 d of germination, 1-3 cm of leaf tissues were transferred to storage plates (AB-gene), in which each of the 96 1.2-mL wells contained a 5-mm-diameter glass bead and 500 μL of a 12:5:6 (v/v/v) mixture of water:methanol:chloro-form.

The plate was then shaken for 45 sec at a frequency of 30 Hz in an MM 300 laboratory mill (Retsch). Subsequently, the plate was transferred to a centrifuge (Rotanta 460R, Hettich), and spun at 4,000 rpm for 15 min at room temperature to precipitate insoluble material. 10 μL of the supernatant was transferred to a 96-well storage plate (Waters, cat no. 186002481), and mixed with 200 μL H$_2$O and 60 μL of a reaction solution containing a 15,000:45 (v/v) mixture of OPA reagent (Sigma, cat.no. P7914):3-mercaptopropionic acid (Aldrich, cat.no. M5801). The mixture was incubated at 4° C. for at least 10 min to obtain a quantitative derivatization of sample amino acids with OPA. Using a Waters-based UPLC system equipped with a fluorescence detector, 2 μL of the derivatized mixture was separated on a 2.1×30-mm C18 Gemini column of 3-μm particles (Phenomenex, cat.no. 00A-4439-80), using gradient elution by mixing mobile phase A (a 40-mM NaH$_2$PO$_4$ buffer, adjusted to pH 7.8) and mobile phase B [a 45:45:10 (v:v:v) solution of acetonitrile:methanol:water as described (Phenomenex, 2006)]. Excitation of eluted OPA derivatives was at 340 nm, while light emission was measured at 450 nm. An example of a chromatogram is shown in FIG. 2 to illustrate the elution profile of aspartic acid (Asp), glutamic acid (Glu), asparagine (Asn), serine (Ser) and SMM. The latter compound was included, as the overall project aim was to identify a barley plant that lacked the capacity to synthesize SMM, i.e. a plant for which the corresponding chromatogram peak was very small or preferably absent.

A total of 10,248 and 3,858 NaN$_3$-mutated kernels of barley cv. Prestige and cv. Sebastian, respectively, were screened for SMM content, with the aim to identify those highly reduced in said content when compared with wild-type grains. Only 2 potential mutants of the M3 generation were identified, namely grains of sample no. 8,063 (derived from cv. Prestige, and hereinafter denoted Mutant 8063, a designation also used for grains of subsequent generations), and grains of sample no. 14,018 (derived from cv. Sebastian, and hereinafter denoted Mutant 14018, a designation also used for grains of subsequent generations). Grains of each mutant were propagated to the M4 generation, then harvested, and eventually re-analyzed. The result verified that grains of Mutant 8063 and Mutant 14018 had extremely low SMM contents, possibly totally lacking SMM.

Western blot analysis has verified that Mutant 8063 and Mutant 14018 lacked MMT enzyme (see Example 3 of international patent application PCT/DK2009/050315).

Also MMT activity measurements has verified that Mutant 8063 lacks MMT activity (see Example 4 of international patent application PCT/DK2009/050315).

Sequencing of the gene for MMT in barley mutant 8063 as described in Example 9 of international patent application PCT/DK2009/050315 revealed a G→A base transition at the first base of intron 5 (nucleotide no. 3076 of SEQ ID NO:10—corresponding to SEQ ID NO:8 of international patent application PCT/DK2009/050315). Sequencing of the gene for MMT in barley mutant 14018 as described in Example 14 of international patent application PCT/DK2009/050315 revealed a G→A base transition in a splice donor site immediately downstream of exon 2 at the first base of intron 2, more specifically at nucleotide no. 1462.

It has furthermore been confirmed that MMT mRNA is truncated in mutant 8063 (see Example 11 of international patent application PCT/DK2009/050315) and that the mutant MMT protein encoded by said truncated mRNA has no MMT activity (see Example 12 of international patent application PCT/DK2009/050315). It has also been confirmed that MMT mRNA is truncated in mutant 14018 (see Example 15 of international patent application PCT/DK2009/050315) and that the mutant MMT protein encoded by said truncated mRNA has no MMT activity (see Example 16 of international patent application PCT/DK2009/050315).

A method for detecting the presence of the mutation in the MMT gene of mutant 8063 is described in Example 11 of international patent application PCT/DK2009/050315, and a method for detecting the presence of the mutation in the MMT gene of mutant 14018 is described in Example 17 of international patent application PCT/DK2009/050315.

Example 3

Barley Crossings

FIG. 3 summarizes how the double-null-LOX-null-MMT barley line of the instant invention was developed by first crossing barley line A689 [double null-LOX cf. PCT patent application no PCT/DK2009/050355] with line 8063 [null-MMT cf. PCT Patent Application No. PCT/DK2009/050315]. Using standard breeding techniques, doubled haploid lines were developed, and propagated in the greenhouse. Of these, the best-performing lines with regard to agronomic performance—as well as an absence of LOX-1 activity (cf. Example 2 in U.S. Pat. No. 7,420,105 to Breddam, K. et al.), an absence of LOX-2 activity (cf. Example 2 in PCT Application No. PCT/DK2009/050355, and Example 1 herein), as well as an absence of SMM and MMT activity (Examples 2 and 4 in PCT Application No. PCT/DK2009/050315, and Example 2 herein)—were selected for further propagation and analysis. These lines are denoted "Triple-Null" herein. In general for LOX activity determinations, seeds of double haploid lines were harvested and followed by analysis of 12 grains of each line and control varieties, giving a <5% standard deviation for the measurements (FIG. 4).

Example 4

Determination of SMM Levels

Measurement of SMM was performed essentially as described in PCT Application PCT/DK2009/050315. First, SMM was extracted from 1-3-cm-long sections of barley leaves that were placed in 1.2-mL wells of microtitre plates, in which each well contained a 5-mm-diameter glass bead and 500 µL of a 12:5:6 (v/v/v) mixture of water:methanol:chloroform. The plate was then incubated for 45 sec in an MM 300 laboratory mill (Retsch), electronically adjusted to shake at a frequency of 30 Hz. After centrifugation, 10 µL of the supernatant was transferred to a 96-well storage plate (Waters, cat no. 186002481), and mixed with 200 µL of water and 60 µL a reaction solution containing a 15,000:45 (v/v) mixture of OPA reagent (Sigma, cat. No. P7914): 3-mercaptopropionic acid (Aldrich, cat. No. M5801). The mixture was incubated at 4° C. for at least 10 min to quantitatively derivatize amino acids of the sample with OPA. Using an UPLC system (Waters) equipped with a fluorimeter, 2 µL of the derivatized mixture was separated on a 2.1×30-mm C18 Gemini column of 3-µm particles (Phenomenex, cat. No. 00A-4439-80), using a 40-mM Na-phosphate buffer, adjusted to pH 7.8, and containing a 45:45:10 (v:v:v) solution of acetonitrile:methanol:water as the mobile phase (Phenomenex 2006). Excitation of OPA-derivatives were at 340 nm, while light emission was measured at 450 nm. An example of a chromatogram is shown in FIG. 5 to illustrate the elution profile of aspartic acid (Asp), glutamic acid (Glu), asparagine (Asn), serine (Ser) and SMM from wild-type and the Triple-Null mutant. A notable lack of capacity to synthesize SMM was observed for the Triple-Null mutant.

Example 5

Agronomic Performance

The commercial barley cvs. Quench and Power, as well as null-LOX-1, null-MMT, null-LOX-1-null-LOX-2 (double-null-LOX), null-LOX-1-null-MMT and Triple-Null plants were tested in field trials to compare their agronomic performances. Data were regularly obtained for plant height, heading date, disease resistance, lodging, maturation time and yield (see Table 1).

The trials were performed according to standard procedures for field trials. Accordingly, equal amounts of kernels of the commercial varieties and the mutant lines were sown in 7.88-m² plots in 2 locations, each comprising 3 replications. No major differences with respect to agronomic traits were observed between mutants and the commercial varieties. The barley quality analysis of the different mutant lines and varieties demonstrated that all of the harvested grains possessed good and acceptable properties with regard to malting and brewing.

Example 6

Micro-Maltings and Micro-Mashings

Experimental Set-Up

Micro-malting and -mashing experiments were performed with the following six different barley lines and cultivars (FIG. 6A), which also illustrates the experimental workflow described herein below): (1) Triple-Null; (2) null-LOX-1-null-MMT; (3) null-LOX-1-null-LOX-2 (barley line A689); (4) null-MMT (barley line 8063); (5) null-LOX-1 (barley line D112); (6) cv. Power.

A micro-malting experiment was done with three 225-g barley samples from each of the aforementioned lines or cultivar. Steeping and germination were performed as follows:
  (i) steeping at 16° C.: 3 h wet; 21 h dry; 3 h wet; 21 h dry; 3 h wet; 21 h dry; final water content 45%;
  (ii) germination: 48-72 h at 16° C. until modification >95%.

After germination, the three samples were subjected to different drying regimes (denoted kiln drying in FIG. 6A):
  (i) 85° C.—Drying: 12.5 h starting at 30° C. and ramping to 55° C. followed by 7.5 h ramping to at 85° C.; 1.5 h at 85° C.;
  (ii) 75° C.—Drying: 12.5 h starting at 30° C. and ramping to 55° C. followed by 7.5 h ramping to at 75° C.; 1.5 h at 75° C.;
  (iii) 40° C.—Drying: 48 h at 40° C.

The samples dried at 85° C. and at 40° C. were processed immediately after germination while the remaining samples were frozen for 2 d, thawed and subsequently dried at 75° C. as outlined above.

Micro-mashing was performed by mixing 90-g samples of a milled malt with 270 mL of tap water, followed by incubation in 500-mL bottles at 40° C. for 20 min. The temperature was ramped to 65° C. in 25 min, followed by a 60-min-long saccharification pause at 65° C. Thereafter, the temperature was ramped to 78° C. in 13 min in advance of a 10-min-long mashing-off phase at 78° C. The resulting wort was then cooled on ice, diluted with 700 mL of ice-cold tap water and filtered through a folded MN-616% filter (Macherey-Nagel). 400 mL of wort was transferred to a 500-mL bottle, tightly capped and heated for 60 min in a boiling water bath. The bottles were left in the water bath without further heating for an additional time period of 60 min.

Data on DMSP Levels

To examine how various kiln drying temperatures affect the content of DMSP in wild-type and mutant malts of the instant application, grains were first micro-malted and subsequently separated in aliquots before kilning at three different temperatures, 40° C., 75° C. and 85° C.

Grains of barley lines containing the wild-type MMT gene were characterized by high levels of DMSP in the final malt. However, reduced levels were measured following kilning at higher temperatures (Table 2). In contrast, notably low levels of DMSP were measured in all of the malts of the null-MMT genotypes.

DMSP levels were also measured in the worts produced from the above-mentioned malts, giving DMSP levels in correspondence with those measured in the malts. This finding is in line with previous results of Dickenson and Anderson (1981), describing a tight correlation between the DMSP content of the malt and wort. For all of the null-MMT genotypes, notably low DMSP levels were measured in the corresponding worts, irrespective of the kiln drying temperature with which the malt was made.

Data on Levels of T2N Precursors and Free T2N

To examine how various kiln drying temperatures affect the levels of free T2N and T2N precursors, concentrations of said compounds were determined in sweet wort and cooled wort produced by micro-maltings and -mashings as described herein above. The results are shown in Table 3.

For wort of wild-type malt, the kiln drying temperature had a notable effect on the concentration of T2N and T2N precursors. A high kilning temperature was absolutely necessary to avoid high production of T2N precursors when using wild-type malt.

The kilning temperature had less effect on generation of T2N and its adduct of null-LOX-1-null-MMT malt.

It is also notable that for the worts of Triple-Null malt, the concentrations of free T2N and its precursors were low in all of the samples, irrespective of the kiln drying temperature.

Example 7

Micro-Mashings with Unmalted Barley

Micro-mashings of unmalted barley of cv. Power and Triple-Null were achieved by mixing 90-g samples of milled barley with 270 mL of tap water as well as 0.12 g the barley brewing enzyme mixture Ondea Pro (Novozymes), followed by incubation in 500-mL bottles at 54° C. for 30 min. The temperature was ramped to 64° C. in 10 min, followed by a 45-min-long saccharification pause at 64° C. This was followed by a 14-min ramp to 78° C. before a 10-min-long mashing-off phase at said temperature. Subsequent cooling, dilution, filtration and heating procedures were performed as described for the micro-malt mashings (see Example 4).

DMSP levels were measured in worts produced form barley flours of cv. Power and Triple-Null (Table 4). It was evident that the DMSP contents in wort produced of Triple-Null barley were remarkably lower than those of wild-type, cv. Power. This was a surprising finding since barley is not considered to contain DMSP (Yang, B. et al.: Factors involved in the formation of two precursors of dimethylsulphide during malting, J. Am. Soc. Brew. Chem. 56:85-92, 1998).

As shown in PCT Patent Application No. PCT/DK2009/050355 (cf. FIG. 12 and Example 9 in said application), the levels of T2N precursors of boiled, barley-brewed and normal worts were markedly low in the samples from double-null-LOX. Accordingly, it is expected that a similar property characterizes worts of Triple-Null barley, making Triple-Null barley a premium raw material for barley-brewed beverages low in, or completely lacking, the T2N and DMS off-flavours.

Example 8

Malting and Brewing in Pilot Scale

Experimental Set-Up

Malting and brewing analyses with malt of Triple-Null and cv. Quench (reference malt) involved the following steps: (i) malting; (ii) wort preparation; (iii) wort separation; (iv) wort boiling; (v) fermentation of wort with the yeast *Saccharomyces carlsbergensis*; (vi) lagering of beer; (vii) bright beer filtration; and (viii) bottling of beer (cf. FIG. 6B,C).

Malting experiments were carried out with kernels of Triple-Null and cv. Quench in 20-kg-large scales, performed in a malt house as follows:
 (i) steeping at 16° C.: 1 h wet; 1 h dry; 1 h wet; 1 h dry; 1 h wet; final water content 45%;
 (ii) germination for 120 h, starting at 16° C. and ramping to 14° C.;
 (iii) drying for 14 h, starting at 65° C. and ramping to 85° C.; 3 h at 85° C.

For mashings of both Triple-Null and cv. Quench (the latter used as reference), samples of 25 kg malt were used. Following milling of the individual malt samples, tap water was added to give 146-L volumes. Mashing-in was performed at 40° C. for 20 min, followed by a 25 min ramp from 40° C. to 65° C. The saccharification pause at 65° C. was for 60 min, followed by a 13-min heat-up phase to 78° C., and 10 min of mashing-off at 78° C.

One wort sample of wild-type cv. Quench and one of Triple-Null were separately boiled for 60 min at 101° C. (resulting in 6.7% evaporation), while the remaining two wort samples were heated at 98° C. for 60 min (resulting in 3.9% evaporation). The remaining brewing steps as referred to hereinabove—i.e. filtration, whirlpool separation, fermentation, lagering, and packaging in green glass bottles—were according to specifications for standard brewing practice.

DMSP and DMS levels were measured essentially as described by Hysert et al. (1980), with sulphur-specific detection using static headspace gas chromatography on a 350B sulfur chemiluminescence detector (Sievers). Headspace sampling was performed using a HS-40 automated equipment (Perkin Elmer).

Total levels of DMS, i.e. the sum of free DMS and DMSP, in wort and extracts of green and kilned malt, were obtained by boiling the respective samples under alkaline conditions for 1 h. Boiled and un-boiled samples were then subjected to headspace analysis for determination of DMS levels. The difference between total DMS (measured in the boiled samples) and free DMS (measured in the un-boiled samples) was defined to equal the amount of DMSP present in the samples. The quantity of free DMS in beer was determined essentially as that in wort (Hysert et al., supra).

Data on Levels of DMSP/DMS and T2N Precursor/Free T2N in Wort Samples

Using modern brewing equipment, evaporation of 6-10% wort is normally required in order to achieve satisfactory DMS levels in the corresponding, finished beer—i.e. [DMS] <50 ppb, which is the human taste threshold level of the off-flavour. Based on these facts, pilot brewing trials were designed as described above. The aim was to test the effect of reduced energy input, such as no boiling through a pressurized incubation, on DMS levels in the worts and the final beer. Accordingly, the experimental set-up included a comparison with wort boiling according to standard conditions.

High levels of DMSP and free DMS were measured during heating of worts of cv. Quench, with an increase in free DMS levels observed over time in the pressurized wort. In contrast, the boiled, evaporated wort accumulated less DMS until the end of boiling, after which free DMS accumulated again. In parallel with the results following micro-mashings as described hereinabove, worts of pilot-scale Triple-Null malt were characterized by extremely low levels of DMSP and free DMS as compared to similar samples derived from cv. Quench (cf. Table 5). It is noteworthy that even in the wort, said DMS levels of Triple-Null malt were well below the 50-ppb taste-threshold level.

The concentrations of T2N precursors and free T2N in wort and beer from wild-type malt cv. Quench and Triple-Null malt were determined by GC-MS following derivatization of carbonyls with O-(2,3,4,5,6-pentafluorobenzyl)-hydroxylamine, essentially as described by Gronqvist et al. (1993).

High concentrations of T2N precursors were measured during the heating of wort of cv. Quench, with a maximum found at the beginning of the boiling/heat treatment (Table 6). For wort made from the Triple-Null malt notably lower levels of T2N precursors (approximately 40% of those when using a wild-type raw material) were found—also with a maximum at the start of boiling/heat treatment. A low energy heating regime (i.e. applying a pressurized heat treatment) had only minor effect on the levels of T2N precursors for both malt types. In all the wort samples, low levels of free T2N were determined.

It is notable that the beneficial effect of the null-LOX1 and null-LOX-2 mutations is clearly visible, even when a reduced input of energy is applied during wort heating.

Data on Levels of DMS and T2N Precursors/Free T2N in Beer Samples

The concentration of DMS were measured in the fresh beer made from Triple-Null malt as well as from wild-type malt cv. Quench using the two different boiling/heating regimes as described herein above. The results are summarized in Table 7.

Beer produced from wild-type malt of cv. Quench using a standard boiling regime contains 65 ppb DMS, i.e. slightly above the 50-ppb taste threshold. Using an energy-saving procedure such as "no boiling through a pressurized incubation" as described herein above with the wild-type malt resulted in a very high concentration of DMS (151 ppb) in the final beer.

In contrast, beer produced from the Triple-Null malt contained very low levels of DMS, regardless of the heating procedure.

Regardless of the wort preparation method applied, beer produced from Triple-Null malt contained much fewer T2N precursors, (amounting to a 56 to 58% reduction) than beer produced from wild-type malt cv. Quench regardless of boiling method (Table 7).

The levels of free T2N in fresh beer were low in all four fresh beers tested (i.e. using malt of cv. Quench or Triple-Null combined with evaporation-allowed or pressurized wort preparation), but after forced ageing for 2 weeks at 37° C., a marked difference was seen. While both beers made from wild-type malt produced with standard boiling or pressurized heating contained 0.041 ppb and 0.061 ppb T2N, respectively, the corresponding values for beers produced from Triple-Null malt were lower, i.e. reduced to 95% and 64%, respectively. (Table 7).

Data on Beer Foam

Pilot-brewed beer, produced with either evaporation or pressurization at wort heating, of cv. Quench (cf. FIG. 6B) and Triple-Null (cf. FIG. 6C) malts were compared. Beers were taken at sampling point 9 (cf. FIG. 6B,C), degassed for 20 min in an ultrasonic bath before 50 mL $H_2O$ was added to 150 mL beer. The mixture was slowly poured into a foam tower, consisting of a 16-cm-long, 7-cm-wide glass tube (with a glass filter and connector at the bottom and top, respectively). $N_2$ gas, at a flow rate of 400 mL/min, was bubbled through the mixture from the bottom to generate beer foam. This was led through a tube, and collected in a graded sedimentation cone positioned on a weight.

The total foam weight of each of the four beers was recorded at 5-min intervals until foam development ceased (FIG. 7). Foam levels were similar, irrespective of evaporation or pressurization procedures. However, foam development was notably improved in those beers where Triple-Null malt was used as raw material.

Beer Tastings

An expert taste panel evaluated the four beers produced (i.e. using malt of cv. Quench or Triple-Null combined with evaporation-allowed or pressurized wort preparation), both the freshly produced beer and after forced ageing for 1 and 2 weeks at 37° C. (Table 8).

The fresh beer produced from Triple-Null malt obtained the highest Total Flavour Score, regardless of boiling method. In contrast, a slightly lower Total Flavour Score was obtained for the beer produced from wild-type malt and using the standard boiling regime; it was deemed "slightly DMS". Application of the pressurized heating technique resulted in a beer with a very low Total Flavour Score, and deemed "Strongly DMS"

After forced ageing for 1 or 2 weeks at 37° C. the beers produced from Triple-Null malt got markedly lower total ageing scores than beers produced from wild-type malt, especially due to a reduced score for the "Papery" attribute, originating from lower concentrations of the ageing component T2N.

Example 9

Malting and Brewing in Pilot Scale

Experimental Set-Up

Malting and brewing analyses with malt of Triple-Null (double-null-LOX-null-MMT), and cv. Rosalina (wild-type reference), involved the following steps: (i) malting; (ii) wort preparation; (iii) wort separation; (iv) wort boiling; (v) fermentation of wort with the yeast *Saccharomyces carlsbergensis*; (vi) lagering of beer; (vii) bright beer filtration; and (viii) bottling of beer.

Malting experiments were carried out with kernels of Triple-Null and cv. Rosalina in 21-kg-large scales, performed in a malt house as follows:
- (i) steeping at 16° C.: 1 h wet; 1 h dry; 1 h wet; 1 h dry; 1 h wet; dripping of water over 36 h to a final water content 45%;
- (ii) germination for 120 h, starting at 16° C. and ramping to 14° C.;
- (iii) drying/kilning of the germinated kernels were with either a normal temperature programme or a low temperature programme in a pilot kiln;
- (iv) normal drying/kilning programme, starting at 45° C. with ramp-up to 85° C. over 14 h, followed by incubation for 2 h at 85° C.;
- (v) low temperature drying/kilning programme, beginning at 45° C. and with ramp-up to 75° C. over 12 h, followed by incubation for 2 h at 75° C.

For mashings of both Triple-Null and cv. Rosalina, samples of 34 kg malt were used. Following milling of the individual malt samples, tap water was added to give 180-L volumes. Mashing-in was performed at 60° C. for 20 min, followed by a 5-min ramp from 60° C. to 65° C. The saccharification pause at 65° C. was for 60 min, followed by a 13-min heat-up phase to 78° C., and 10 min of mashing-off at 78° C.

Wort sample of wild-type cv. Rosalina and of Triple-Null were separately boiled either for 60 min at 100° C. in an open vessel (resulting in 4.5% evaporation), or heated to 99.5° C. and kept at 99.5° C. for 60 min in a closed vessel (resulting in 0% evaporation).

Six different worts were made with different combinations of cultivar, kilning conditions and boiling conditions (see Table 9).

The remaining brewing steps as referred to hereinabove—i.e. whirlpool separation, fermentation, lagering, filtration and packaging in green glass bottles—were according to specifications for standard brewing practice.

DMSP and DMS levels were measured as described herein above in Example 8.

Data on Levels of DMSP/DMS in Malt Samples

In a modern malting plant, drying of kernels with a curing temperature at 85° C. for at least 2 h is normally required in order to reduce DMSP in malt to a low level—i.e. less than 4.5 mg/kg malt—in order to obtain a malt from which a wort can be obtained with satisfactory DMS level (see below).

Based on these facts, pilot malting trials were designed as described above. The aim was to test the effect of reduced energy input, such as low temperature drying, on DMS and DMSP levels in the malts, worts and the final beer. Accordingly, the experimental set-up included a comparison with kernel drying according to standard conditions.

In the malt made with cv. Rosalina using standard drying at 85° C., DMSP was measured to 4.7 mg/kg malt. In the malt of cv. Rosalina made with drying at 75° C. DMSP was measured to 16.2 mg/kg (Table 10). In malt made with grains of Triple-Null, extremely low DMSP levels, actually below the detection limit, were obtained regardless of the drying temperature.

Data on Levels of DMSP/DMS in Wort Samples

Using modern brewing technology, at least one hour boiling with an evaporation of 4.5-10% wort is normally required in order to achieve satisfactory DMS levels in the corresponding, finished beer—preferably [DMS]<50 ppb. Based on these facts brewing trials were designed as described above. The aim was to test the effect of reduced energy input, such as low temperature kernel drying or heat treatment without evaporation in a closed vessel, on DMS levels in the worts and the final beer. Accordingly, the experimental set-up included a comparison with kernel drying and wort boiling according to standard conditions.

High levels of DMSP and free DMS were measured during heating of worts of cv. Rosalina made with normal drying. An increase in free DMS levels was observed over time in the closed vessel. In contrast, the boiled, evaporated wort accumulated less DMS until the end of boiling, after which free DMS accumulated again. (Table 11) Using a low temperature drying with cv. Rosalina the DMSP and DMS levels were much higher than with normal drying. In all three worts made with cv. Rosalina the final wort had a DMS level higher than 50-ppb.

In parallel with other results described herein above, wort of Triple-Null malt were characterized by extremely low levels of DMSP and free DMS as compared to similar samples derived from cv. Rosalina. It is noteworthy that even in the wort, said DMS levels of Triple-Null malt were well below 50-ppb regardless of kilning and boiling regimes.

Data on Levels of T2N Precursor/Free T2N in Wort Samples

The concentrations of T2N precursors and free T2N in wort and beer from wild-type malt cv. Rosalina and Triple-Null malt were determined by GC-MS following derivatization of carbonyls with O-(2,3,4,5,6-pentafluorobenzyl)-hydroxylamine, essentially as described by Groenqvist et al. (1993).

High concentrations of T2N precursors were measured in wort of cv. Rosalina (Table 12). For wort made from the Triple-Null malt, particularly lower levels of T2N precursors, ~40% of those when using a wild-type raw material, were found. Low energy heating regime, i.e. low kilning temperature or heat treatment of wort without evaporation in a closed vessel, had only little effect on the levels of T2N precursors for both malt types. In all of the wort samples, low levels of free T2N were determined.

It is notable that the beneficial effect of the null-LOX-1 and null-LOX-2 mutations is clearly visible, even when a reduced input of energy is applied.

Data on Levels of DMS and T2N Precursors/Free T2N in Beer Samples

DMS concentrations were measured in the fresh beer made from Triple-Null malt, as well as from wild-type malt of cv. Rosalina using the two different kernel drying and boiling/heating regimes as described herein above. The results are summarized in Table 13.

Beer produced using a standard boiling regime from wild-type malt of cv. Rosalina, produced using standard drying condition, contained 117 ppb DMS, i.e. above 50-ppb. Using an energy saving procedure, such as "no evaporation in a closed vessel" as described hereinabove, with the wild-type malt resulted in 174 ppb DMS, i.e. a very high concentration of the off-flavour in the final beer, In contrast, beer produced from the Triple-Null malt contained very low levels of DMS, regardless of the boiling and kilning procedures.

The levels of free T2N in fresh beer were low in all beers tested (i.e. using malt of cv. Rosalina or Triple-Null combined with evaporation-allowed boiling or heat treatment without evaporation in a closed vessel), but a marked difference was seen after forced ageing for 2 weeks at 37° C. While beer made from wild-type malt produced with standard boiling and heat treatment without evaporation in a closed vessel contained 0.055 ppb and 0.035 ppb T2N, respectively, the corresponding values for beers produced from Triple-Null malt were markedly lower, i.e. reduced by 67% and 51%, respectively (cf. Table 13).

Beer Tastings

An expert taste panel evaluated the 6 beers produced (i.e. using malt of cv. Rosalina or Triple-Null combined with evaporation-allowed boiling or heat treatment without evaporation in a closed vessel or standard or low temperature drying), both the freshly produced beer and after forced-ageing for 2 weeks at 37° C. (Table 14).

The fresh beer produced from Triple-Null malt obtained the highest total flavour score, regardless of kilning and boiling methods. In contrast, much lower total flavour scores were obtained for the beer produced from wild-type malt kilned at 85° C. and using the standard boiling regime; it was deemed "markedly DMS". Application of heat treatment without evaporation in a closed vessel in wort preparation resulted in a beer with an even lower total flavour score, which was deemed "strongly DMS".

After forced-ageing for 2 weeks at 37° C., the beer produced with normal boiling from Triple-Null malt kilned at 85° C. got markedly lower total ageing scores than the corresponding beer produced from wild-type malt, especially due to a reduced score for the "papery" attribute, originating from lower concentrations of the ageing component T2N.

For beer produced from wild-type malt, evaluation of the staling characteristic was not really possible, primarily due to the markedly-to-strong DMS off-flavour.

Example 10

Comparisons of Barley-Brewed and Normal Beer—THAs

Beer-specific THAs derived from linoleic acid were already described several decades back in time (Drost et al., 1974). Since then, various reports have verified that the total content of THAs in beer ranges from ~5-12 ppm (Hamberg, 1991; and references therein). While 9,12,13-THA normally constitutes 75-85% of the THAs in beer, that of 9,10,13-THA amounts to 15-25%; other isomers are found in trace amounts.

In beer produced from wort prepared from malt of barley Triple-Null (cf. Example 9), the concentration of 9,12,13-THA was reduced by 80-87% compared to the control beer made from malt of cv. Rosalina (Table 15). For the 9,10,13-THA isomer 65-72% reduction was observed. These measurements were carried out using standard HPLC-mass spectrometry analyses (Hamberg, supra).

Example 11

Amplification of Raw Material-Derived DNA in Beer

Where the PCR methodology can be used to establish the presence or absence of species-specific DNA sequences in malt flour mixes, authentication of beer samples have been more challenging. In beer production, the combined effects of raw material-derived nucleases, elevated temperatures and filtrations provide beer products that contain only low levels of intact DNA for amplification of plant gene fragments. Here, an effective novel method for combined DNA extraction and amplification is described that generates DNA in sufficient quantity for visualization.

A novel, four-step protocol was developed for raw material authentication of beer samples. It utilized in a consecutive manner the reagents and protocols of three biomolecular kits, eventually causing amplification of DNA fragments for visualization:
- (i) extraction of DNA from beer through binding to magnetic beads [following the recommendations in the instructions for liquid samples of the DNA Extraction Kit, Speciation (Tepnel Biosystems Ltd., Cat. No. 901040N)];
- (ii) amplification of DNA by isothermal strand displacement (Illustra GenomiPhi V2 DNA Amplification Kit, GE Healthcare, Cat. No. 25-6600-30);
- (iii) PCR with primers for detection of specific DNA mutations, using the REDExtract-N-Amp PCR ReadyMix (Sigma, Cat. No. XNAP-1 KT);
- (iv) agarose gel electrophoresis to separate amplification products, followed by staining with ethidium bromide to visualize these.

Step (i) above concerned purification of DNA from 400-4 aliquots of the following samples:
- (a) Tuborg Grøn Pilsner, produced using flour of a 75%:25% mixture of wild-type malt:barley (Carlsberg Breweries NS; label inscription 26.11.11 704);
- (b) beer produced in pilot-scale using a mixture comprising 50% null-LOX-1 malt (Carlsberg trial identifier 2C10084);
- (c) non-boiled wort of a pilot-scale brew using malt produced from Triple-Null barley (Carlsberg trial identifier 2C11001);
- (d) boiled wort of a pilot-scale brew using Triple-Null malt (Carlsberg trial identifier 2C11001), i.e. wort processed from that described in (c) above.

DNA purified from each of the above-mentioned samples (a), (b), (c) and (d) was finally resuspended in 50 μL of a 10-mM Tris-EDTA buffer, pH 7.4.

In step (ii) above, 1-μL sample aliquots of wort or beer-derived DNA—purified as detailed in (i)—was subjected to amplification. DNA was briefly heat-denatured and then cooled in sample buffer containing random hexamers that non-specifically bind to the DNA. A master-mix containing DNA polymerase, random hexamers, nucleotides, salts and buffers was added and isothermal amplification carried out at 30° C. for 2.0 h, employing a final reaction volume of 20 μL. Subsequently, the polymerase was heat inactivated during a 10-min incubation at 65° C.

Regarding step (iii) above, parameters of 14-4 PCR amplifications—including either 1.0 or 4.2-4 template aliquots of samples prepared as described in (ii) above, and 7 μmol each of primer FL820 (SEQ ID NO: 10 of WO 2010/075860) and FL823 (SEQ ID NO:11 of WO 2010/075860) to detect the null-LOX-1 mutation; cf. FIG. 18B in WO 2010/075860 to Skadhauge, B. et al.—were as follows:
- (i) 1 cyclus with denaturation at 96° C. for 2 min;
- (ii) 30 cycles with:
  - (a) denaturation at 95° C. for 1 min;
  - (b) annealing at 68° C. for 1 min;
  - (c) extension at 72° C. for 1 min
- (iii) final extension at 72° C. for 10 min
- (iv) hold Step (iv) above consisted of an electrophoretic separation of the entire PCR mixture in a 2% (w/v) agarose gel wherein ethidium bromide was incorporated. Following electrophoresis, the gel was irradiated with UV light and a photo taken (FIG. 10).

Analysis of the DNA banding pattern shown in FIG. 10 revealed no amplification product from an aliquot of Tuborg beer, an expected result as the raw material was of wild-type origin, i.e. not derived from null-LOX-1 barley. However, amplification products of the expected length could be detected samples from beer brewed on a mixture comprising 50% null-LOX-1 malt. Similarly, but more pronounced, staining was obtained in the non-boiled wort prepared from Triple-Null malt. Possibly due to heat damage and following precipitation, less PCR product was amplified in the sample of boiled wort of Triple-Null raw material.

Utilizing the amplified products described above in (ii) with primer pair FL1034-FL1039 (SEQ ID NO:9 and SEQ ID NO:8 of WO 2010/075860, respectively; see also FIG. 18 in WO 2010/075860 to Skadhauge et al.), primer set 20 (SEQ ID NO:77 and SEQ ID NO:81 of WO 2010/063288), and primer set 21 (SEQ ID NO:78 and SEQ ID NO:82 of WO 2010/063288; see also FIG. 15 in WO 2010/063288 A2 to Knudsen et al.) in separate PCRs, but at conditions similar to those detailed above in the instant Example, it is verified whether a wort or beer sample is produced by the use of a Triple-Null raw material.

TABLE 1

Comparison of agronomic data [field trials in 2009 (in Fyn, Denmark)]

| | cv. Quench | cv. Power | null-LOX-1 | null-MMT | null-LOX-1-null-LOX-2 | null-LOX-1-0-MMT | Triple-Null |
|---|---|---|---|---|---|---|---|
| Date of sowing | 4 April | 4 April | 4 April | 4 April | 4 April | 4 April | 4 April |
| Heading date | 18 June | 15 June | 16 June | 15 June | 16 June | 16 June | 17 June |
| Straw length at maturity (cm) | 81 | 84 | 87 | 80 | 87 | 85 | 81 |
| Powdery mildew | 0 | 5 | 0 | 0 | 0 | 0 | 0 |
| Spot blotch[1] | 2 | 3 | 3 | 4 | 2 | 3 | 3 |
| Leaf rust[1] | 8 | 1 | 3 | 3 | 3 | 3 | 4 |
| Lodging[1] | 2 | 6 | 4 | 4 | 2 | 3 | 3 |
| Date of maturity | 3 August | 31 July | 1 August | 31 July | 1 August | 1 August | 2 August |
| Relative yield (%)[2] | 103 | 98 | 92 | 93 | 103 | 100 | 101 |
| 1000 kernel weight (g) | 49 | 48 | 53 | 54 | 53 | 47 | 49 |
| Protein (%)[3] | 10.5 | 10.2 | 10.3 | 10.5 | 10.5 | 10.4 | 10.5 |
| Starch (%)[3] | 63.0 | 62.1 | 62.5 | 62.9 | 62.4 | 63.1 | 62.7 |
| Grain size (% > 2.5 mm) | 95.7 | 92.4 | 96.8 | 94.6 | 99.2 | 99.1 | 95.3 |

[1]On a scale from 0 to 9, where 0 represents no infection or lodging and 9 represents extremely infection or lodging.
[2]Relative average yield of three replication at two different locations, when compared to official Danish Spring barley variety mixture in 2009. The standard mixture yield was set to a relative yield of 100%.
[3]Measured by near infrared transmittance (NIT) spectroscopy.

TABLE 2

Levels of DMSP in micro-maltings and -mashings

| | | Sampling descriptor (cf. FIG. 6A) | | | |
|---|---|---|---|---|---|
| | | 1 Malt μg/g | 2 Sweet wort | 3 Boiled wort μg/L | 4 Cooled wort |
| | Barley type | | | | |
| Kiln drying at 40° C. | Triple-Null | 0.2 | 8 | 6 | — |
| | null-LOX-1-null-MMT | 0.4 | 37 | 19 | — |
| | null-LOX-1-null-LOX-2 | 21.3 | — | — | — |
| | null-MMT | — | — | — | — |
| | null-LOX-1 | 17.3 | — | — | — |
| | Wild-type cv. Power | 21.3 | 2348 | 950 | — |
| Kiln drying at 75° C. | Triple-Null | 0.2 | 9 | 7 | — |
| | null-LOX-1-null-MMT | 0.1 | 9 | 8 | — |
| | null-LOX-1-null-LOX-2 | 11.9 | — | — | — |
| | null-MMT | — | — | — | — |
| | null-LOX-1 | 8.8 | — | — | — |
| | Wild-type cv. Power | 7.7 | 1017 | 393 | — |
| Kiln drying at 85° C. | Triple-Null | 0.1 | 4 | 5 | — |
| | null-LOX-1-null-MMT | 0.1 | 7 | 6 | — |
| | null-LOX-1-null-LOX-2 | 5.7 | 656 | 247 | — |
| | null-MMT | 0.1 | 5 | 4 | — |
| | null-LOX-1 | 6.5 | 684 | 212 | — |
| | Wild-type cv. Power | 7.1 | 880 | 286 | — |

TABLE 3

Levels of T2N and T2N precursors (T2N pre.) in micro-maltings and -mashings

| | | Sampling descriptor (cf. FIG. 6A) | | | |
|---|---|---|---|---|---|
| | | 1 Malt | | 4 Cooled wort | |
| | | T2N | T2N pre. | T2N | T2N pre. |
| | Barley type | ppb | | | |
| Kiln drying at 40° C. | Triple-Null | 0.0 | 2.3 | 0.1 | 3.6 |
| | null-LOX-1-null-MMT | 0.0 | 4.3 | 0.1 | 7.5 |
| | null-LOX-1-null-LOX-2 | — | — | — | — |
| | null-MMT | — | — | — | — |
| | null-LOX-1 | — | — | — | — |
| | Wild-type cv. Power | 0.1 | 8.3 | 0.4 | 15.7 |
| Kiln drying at 75° C. | Triple-Null | 0.1 | 2.3 | 0.2 | 3.3 |
| | null-LOX-1-null-MMT | 0.1 | 3.1 | 0.2 | 4.9 |
| | null-LOX-1-null-LOX-2 | — | — | — | — |
| | null-MMT | — | — | — | — |
| | null-LOX-1 | — | — | — | — |
| | Wild-type cv. Power | 0.2 | 5.2 | 0.3 | 8.2 |
| Kiln drying at 85° C. | Triple-Null | 0.1 | 1.8 | 0.1 | 2.5 |
| | null-LOX-1-null-MMT | 0.1 | 2.1 | 0.1 | 3.1 |
| | null-LOX-1-null-LOX-2 | 0.1 | 1.8 | 0.1 | 2.5 |
| | null-MMT | 0.4 | 4.2 | 0.4 | 6.4 |
| | null-LOX-1 | 0.1 | 2.2 | 0.1 | 6.6 |
| | Wild-type cv. Power | 0.2 | 4.8 | 0.1 | 9.0 |

TABLE 4

Levels of DMSP in micro-mashings

| | Sampling descriptor | | | |
|---|---|---|---|---|
| | 2 Sweet wort | 3 30-min boiled wort | 3 60-min boiled Wort | 4 Cooled wort |
| Barley type | µg/L | | | |
| Wild-type cv. Power | 10.9 | 12.0 | 6.3 | 3.8 |
| Triple-Null | 0.1 | 0.6 | 0.6 | 0.3 |

TABLE 5

Levels of DMSP and DMS in two types of pilot-scale mashings

| | | Sampling descriptor (cf. FIG. 6B, C) | | | | | | | |
|---|---|---|---|---|---|---|---|---|---|
| Barley type | | 1 Malt µg/g | 2 | 3 | 4 | 5 µg/L | 6 | 7 | 8 |
| | | Evaporation-allowed heating of sweet wort (min; ° C.) | | | | | | | |
| | | | 0; 67 | 22; 99 | 37; 101 | 52; 101 | 67; 101 | 82; 101 | 142; 90 |
| Wild-type cv. Quench | DMSP | 4.7 | 725 | 682 | 516 | 369 | 288 | 219 | 101 |
| | DMS | 4.3 | 93 | 85 | 50 | 47 | 33 | 31 | 127 |
| Triple-Null | DMSP | 0.1 | 3 | 2 | 3 | 2 | 1 | 1 | 1 |
| | DMS | 0.1 | 14 | 13 | 11 | 12 | 11 | 12 | 12 |
| | | Pressurized heating of sweet wort (min; ° C.) | | | | | | | |
| | | | 0; 69 | 22; 99 | 37; 98 | 52; 98 | 67; 98 | 82; 98 | 142; 80 |
| Wild-type cv. Quench | DMSP | 4.7 | 564 | 508 | 408 | 340 | 273 | 219 | 161 |
| | DMS | 4.8 | 51 | 51 | 60 | 64 | 76 | 80 | 164 |
| Triple-Null | DMSP | 0.0 | 15 | 5 | 3 | 3 | 3 | 2 | 2 |
| | DMS | 0.1 | 20 | 20 | 19 | 18 | 19 | 20 | 20 |

TABLE 6

Levels of T2N precursor (T2N pre.) and free T2N in two types of pilot-scale mashings

| | | Sampling descriptor (cf. FIG. 6B, C) | | | | | | | |
|---|---|---|---|---|---|---|---|---|---|
| Barley type | | 1 Malt | 2 | 3 | 4 | 5 ppb | 6 | 7 | 8 |
| | | Evaporation-allowed heating of sweet wort (min; ° C.) | | | | | | | |
| | | | 0; 67 | 22; 99 | 37; 101 | 52; 101 | 67; 101 | 82; 101 | 142; 90 |
| Wild-type cv. Quench | T2N pre. | — | 3.6 | 4.8 | 4.3 | 4.2 | 3.9 | 3.9 | 3.7 |
| | T2N | — | 0.3 | 0.3 | 0.2 | 0.2 | 0.1 | 0.1 | 0.1 |
| Triple-Null | T2N pre. | — | 1.7 | 1.9 | 1.6 | 1.4 | 1.4 | 1.2 | 1.4 |
| | T2N | — | 0.1 | 0.2 | 0.1 | 0.1 | 0.1 | 0.1 | 0.1 |
| | | Pressurized heating of sweet wort (min; ° C.) | | | | | | | |
| | | | 0; 69 | 22; 99 | 37; 98 | 52; 98 | 67; 98 | 82; 98 | 142; 80 |
| Wild-type cv. Quench | T2N pre. | — | 3.8 | 4.0 | 3.9 | 3.8 | 3.8 | 3.8 | 3.3 |
| | T2N | — | 0.2 | 0.2 | 0.2 | 0.2 | 0.2 | 0.2 | 0.2 |
| Triple-Null | T2N pre. | — | 1.6 | 1.8 | 1.8 | 1.6 | 1.5 | 1.4 | 1.5 |
| | T2N | — | 0.2 | 0.2 | 0.2 | 0.1 | 0.1 | 0.1 | 0.1 |

TABLE 7

DMS, T2N precursors and free T2N in fresh and aged beer

| | | Beer incubation conditions | | | | |
|---|---|---|---|---|---|---|
| | | Fresh | | | | 2 weeks at 37° C. |
| Barley type | Boiling type | DMS (ppb) | T2N precursors (ppb) | Free T2N (ppb) | $SO_2$ (ppm) | Free T2N (ppb) |
| Wild-type cv. Quench | Evaporation-allowed heating of sweet wort | 65 | 3.0 | 0.025 | 5 | 0.041 |
| Triple-Null | | 2 | 1.3 | 0.018 | 3 | 0.039 |
| Wild-type cv. Quench | Pressurized heating of sweet wort | 151 | 3.3 | 0.024 | 6 | 0.061 |
| Triple-Null | | 3 | 1.4 | 0.020 | 4 | 0.039 |

TABLE 8

Sensory evaluation of fresh and aged beer produced from wild-type cv Quench and Triple-Null malt

| | | Beer incubation conditons | | | | |
|---|---|---|---|---|---|---|
| | | Fresh | | 1 week at 37° C. | | 2 weeks at 37° C. |
| Barley type | Boiling type | Flavour score[1] | Comments | Ageing score[2] | Papery score[2] | Ageing score | Papery score |
| Wild-type cv. Quench | Evaporation-allowed heating of sweet wort | 4.4 | Noticeably sour Slightly oxidised Slightly DMS Slightly sulphidic Slightly estery | 3.1 | 2.4 | 2.4 | 2.1 |
| Triple-Null | | 4.8 | Slightly sulphidic Slightly fatty acid Slightly grainy | 2.1 | 1.6 | 1.9 | 1.3 |
| Wild-type cv. Quench | Pressurized heating of sweet wort | 2.8 | Slightly estery Slightly aged Strongly DMS Slightly catty Slightly grainy | 3.5 | 2.3 | 3.3 | 2.4 |
| Triple-Null | | 4.8 | Slightly grainy Slightly fruity Slightly sour Slightly stale | 2.6 | 1.9 | 1.9 | 1.1 |

[1]On a scale from 1-9, where 9 is best
[2]On a scale from 0-5, where 0 designates a fresh beer, and 5 a very aged beer
[3]On a scale from 0-5, where 5 designates an extremely papery beer

TABLE 9

Experimental overview

| | | Drying/kilning | | Boiling | |
|---|---|---|---|---|---|
| Brew no. | Cultivar | Progamme | Curring temperature (° C.) | Vessel | Evaporation (%) |
| 1 | Rosalina | Normal | 85 | Open | 4.5 |
| 2 | Triple-Null | Normal | 85 | Open | 4.5 |
| 3 | Rosalina | Normal | 85 | Closed | 0 |
| 4 | Triple-Null | Normal | 85 | Closed | 0 |
| 5 | Rosalina | Low temperature | 75 | Open | 4.5 |
| 6 | Triple-Null | Low temperature | 75 | Open | 4.5 |

TABLE 10

DMS and DMSP in malt samples

| | Drying/kilning | | | |
|---|---|---|---|---|
| Cultivar | Progamme | Curring temperature (° C.) | DMS (mg/kg) | DMSP (mg/kg) |
| Rosalina | Normal | 85 | 4.1 | 4.7 |
| Rosalina | Low temperature | 75 | 2.8 | 16.2 |
| Triple-Null | Normal | 85 | <DL* | <DL* |
| Triple-Null | Low temperature | 75 | <DL* | <DL* |

*below detection limit

TABLE 11

Levels of DMSP and DMS in two types of pilot-scale boiling

| | | Sample descriptor (cf. FIG. 6) | | | | | |
|---|---|---|---|---|---|---|---|
| | | 1 | 2 | 3 | 4 | 5 | 7 |
| | | Heating of sweet wort (min; ° C.) | | | | | |
| Barley type | | 0; 67 | 22; 99 | 37; 100 | 52; 100 | 82; 100 | 142; 90 |
| | | μg/L | | | | | |

Normal kernel drying at 85° C. and evaporation-allowed heating of wort in open vessel.

| Wild-type cv. Rosalina | DMSP | 1245 | 1257 | 882 | 759 | 415 | 208 |
|---|---|---|---|---|---|---|---|
| | DMS | 212 | 190 | 102 | 56 | 31 | 178 |
| Triple-Null | DMSP | trace | — | — | — | — | trace |
| | DMS | trace | — | — | — | — | trace |

Normal kernel drying at 85° C. and heating of wort in closed vessel without evaporation.

| Wild-type cv. Rosalina | DMSP | 1180 | 1061 | 732 | 576 | 398 | 274 |
|---|---|---|---|---|---|---|---|
| | DMS | 183 | 227 | 410 | 412 | 471 | 709 |
| Triple-Null | DMSP | trace | — | — | — | — | trace |
| | DMS | trace | — | — | — | — | trace |

Low-temperature drying of kernels at 75° C. and evaporation-allowed heating of wort in open vessel.

| Wild-type cv. Rosalina | DMSP | 1825 | 1665 | 1262 | 1005 | 611 | 376 |
|---|---|---|---|---|---|---|---|
| | DMS | 155 | 178 | 74 | 32 | 27 | 154 |
| Triple-Null | DMSP | 11 | — | — | — | — | 2 |
| | DMS | 4 | — | — | — | — | 4 |

TABLE 12

Levels of T2N precursors (T2N pre) and free T2N in pilot scale worts produced using varying kilning and boiling regimes

| | | At start of heating | | Heated wort | |
|---|---|---|---|---|---|
| Barley type | Boiling type *) | T2N (ppb) | T2N pre (ppb) | T2N (ppb) | T2N pre (ppb) |
| Normal drying at 85° C. | | | | | |
| Wild-type cv. Rosalina | Ves. op.; evap. | 0.39 | 5.3 | 0.21 | 4.2 |
| Triple-Null | Ves. op.; evap. | 0.24 | 1.8 | 0.08 | 1.8 |
| Wild-type cv. Rosalina | Ves. clo.; no evap. | 0.40 | 5.3 | 0.36 | 4.1 |
| Triple-Null | Ves. clo.; no evap. | 0.28 | 2.2 | 0.11 | 1.8 |
| Low-temperature drying at 75° C. | | | | | |
| Wild-type cv. Rosalina | Ves. op.; evap. | 0.21 | 4.4 | 0.27 | 4.7 |
| Triple-Null | Ves. op.; evap. | 0.31 | 1.9 | 0.18 | 1.8 |

*) Abbreviations: Vessel open (ves. op) or closed (ves. clo.); no evaporation (no. evap.) or evaporation-allowed (evap.)

TABLE 13

DMS and free T2N in fresh and aged beer

| Barley type | Boiling type *) | DMS (ppb) | Free T2N **) (ppb) | $SO_2$ (ppm) | Free T2N ***) (ppb) |
|---|---|---|---|---|---|
| Normal drying at 85° C. | | | | | |
| Wild-type cv. Rosalina | Ves. op.; evap. | 117 | 0.011 | 5 | 0.055 |
| Triple-Null | Ves. op.; evap. | 1 | 0.011 | 5 | 0.018 |
| Wild-type cv. Rosalina | Ves. clo.; no evap. | 326 | 0.011 | 5 | 0.035 |
| Triple-Null | Ves. clo.; no evap. | 2 | 0.012 | 4 | 0.017 |
| Low temperature drying at 75° C. | | | | | |
| Wild-type cv. Rosalina | Ves. op.; evap. | 174 | — | 10 | — |
| Triple-Null | Ves. op.; evap | 5 | — | 5 | — |

*) Abbreviations: Vessel open (ves. op) or closed (ves. clo.); no evaporation (no. evap.) or evaporation-allowed (evap.)
**) In fresh beer
***) In beer incubated for 2 weeks at 37° C.

TABLE 14

Sensory evaluation of fresh and aged beer produced from wild-type cv. Rosalina and Triple-Null malt

| | | Beer incubation conditons | | | |
|---|---|---|---|---|---|
| | | Fresh | | 2 weeks at 37° C. | |
| Barley type | Boiling type*) | Flavour score[1] | Comments | Ageing score[2] | Papery score[3] |
| Normal drying of kernels at 85° C. | | | | | |
| Wild-type cv. Rosalina | Ves. op.; evap. | 3.4 | Slightly sulphidic Markedly DMS | | |
| Triple-Null | Ves. op.; evap. | 5.7 | Slightly after-bitter | 2.4 | 1 |
| Wild-type cv. Rosalina | Ves. clo.; no evap. | 3.1 | Strongly DMS | | |
| Triple-Null | Ves. clo.; no evap. | 5.0 | Slightly sour Slightly hoppy Slightly sharp-bitter Slightly grainy | 2.7 | 2.0 |

TABLE 14-continued

Sensory evaluation of fresh and aged beer produced from wild-type cv. Rosalina and Triple-Null malt

| Barley type | Boiling type*) | Beer incubation conditons | | | |
|---|---|---|---|---|---|
| | | Fresh | | 2 weeks at 37° C. | |
| | | Flavour score[1] | Comments | Ageing score[2] | Papery score[3] |
| Low-temperature drying of kernels at 75° C. | | | | | |
| Wild-type cv. Rosalina | Ves. op.; evap. | 4.8 | Slightly fruity Markedly DMS | | |
| Triple-Null | Ves. op.; evap. | 5.2 | Slightly bitter Slightly acidic | 2.1 | 0.7 |

*)Abbreviations: Vessel open (ves. op) or closed (ves. clo.); no evaporation (no. evap.) or evaporation-allowed (evap.)
[1]On a scale from 1-9, where 9 is best
[2]On a scale from 0-5, where 0 designates a fresh beer, and 5 a very aged beer
[3]On a scale from 0-5, where 5 designates an extremely papery beer

TABLE 15

THAs in beers produced from malt of cv Rosalina and Triple-Null mutant.

| Barley type | Boiling type *) | 9.12.13-Hodea (mg/l) | 9.10.13-Hodea (mg/l) | 9.12.13-Hodea/ 9.10.13-Hodea |
|---|---|---|---|---|
| Normal drying at 85° C. | | | | |
| Wild-type cv. Rosalina | Ves. op.; evap. | 3.68 | 0.84 | 4.4 |
| Triple-Null | Ves. op.; evap. | 0.75 | 0.29 | 2.5 |
| Wild-type cv. Rosalina | Ves. clo.; no evap. | 3.28 | 0.78 | 4.2 |
| Triple-Null | Ves. clo.; no evap. | 0.51 | 0.23 | 2.2 |
| Low-temperature drying at 75° C. | | | | |
| Wild-type cv. Rosalina | Ves. op.; evap. | 3.77 | 0.8 | 4.7 |
| Triple-Null | | 0.49 | 0.22 | 2.2 |

*) Abbreviations: Vessel open (ves. op) or closed (ves. clo.); no evaporation (no. evap.) or evaporation-allowed (evap.)

TABLE 16

Sequence Listing

| SEQ ID NO | Corresponds to | Description |
|---|---|---|
| SEQ ID NO: 1 | SEQ ID NO: 1 of international patent application WO2005/087934 | Barley gDNA of cv. Barke spanning the start and stop codons of the gene encoding LOX-1 |
| SEQ ID NO: 2 | SEQ ID NO: 2 of international patent application WO2005/087934 | Barley gDNA of mutant D112 spanning the region between the start and stop codons of the corresponding gene encoding LOX-1 of cv. Barke |
| SEQ ID NO: 3 | SEQ ID NO: 3 of international patent application WO2005/087934 | Protein sequence of full-length LOX-1 protein of cv. Barke |
| SEQ ID NO: 4 | SEQ ID NO: 4 of international patent application WO2005/087934 | Protein sequence of inactive, truncated LOX-1 of mutant D112 |
| SEQ ID NO: 5 | SEQ ID NO: 1 of international patent application PCT/DK2009/050355 published as WO2010/075860 | The sequence of wild-type genomic DNA encoding LOX-2 from cv. Barke. |
| SEQ ID NO: 6 | SEQ ID NO: 2 of international patent application PCT/DK2009/050355 published as WO2010/075860 | The sequence of mutant LOX-2 genomic DNA from barley mutant A689. |
| SEQ ID NO: 7 | SEQ ID NO: 5 of international patent application PCT/DK2009/050355 published as WO2010/075860 | The sequence of full length LOX-2 protein of wild type barley, cv. Barke. |
| SEQ ID NO: 8 | SEQ ID NO: 6 of international patent application PCT/DK2009/050355 published as WO2010/075860 | The sequence of mutant LOX-2 protein lacking LOX-2 activity from barley mutant A689. |
| SEQ ID NO: 9 | SEQ ID NO: 3 of international patent application PCT/DK2009/050315 published as WO2010/063288 | Barley gDNA of cv. Prestige, genomic sequence spanning the start and stop codons of the gene for MMT. |
| SEQ ID NO: 10 | SEQ ID NO: 8 of international patent application PCT/DK2009/050315 published as WO2010/063288 | Barley gDNA of Mutant 8063, Genomic sequence for MMT spanning the start and stop codons of the gene for MMT. |
| SEQ ID NO: 11 | SEQ ID NO: 16 of international patent application PCT/DK2009/050315 published as WO2010/063288 | Barley gDNA of cv. Sebastian, Genomic sequence for MMT spanning the start and stop codons of the gene for MMT. |
| SEQ ID NO: 12 | SEQ ID NO: 19 of international patent application PCT/DK2009/050315 published as WO2010/063288 | Barley gDNA of Mutant 14018, Genomic sequence for MMT spanning the start and stop codons of the gene for MMT. |

TABLE 16-continued

Sequence Listing

| SEQ ID NO | Corresponds to | Description |
|---|---|---|
| SEQ ID NO: 13 | SEQ ID NO: 6 of international patent application PCT/DK2009/050315 published as WO2010/063288 | Sequence for barley MMT of cv. Prestige. |
| SEQ ID NO: 14 | SEQ ID NO: 18 of international patent application PCT/DK2009/050315 published as WO2010/063288 | Sequence for barley MMT of cv. Sebastian. |
| SEQ ID NO: 15 | SEQ ID NO: 22 of international patent application PCT/DK2009/050315 published as WO2010/063288 | Entire translated sequence derived from mis-spliced RNA of Mutant 14018. |
| SEQ ID NO: 16 | SEQ ID NO: 24 of international patent application PCT/DK2009/050315 published as WO2010/063288 | Entire translated sequence derived from mis-spliced RNA of barley Mutant 14018. |
| SEQ ID NO: 17 | SEQ ID NO: 26 of international patent application PCT/DK2009/050315 published as WO2010/063288 | Entire translated sequence derived from mis-spliced RNA of barley Mutant 14018. |

REFERENCES CITED

Patent Documents

U.S. Pat. No. 4,683,195 to Mullis, K. B. et al.
U.S. Pat. No. 4,800,159 to Mullis, K. B. et al.
PCT patent application WO 02/053721 to Douma, A. C. et al.
PCT patent application WO 2005/087934 to Breddam, K. et al.
European patent no. EP 1609866 to Hirota, N. et al.
PCT/DK2009/050315 to Knudsen, S. et al.
PCT/DK2009/050355 to Skadhauge, B. et al.

Other Publications

American Association of Cereal Chemists, "Approved methods of the American Association of Cereal Chemists." ISBN 0-913250-86-4 (1995).
American Society of Brewing Chemists, "Methods of analysis of the American Society of Brewing Chemists." ISBN 1-881696-01-4 (1992).
Baur, C. and Grosch. W., "Investigation about the taste of di-, tri- and tetrahydroxy fatty acids." Z. Lebensm. Unters. Forsch. 165: 82-84 (1977).
Baur, C. et al., "Enzymatic oxidation of linoleic acid: Formation of bittertasting fatty acids." Z. Lebensm. Unters. Forsch. 164:171-176 (1977).
B. Bonacchelli, C. De Brackeleire and F. Harmegnies "Wort boiling—the Meura's concept with wortstripping" Proceedings of the 31st International Congress of the European Brewery Convention Venice, Italy, 6-10 May 2007, Contribution no. 58, ISBN 978-90-70143-24-4
Briggs, D. E. et al., "Malting and brewing science. Volume I Malt and sweet wort." Chapman and Hall. New York. USA. ISBN 0412165805 (1981).
Durai, S. et al., "Zinc finger nucleases: custom-designed molecular scissors for genome engineering of plant and mammalian cells." Nucleic Acids Res. 33:5978-5990 (2005).
European Brewery Convention. "Analytica—EBC." ISBN 3-418-00759-7 (1998).
Groenqvist, A. et al., "Carbonyl compounds during beer production in beer." Proceedings of the 24th EBC Congress, Oslo, pp. 421-428 (1993).
Hamberg, M., "Trihydroxyoctadecenoic acids in beer: Qualitative and quantitative analysis." J. Agric. Food Chem. 39:1568-1572 (1991).
Hansen, M. et al., "Antisense-mediated suppression of C-hordein biosynthesis in the barley grain results in correlated changes in the transcriptome, protein profile, and amino acid composition." J. Exp. Bot. 58:3987-3995 (2007).
Hough, J. S. et al., "Malting and brewing science. Volume II Hopped wort and beer." Chapman and Hall, New York, USA. ISBN 0412165902 (1982).
Iida, S, and Terada, R., "Modification of endogenous natural genes by gene targeting in rice and other higher plants." Plant Mol. Biol. 59:205-219 (2005).
Institute of Brewing, "Institute of Brewing. Methods of analysis." ISBN 0-900489-10-3 (1997).
Jamieson, A. M. and van Gheluwe, J. E. A., "Identification of a compound responsible for cardboard flavor in beer." Proc. Am. Soc. Brew. Chem. 29:192-197 (1970).
Kleinhofs, A. et al., "Induction and selection of specific gene mutations in Hordeum and Pisum." Mut. Res. 51:29-35 (1978).
Kumar, S. et al., "Gene targeting in plants: fingers on the move." Trends Plant Sci. 11:159-161 (2006).
Kuroda, H. et al., "Characterization of factors involved in the production of 2(E)-nonenal during mashing." Biosci. Biotechnol. Biochem. 67:691-697 (2003).
Kuroda, H. et al., "Characterization of 9-fatty acid hydroperoxide lyase-like activity in germinating barley seeds that transforms 9(S)-hydroperoxy-10(E).12(Z)-octadecadienoic acid into 2(E)-nonenal." Biosci. Biotechnol. Biochem. 69:1661-1668 (2005).
Lermusieau, G. et al., "Nonoxidative mechanism for development of trans-2-nonenal in beer." J. Am. Soc. Brew. Chem. 57:29-33 (1999).
Liégeois, C. et al., "Release of deuterated (E)-2-nonenal during beer aging from labeled precursors synthesized before boiling." J. Agric. Food Chem. 50:7634-7638 (2002).

Maquat, L. E. and Carmichael, G. G., "Quality control of mRNA function." Cell 104:173-176 (2001).

Meilgaard, M. C., "Flavor chemistry of beer: Part II: Flavor and threshold of 239 aroma volatiles." Tech. Q. MBAA 12:151-167 (1975).

Mendell, J. T. and Dietz, H. C., "When the message goes awry: Disease-producing mutations that influence mRNA content and performance." Cell 107:411-414 (2002).

Nevo, E., "Resources for Breeding of Wild Barley." In: "Barley: Genetics. Biochemistry. Molecular Biology and Biotechnology." Shewry. P. R., ed., pp. 3-18. C.A.B. International. ISBN 0-85198-725-7 (1992).

Nyborg, M. et al., "Investigations of the protective mechanism of sulfite against beer staling and formation of adducts with trans-2-nonenal." J. Am. Soc. Brew. Chem. 57:24-28 (1999).

Rasmussen, S. K. and Hatzack, F., "Identification of two low-phytate barley (*Hordeum vulgare* L.) grain mutants by TLC and genetic analysis." Hereditas 129:107-112 (1998).

Robbins, M. P. et al., "Gene manipulation of condensed tannins in higher plants." Plant Physiol. 116:1133-1144 (1998).

Sambrook, J. and Russell. D. W., "Molecular Cloning. A Laboratory Manual. 3rd Ed.", Cold Spring Harbor Laboratory Press. Cold Spring Harbor. New York. ISBN 0-87969-577-3 (2001).

Schmitt, N. F. and van Mechelen. J. R., "Expression of lipoxygenase isoenzymes in developing barley grains." Plant Sci. 128:141-150 (1997).

Stahl, Y. et al., "Antisense downregulation of the barley limit dextrinase inhibitor modulates starch granule sizes distribution. starch composition and amylopectin structure". Plant J. 39:599-611 (2004).

Tzfira, T. and White. C., "Towards targeted mutagenesis and gene replacement in plants." Trends Biotechnol. 23:567-569 (2005).

von Bothmer, R. et al., "Diversity in barley (*Hordeum vulgare*)." In: "Diversity in Barley (*Hordeum vulgare*)." von Bothmer, R., van Hintum, T., Knüpffer, H., Sato, K., eds., pp. 129-136. ISBN 0-444-50587-7 (2003). Also available at "www" dot "genres" dot "de/".

Wackerbauer, K. and Meyna, S., "Freie und triglyceridegebundene Hydroxyfettsäuren in Gerste und Malz", Monatsschrift für Brauwissenschaft, heft 3/4: 52-57 (2002).

Wu, J. et al., "Nonsense-mediated mRNA decay (NMD) silences the accumulation of aberrant trypsin proteinase inhibitor mRNA in *Nicotiana* attenuata." Plant J. 51:693-706 (2007).

The invention claimed is:

1. A barley plant, or a part thereof, wherein said barley plant comprises:
   a) a first mutation that results in a total loss of functional lipoxygenase (LOX)-1, and
   b) a second mutation resulting in a total loss of functional LOX-2, and
   c) a third mutation resulting in a total loss of functional S-adenosylmethionine:methionine S-methyltransferase (MMT).

2. The barley plant or a part thereof according to claim 1, wherein the gene encoding LOX-1 of said plant comprises a premature stop codon situated at the most 705 codons downstream of the start codon.

3. The barley plant or a part thereof according to claim 1, wherein the gene encoding LOX-2 of said plant comprises a premature stop codon situated at the most 707 codons downstream of the start codon.

4. The barley plant or a part thereof according to claim 1, wherein the mutation in the gene encoding MMT is a mutation within a 5' splice site of an intron.

5. The barley plant or a part thereof according to claim 1, wherein the third mutation results in a gene encoding a truncated form of MMT comprising an N-terminal fragment of wild-type MMT, wherein said N-terminal fragment comprises at most the 500 N-terminal amino acid residues of SEQ ID NO:13.

6. The barley plant or a part thereof according to claim 1, wherein said plant is a progeny of (a) the barley plant designated "Barley, Hordeum vulgare: Line 8063" deposited at ATCC on 13 Oct. 2008 with the designation PTA-9543 and of (b) the barley plant designated "Barley, Hordeum vulgare L.: Line A689" deposited at ATCC on 8 December 2008 with the deposit number PTA-9640.

7. A malt composition comprising a processed barley plant or a part thereof, wherein said barley plant is the barley plant according to claim 1.

8. A method for preparing a barley based beverage with low levels of one or more off-flavors and/or precursors of off-flavors, the method comprising the steps of:
   (i) providing a barley plant or part thereof according to claim 1
   (ii) optionally malting at least part of said barley, thereby obtaining malted barley;
   (iii) mashing said barley and/or malted barley and optionally additional adjuncts, thereby obtaining a wort;
   (iv) heating said wort optionally in the presence of additional ingredient(s), wherein at most 4% of the wort volume is evaporated, thereby obtaining heated wort; and
   (v) processing said heated wort into a beverage;
thereby preparing the barley based beverage with low levels of one or more off-flavors or precursors of off-flavors.

9. The method according to claim 1, wherein step (i) comprises providing barley kernels.

10. The method according to claim 1, wherein said barley is malted using a method comprising the steps of
   a) steeping said barley;
   b) germinating said barley; and
   c) kiln drying said barley;
and wherein kiln drying of said barley is performed at a temperature of at most 80° C.

11. The method according to claim 1, wherein said wort is heated to a temperature of at the most 99.8° C.

12. The method according to claim 1, wherein step v) comprises fermentation of the wort.

13. The method according to claim 1, wherein the method does not involve heating to a temperature above 80° C. for more than 30 min.

* * * * *

UNITED STATES PATENT AND TRADEMARK OFFICE
CERTIFICATE OF CORRECTION

PATENT NO. : 9,587,210 B2
APPLICATION NO. : 13/701604
DATED : March 7, 2017
INVENTOR(S) : Søren Knudsen et al.

It is certified that error appears in the above-identified patent and that said Letters Patent is hereby corrected as shown below:

In the Claims

In Claim 9, Column 146, Line 39, "according to claim 1" should read --according to claim 8--

In Claim 10, Column 146, Line 41, "according to claim 1" should read --according to claim 8--

In Claim 11, Column 146, Line 48, "according to claim 1" should read --according to claim 8--

In Claim 12, Column 146, Line 50, "according to claim 1" should read --according to claim 8--

In Claim 13, Column 146, Line 52, "according to claim 1" should read --according to claim 8--

Signed and Sealed this
Twenty-seventh Day of June, 2017

Joseph Matal
*Performing the Functions and Duties of the
Under Secretary of Commerce for Intellectual Property and
Director of the United States Patent and Trademark Office*